US006529226B2

(12) United States Patent
Sakai et al.

(10) Patent No.: US 6,529,226 B2
(45) Date of Patent: Mar. 4, 2003

(54) THERMAL PRINTER AND DRIVING DEVICE FOR THE SAME

(75) Inventors: Keita Sakai, Osaka (JP); Koji Toyota, Osaka (JP); Shozou Shiraga, Osaka (JP); Satoshi Yamaura, Osaka (JP); Yuji Doi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/925,609

(22) Filed: Aug. 10, 2001

(65) Prior Publication Data

US 2002/0027592 A1 Mar. 7, 2002

Related U.S. Application Data

(63) Continuation of application No. 09/462,790, filed on Apr. 14, 2000, now Pat. No. 6,288,737.

(30) Foreign Application Priority Data

May 14, 1998 (JP) .......................................... 10-131667
May 19, 1998 (JP) .......................................... 10-136377

(51) Int. Cl.[7] ................................................ G01D 15/24
(52) U.S. Cl. ...................................................... 347/218
(58) Field of Search ................................ 347/218, 222, 347/182, 181; 400/619, 120.05, 582, 592; 101/488; 346/145

(56) References Cited

U.S. PATENT DOCUMENTS

| | | | | |
|---|---|---|---|---|
| 3,593,833 A | * | 7/1971 | Bretti | 400/592 |
| 4,223,325 A | * | 9/1980 | Ebert | 346/145 |
| 4,731,618 A | | 3/1988 | Shimazaki | 347/182 |
| 4,738,553 A | | 4/1988 | Uemura et al. | 400/120.05 |
| 5,349,905 A | | 9/1994 | Taylor et al. | 101/488 |
| 5,533,821 A | * | 7/1996 | Awai et al. | 400/619 |
| 6,095,703 A | * | 8/2000 | Tanaka et al. | 400/582 |

FOREIGN PATENT DOCUMENTS

| | | |
|---|---|---|
| EP | 0 794 064 | 9/1997 |
| EP | 0794 064 A2 | 9/1997 |
| EP | 0794 064 A3 | 1/1998 |
| JP | 2-34257 | 3/1990 |
| JP | 6-328758 | 11/1994 |
| JP | 8-1983 | 1/1996 |
| JP | 9-85978 | 3/1997 |
| JP | 9-188018 | 7/1997 |
| JP | 9-254473 | 1/1998 |

OTHER PUBLICATIONS

Patent Abstracts of Japan vol. 1998, No. 01, Jan. 30, 1998 & JP 09 2554773 A (Kofu Nippon Denki KK), Sep. 30, 1997 Abstract.

* cited by examiner

*Primary Examiner*—Lamson Nguyen
*Assistant Examiner*—K. Feggins
(74) *Attorney, Agent, or Firm*—Wenderoth, Lind & Ponack, L.L.P.

(57) ABSTRACT

The present invention relates to a thermal line printer for a small recording terminals such as a terminal for POS (point of sales), a handy terminal, a measuring apparatus or the like, and also relates to a driving device for the thermal line printer. In the structure of a conventional thermal line printer, there is a limitation to the ability to decrease the dimension of depth in a situation where the downsizing of an apparatus is desired. By installing the thermal line printer in an upright state, the dimension of the depth can be decreased. However, in this configuration, the user cannot see the state of the printing because the recording paper falls down toward the user's side, due to the gravity, when the paper is ejected after printing. The present invention solves the above problems by disposing a line type thermal head (5) and a platen roller (2) in such a manner that a tangential line to the platen roller (2) at a pressed point between the line type thermal head (5) and the platen roller (2) intersects the short side of the body of the printer in a plane projecting the body along the axial direction of the platen roller (2), and by ejecting the recording paper from the short side.

6 Claims, 48 Drawing Sheets

N Number of segments
Th Pulse width
$\alpha$ Correction factor

N Number of segments
Th Pulse width
α Correction factor

- Longest period is taken for TM1 from following:
  - · Motor rotation period in preceding dot line × α
  - · Standard motor rotation period
  - · Th1 × 3 (number of segments)
  - · Th2 × 6 (number of segments) ×β
- Longest period is taken for TM2 from following:
  - · TM1 × α
  - · Standard motor rotation period
  - · Th2 × 6 (number of segments)
  - · Th3 × 1 (number of segments) ×β

α, β : correction factor

FIG. 27

- Longest period is taken for TM1 from following:
  - · Motor rotation period in preceding dot line × α
  - · Standard motor rotation period
  - · Th1 × 3 (number of segments) /2
- Longest period is taken for TM2 from following:
  - · TM1 × α
  - · Standard motor rotation period
  - · Th1 × 3 (number of segments) /2
  - · Th2 × 6·(number of segments) × β/2
- Longest period is taken for TM3 from following:
  - · TM2 × α
  - · Standard motor rotation period
  - · Th2 × 6 (number of segments) /2

α, β : correction factor

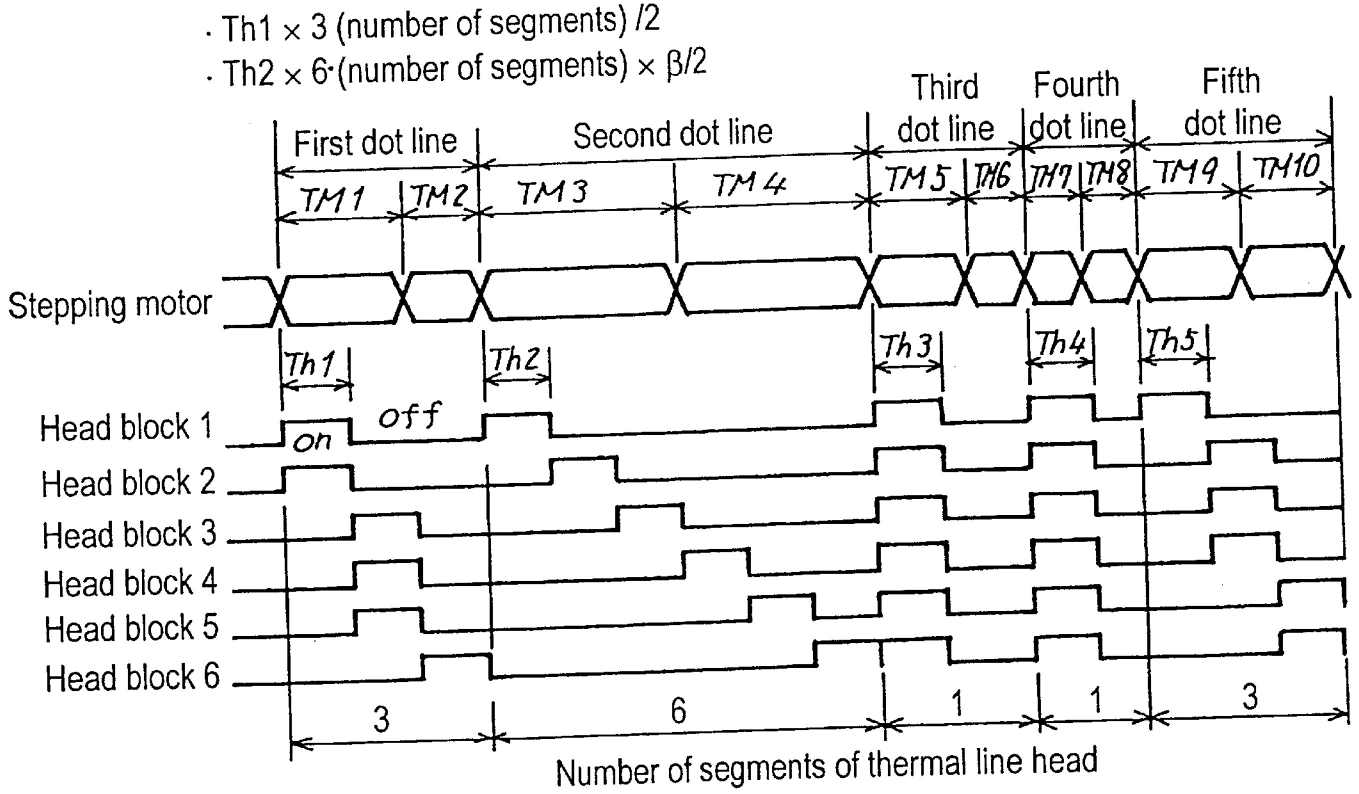

FIG. 33

- Longest period is taken for TM1 from following:
  - · Motor rotation period in preceding dot line × α
  - · Standard motor rotation period
  - · Th1 × 3 (number of segments)
- Longest period is taken for TM2 from following:
  - · TM1 × α
  - · Standard motor rotation period
  - · Th2 × 6(number of segments) × β
- Longest period is taken for TM3 from following:
  - · TM2 × α
  - · Standard motor rotation period
  - · Th2 × 6 (number of segments)

α,β : correction factor

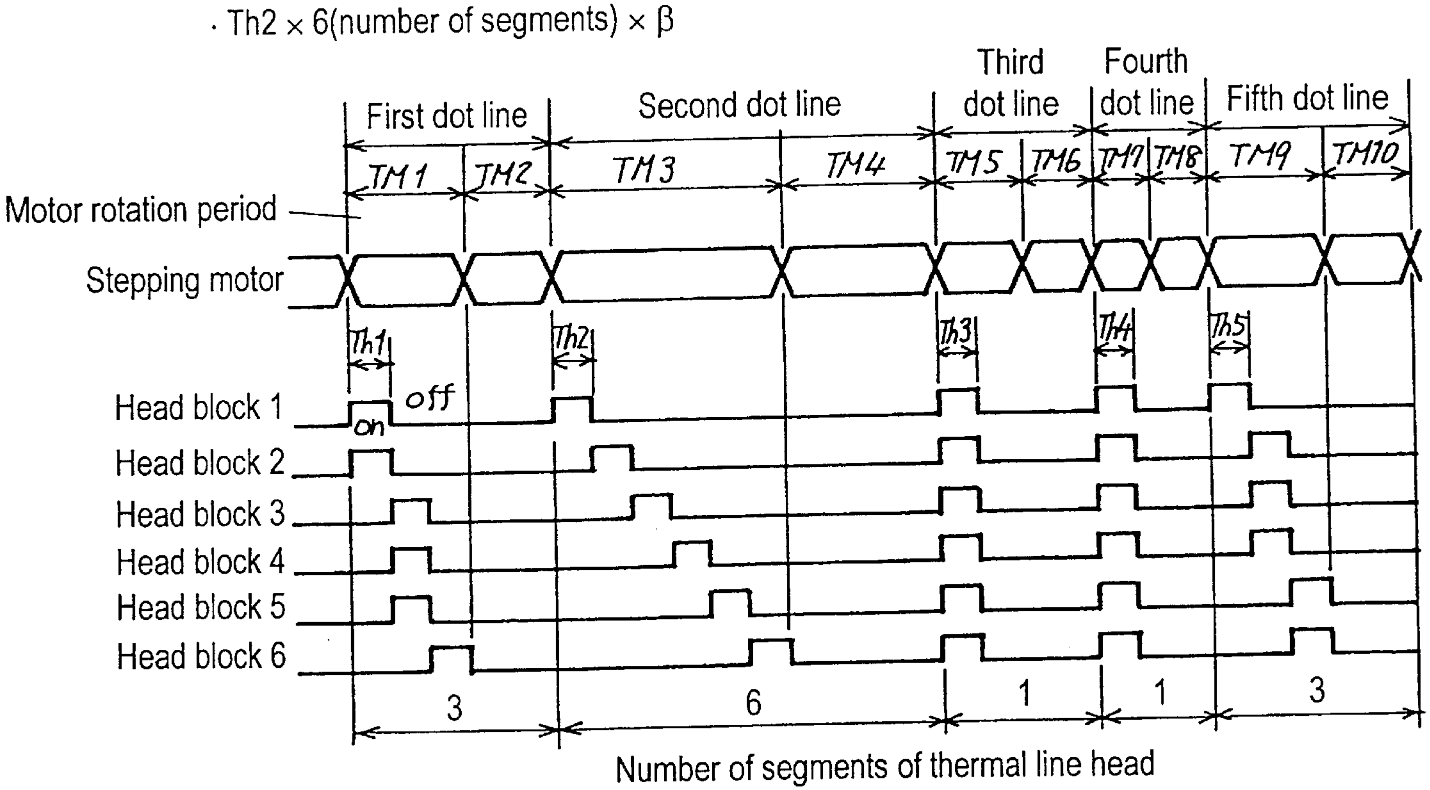

Standard motor rotation period = 4.32ms

THERMAL PRINTER AND DRIVING DEVICE FOR THE SAME

This application is a continuation of U.S. patent No. 6/288,737 issued Sep. 11, 2001, which is a National Stage of International application No. PCT/JP99/02476 filed on May 13, 1999.

FIELD OF THE INVENTION

The present invention relates to a thermal line printer used for a small recording terminal such as a terminal for a POS (point of sales), a handy terminal, a measuring apparatus or the like, and a driving device for the thermal line printer.

BACKGROUND OF THE INVENTION

In recent years, a small, light and thin thermal printer has been desired from the market for such use as described in the above, and various types have been proposed. FIG. 35 is a perspective view showing the structure of a conventional thermal line printer. FIG. 36 is a cross sectional view showing the directions of feeding and ejecting the recording paper in the conventional printer. FIG. 37 is a perspective view showing the whole structure of a handy terminal as an example in which the conventional thermal line E printer is installed.

In FIG. 35 and FIG. 36, a recording paper feeding guide 101*a* is disposed in a body chassis 101, a platen roller 102 having a cylindrical shape is rotatably supported by the body chassis 101, a motor 103 rotates the platen roller 102 through the power transmission of a row of gears 104*a*, 104*b*, 104*c* and 104*d*, a row of heaters 105*a* are disposed on a line type thermal head 105, a shaft 107, which is disposed in the body chassis 101, rotatably supports a head supporting unit 106 which holds the line type thermal head 105, a spring 109 elastically presses the row of heaters 105*a* onto the platen roller 102 sandwiching recording paper 108 between the row of heaters 105*a* and the platen roller 102, and a recording paper holder 110 holds the rolled recording paper 108.

The directions of feeding and ejecting the recording paper 108 in the conventional thermal printer having the above structure is described hereinafter referring to FIG. 36.

As shown in FIG. 36, the recording paper 108 is fed from the short side 101*b* of the body chassis 101 in a plane projecting the body chassis 101 along the axial direction of the platen roller 102 through the space between the platen roller 102 and the recording paper feeding guide 101*a* disposed in the body chassis 101 as shown by an arrow A and ejected from the long side 101*c* of the body chassis 101 in the same projecting plane after passing through a pressed portion between the row of heaters 105*a* disposed on the line type thermal head 105 and the platen roller 102, or, the recording paper 108 is fed from the long side 101*c* of the same projecting plane along the axial direction of the platen roller 102 through a space at a recording paper feeding guide 101*b* disposed in the body chassis 101 as shown by an arrow B and ejected from the long side 110*c* of the body chassis 101 after passing through the pressed portion between the row of heaters 105*a* disposed on the line type thermal head 105 and the platen roller 102.

Next, the state of installation of a thermal line printer in a handy is terminal as an example is described referring to FIG. 37. In FIG. 37, the thermal line printer is illustrated with solid lines for the convenience of showing the layout of the installation of the printer, though the printer is actually contained inside the body of the handy terminal.

In FIG. 37, a thermal line printer is disposed behind rows of operation keys 112, a display unit 113, a control circuit substrate 114 and a battery 115 in the body 111 of a handy terminal, and a roll of recording paper 108 is disposed at the back end. In the above structure, the recording paper is ejected from the upper side after being printed on by the thermal line printer, whereby the user can see the state of the printing.

However, under the circumstance that smaller and thinner printers are desired, the conventional thermal line printer having the above structure has been desired to be reduced in the dimension of depth rather than height since the height (i.e., the dimension of Y in FIG. 36) of the thermal line printer can be reduced as the height is determined by the size of the paper older for containing a necessary length of rolled recording paper. Therefore, the reduction of the dimension of depth rather than that of height is strongly desired.

For reducing the dimension of depth, there is a method where the conventional thermal line printer is set upright as shown in FIG. 38 and the paper is fed from the long side 101*c* of the body chassis 101 in a plane projecting the body chassis 101 along the axial direction of the platen roller 102 through the space at the recording paper feeding guide 101*b* disposed in the body chassis 101 and ejected from the other long side 101*c*' of the body chassis 101 in the same projecting plane after passing through a pressed portion between the row of heaters 105*a* disposed on the line type thermal head 105 and the platen roller 102. However, in this method, the ejected paper after printing falls down, due to gravity, towards the user's side when the printer is installed in a handy terminal or the like as shown in FIG. 39. Therefore the user cannot see the state of printing.

On the other hand, in a conventional driving device for a thermal line printer, a dynamically segmenting operation is used for reducing the size of a power source and for increasing printing speed. In the dynamically segmenting operation, a block to be printed is dynamically varied according to the number of dots to be printed. FIG. 40 shows the general printing process of one dot line by the thermal line printer which executes the dynamically segmenting operation as described above.

In the process, as shown in FIG. 40, the number of dots to be printed in the present dot line is counted at first, and a block to be printed by the thermal line head at one time is determined in such a manner that the number of dots does not exceed a predetermined maximum number of dots printed by simultaneous application of electricity. Then the number of segments of the thermal line head necessary for printing one dot line is determined. Then a pulse width Th applied to the thermal line head is determined based on parameters such as the above number of segments, the temperature of the thermal line head, voltage applied to the thermal line head and the like. Then the rotation cycle period (hereafter, rotation period) of the stepping motor for operation in the present dot line is determined by taking, after comparison, the longer period from the following: a standard motor rotation period stored in advance, and a period computed by multiplying the pulse width Th by the number of segments of the thermal line head. Lastly, the stepping motor is operated with the rotation period determined in the above, and also the thermal line head is operated. FIG. 41 shows an example of the timing chart of the above operation.

However, in the above conventional printing method, as shown in FIG. 41, when the pulse width Th applied to the thermal line head is longer, the difference between a motor rotation period in a second dot line (i.e., TM2=Th2×6-segment) and a motor rotation period in a third dot line (i.e., TM3=standard motor rotation period) becomes larger. In general, in a stepping motor, when the fluctuation of the rotation periods is larger, the vibration becomes large, whereby the vibration noise becomes larger. Especially, when the rotation period changes suddenly from a long motor period due to the numerous segments of the thermal line head to a short motor period due to the few segments, the step out of the stepping motor is liable to occur.

On the other hand, when the temperature of the thermal line head is low, or when voltage applied is low, or in the case of the numerous segments of the thermal line head, the pulse width Th becomes long. When the temperature is low, load to the mechanism of the thermal line printer becomes large, which causes the step out of the stepping motor. Also when the voltage applied is low, the torque of the stepping motor becomes weak, which also causes the step out of the stepping motor to the level of vital inconvenience in the thermal line printer.

Also, when the standard motor rotation period is set long for decreasing the difference between TM2 and TM3, there has been a problem that the period of"TOFF" shown in FIG. 41 becomes long all the time, which causes the decrease of printing speed. FIG. 42 and FIG. 43 show timing charts in which numeric values are put in for further explanation on the above operation. FIG. 42 shows an example in which a large difference between motor rotation period in a second dot line (7.2 ms) and motor rotation period in a third dot line (3.0 ms) causes a large vibration of the motor, and also causes the step out of the motor. In FIG. 43, the standard motor rotation period is set long, whereby the "TOFF" period becomes long, which causes the decrease of printing speed.

In the above description on the prior art, the number of segments of the thermal line head is varied between one and six for the convenience of showing the operation by illustrations. However, the number of segments is varied between one and some hundreds in practical use.

SUMMARY OF THE INVENTION

The present invention addresses the above conventional problems and aims to provide a thermal line printer which enables the user to easily see the state of printing, and also enables the decrease of the dimension of depth for reducing the size of an apparatus in which the thermal line printer is installed, including the rolled recording paper of the printer.

To solve the above problems, the thermal line printer of the present invention comprises a platen roller rotatably supported by a body chassis, driving means for rotating the platen roller, a line type thermal head, a head supporting unit for holding the line type thermal head, a shaft, which is fixed to the body chassis, for rotatably supporting the head supporting unit, and an elastic unit for pressing the line type thermal head onto the platen roller sandwiching recording paper between the line type thermal head and the platen roller, and, the recording paper is fed from the long side of the body chassis in a plane projecting along the body chassis in the axial direction of the platen roller and ejected from the short side.

The above structure enables the decrease of the dimension of depth of the thermal line printer including the rolled recording paper, and also enables the user to easily see the state of printing. The decrease of the size of an apparatus in which a thermal line printer is installed is thus realized.

Also, the present invention aims to address the conventional problems, and aims to provide a driving device for a thermal line printer, in which printing speed does not decrease even under sudden change from the numerous segments to the few segments of the thermal line head, and performs smooth operation without the occurrence of the step out of the motor, and also has little operation noise.

To solve the problems, the driving device of the present invention comprises a dynamically segmenting means for varying the number of segments of the thermal line head in respective dot lines in such a manner that the number of dots printed at one time does not exceed a predetermined maximum number of dots printed by simultaneous application of electricity, pulse width correcting means for correcting a pulse width applied to the thermal line head according to the number of segments of the thermal line head in the above dynamic segmentation, motor rotation period determining means for determining a rotation period of a stepping motor for feeding recording paper in the present dot line by taking, after comparison, one of the following: a value computed by correcting a motor rotation period determined in the preceding dot line, a motor rotation period computed based on a pulse width applied to the thermal line head in the present dot line and the number of segments of the thermal line head in the present dot line, and a standard motor rotation period stored in advance.

The above driving device for a thermal line printer enables printing with no decrease of printing speed, and also enables the decrease of the vibration of the motor even when the number of segments of the thermal line head suddenly changes from numerous segments to a few segments, whereby the vibration noise can be suppressed, and also the occurrence of the step out of the motor can be prevented, which results in the smooth operation of the thermal line printer.

BRIEF DESCRIPTION OF THE DRAWINGS

FIG. 27 is a timing chart showing an example of operation in the tenth exemplary embodiment, FIG. 33 is a timing chart showing an example of operation in the twelfth exemplary embodiment.

DESCRIPTION OF THE PREFERRED EMBODIMENTS

Figure 1:
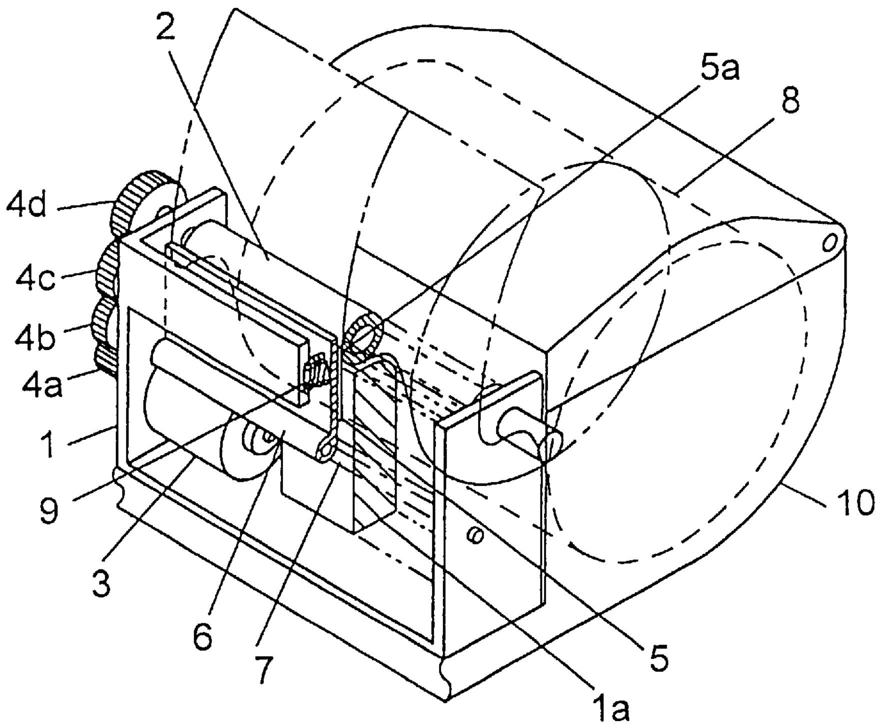
FIG. 1 is a perspective view showing the whole structure of a thermal line printer in a first exemplary embodiment of the present invention.

The thermal printer of the present invention comprises a platen roller rotatably supported by a body chassis, driving means for rotating the platen roller, a line type thermal head, a head supporting unit for holding the line type thermal head, a shaft, which is fixed to the body chassis, for rotatably supporting the head supporting unit, an elastic unit for pressing the line type thermal head onto the platen roller sandwiching recording paper between the line type thermal head and the platen roller, and the recording paper is fed from the long side of the body chassis in a plane projecting the body chassis along the axial direction of the platen roller and ejected from the short side. The above structure realizes the decrease of the dimension of depth of the thermal line printer including the rolled recording paper, enables the user to easily see the state of printing, and also realizes the decrease of the size of an apparatus in which the thermal line printer is installed.

Also, the thermal line printer of the present invention comprises a platen roller rotatably supported by a body chassis, driving means for rotating the platen roller, a line type thermal head, a head supporting unit holding the line type thermal head and being supported by the body chassis, and an elastic unit for pressing the line type thermal head onto the platen roller sandwiching recording paper between the line type thermal head and the platen roller, and the line type thermal head and the platen roller are disposed in such a manner that the recording paper is fed from the long side of the body chassis in a plane projecting the body chassis along the axial direction of the platen roller, and the tangential line to the platen roller at a pressed portion between the line type thermal head and the platen roller intersects the short side of the body chassis in the same projecting plane from which the recording paper is ejected. The above structure realizes the decrease of the dimension of depth of the thermal line printer including the rolled recording paper, enables the user to easily see the state of printing, and also realizes the decrease of the size of an apparatus in which the thermal line printer is installed.

Also, the thermal line printer of the present invention comprises a platen roller rotatably supported by a body chassis, driving means for rotating the platen roller, a line type thermal head, a head supporting unit holding the line type thermal head and being supported by the body chassis, and an elastic unit for pressing the line type thermal head onto the platen roller sandwiching recording paper between the line type thermal head and the platen roller. The thermal line printer further comprises guides, which are formed as portions of the body chassis or formed by mounting separate units to the body chassis, for guiding recording paper to be fed from the long side of the body chassis in a plane projecting the body chassis along the axial direction of the platen roller and to be ejected from the short side of the body chassis in the same projecting plane along the axial direction of the platen roller after passing through a pressed portion between the line type thermal head and the platen roller. The above structure realizes the decrease of the dimension of depth of the thermal line printer including the rolled recording paper, enables the user to easily see the state of printing, and also enables the decrease of the size of an apparatus in which the thermal line printer is installed.

On the other hand, a driving device for a thermal line printer in the present invention comprises dynamically segmenting means for varying the number of segments of the thermal line head in respective dot lines in such a manner that the number of dots printed at one time does not exceed a predetermined maximum number of dots printed by simultaneous application of electricity, pulse width correcting means for correcting the pulse width applied to the thermal line head according to the above number of segments of the thermal line head, motor rotation period determining means for determining the motor rotation period of a stepping motor for feeding recording paper in the present dot line by taking, after comparison, one of the following: a value computed by correcting a motor rotation period determined in the preceding dot line, a motor rotation period computed based on a pulse width applied to the thermal line head in the present dot line and the number of segments of the thermal line head in the present dot line, and a standard motor rotation period stored in advance. The above driving device enables the suppression of the fluctuation of the motor rotation periods of the stepping motor even under sudden change from numerous segments to few segments of the thermal line head due to printing contents without setting the standard motor rotation period at a value which is unnecessarily large, whereby the vibration of the stepping motor is suppressed, and also enables high speed printing.

It is preferable that the recording paper is fed with a plurality of steps of the stepping motor for printing one dot line, and the thermal line head is operated in the respective steps of the plurality of steps. In addition, the motor rotation period of the stepping motor for feeding the recording paper is varied in respective dot lines. The above driving device enables the suppression of the fluctuation of the motor rotation periods of the stepping motor even under sudden change from numerous segments to few segments of the thermal line head due to printing contents, whereby the vibration of the stepping motor is suppressed. The above driving device also enables the improvement of the preciseness of the paper feeding pitch of the stepping motor, and enables high speed printing even by using a low cost and small stepping motor by increasing the deceleration ratio.

It is also preferable that the recording paper is fed with a plurality of steps of the stepping motor for printing one dot line, and the thermal line head is operated in the respective steps of the plurality of steps, and also that the motor rotation period of the stepping motor for feeding the recording paper is varied in the respective steps. The above driving device enables the suppression of the fluctuation of the motor rotation periods of the stepping motor even under sudden change from numerous segments to few segments of the thermal line head due to printing contents, whereby the vibration of the stepping motor is suppressed. It also enables dynamically segmenting operation even by using a low cost and small stepping motor, and enables high speed printing by correcting motor rotation periods in the respective steps.

Also it is preferable that the recording paper is fed with a plurality of steps of the stepping motor for printing one dot line, and the thermal line head is operated in one step of the plurality of steps, and also that the motor rotation period of the stepping motor for feeding the recording paper is varied in respective dot lines. The above driving device enables the suppression of the fluctuation of the motor rotation periods of the stepping motor even under sudden change from numerous segments to few segments of the thermal line head due to printing contents, whereby the vibration of the stepping motor is suppressed. It also enables higher quality printing having no occurrence of horizontal level difference in printing.

Also it is preferable that the recording paper is fed with a plurality of steps of the stepping motor for printing one dot line, the thermal line head is operated in one step of the plurality of steps, and also that the motor rotation period of the stepping motor for feeding the recording paper is varied in the respective steps. The above driving device enables the suppression of the fluctuation of the motor rotation periods of the stepping motor even under sudden change from numerous segments to the few segments of the thermal line head due to printing contents, whereby the vibration of the stepping motor is suppressed. It also enables higher quality printing having no occurrence of horizontal level difference in printing, and enables high speed printing by correcting a motor rotation period in the respective steps.

Also, a driving device for the thermal line printer in the present invention comprises a dynamically segmenting means for varying the number of segments of a thermal line head in respective dot lines in such a manner that the number of dots printed at one time does not exceed a predetermined maximum number of dots printed by simultaneous application of electricity, pulse width correcting means for correcting pulse width applied to the thermal line head according to the number of the dynamic segmentation of the thermal line head, and motor rotation period determining means for determining a motor rotation period of the stepping motor for feeding recording paper in the present dot line. The motor rotation period determining means makes this determination by taking, after comparison, one of the following: a value computed by correcting a motor rotation period determined in the preceding dot line, a motor rotation period computed based on a pulse width applied to the thermal line head in the present dot line and the number of segments of the thermal line head in the present dot line, a standard motor rotation period stored in advance, and a value computed by correcting a motor rotation period which is obtained based on a pulse width applied to the thermal line head in the coming dot line and the number of segments of the thermal line head in the coming dot line. The above driving device enables the suppression of the fluctuation of the motor rotation periods of the stepping motor even under sudden change from numerous segments to few segments or from few segments to numerous segments of the thermal line head, whereby the vibration of the stepping motor is further suppressed and the vibration noise is further suppressed. The above driving device also enables high speed printing.

Also, it is preferable that the recording paper is fed with a plurality of steps of the stepping motor for printing one dot line, and the thermal line head is operated in the respective steps of the plurality of steps. Also, the motor rotation period of the stepping motor for feeding the recording paper is varied in respective dot lines. The above driving device enables the suppression of the fluctuation of the motor rotation periods of the stepping motor even under sudden change from numerous segments to few segments or from few segments to numerous segments of the thermal line head, whereby the vibration of the stepping motor is suppressed, enables the improvement of the preciseness of the paper feeding pitch of the stepping motor, and also enables dynamically segmenting operation even by using a low cost and small stepping motor by increasing the deceleration ratio of the motor.

It is preferable that the recording paper is fed with a plurality of steps of the stepping motor for printing one dot line, and the thermal line head is operated in the respective steps of the plurality of steps. Also, the motor rotation period of the stepping motor for feeding the recording paper is varied in the respective steps. The above driving device enables the suppression of the fluctuation of the motor rotation periods of the stepping motor even under sudden change from numerous segments to few segments or from few segments to numerous segments of the thermal line head, whereby the vibration of the stepping motor is suppressed, also enables dynamically segmenting operation even by using a low cost and small stepping motor, also enables higher speed printing by correcting motor rotation period in the respective steps.

It is preferable that the recording paper is fed with a plurality of steps of the stepping motor for printing one dot line, and the thermal line head is operated in one step of the plurality of steps. Also, the motor rotation period of the stepping motor for feeding the recording paper is varied in respective dot lines. The above driving device enables the suppression of the fluctuation of the motor rotation periods of the stepping motor even under sudden change from numerous segments to few segments or from few segments to numerous segments of the thermal line head, whereby the vibration of the stepping motor is suppressed. The above driving device also enables higher quality printing having no occurrence of horizontal level difference in printing.

Also it is preferable that the recording paper is fed with a plurality of steps of the stepping motor for printing one dot line, and the thermal line head is operated in one step of the plurality of steps. Also, the motor rotation period of the stepping motor for feeding the recording paper is varied in the respective steps. The above driving device enables the suppression of the fluctuation of the motor rotation periods of the stepping motor even under sudden change from numerous segments to few segments or from few segments to numerous segments of the thermal line head, whereby the vibration of the stepping motor is suppressed. The above driving device also enables higher quality printing having no occurrence of horizontal level difference in printing, and enables higher speed printing by correcting motor rotation period in the respective steps.

Hereinafter, the details of the exemplary embodiments of the present invention are described referring to drawings.

FIRST EXEMPLARY EMBODIMENT

Figure 2:
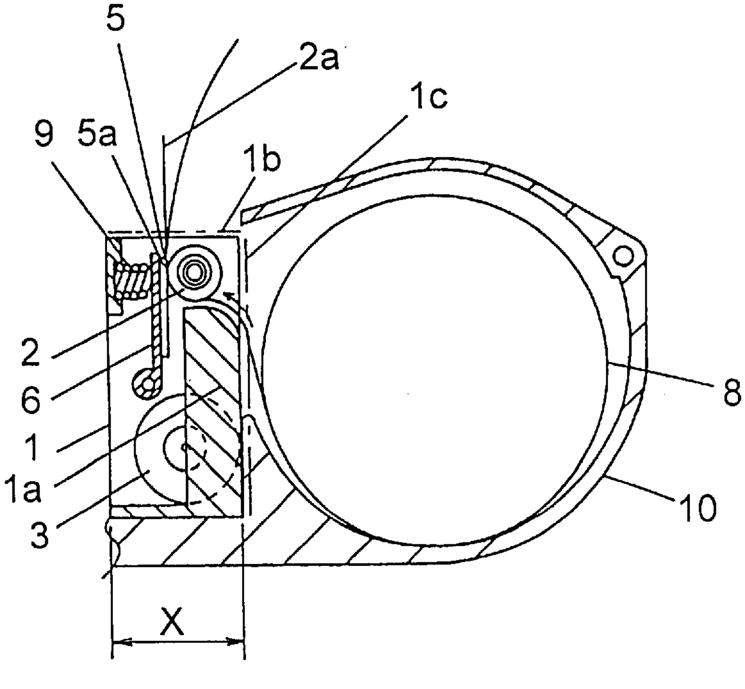
FIG. 2 is a cross sectional view showing the directions of feeding and ejecting a recording paper in the thermal line printer in the first exemplary embodiment.
Figure 3:
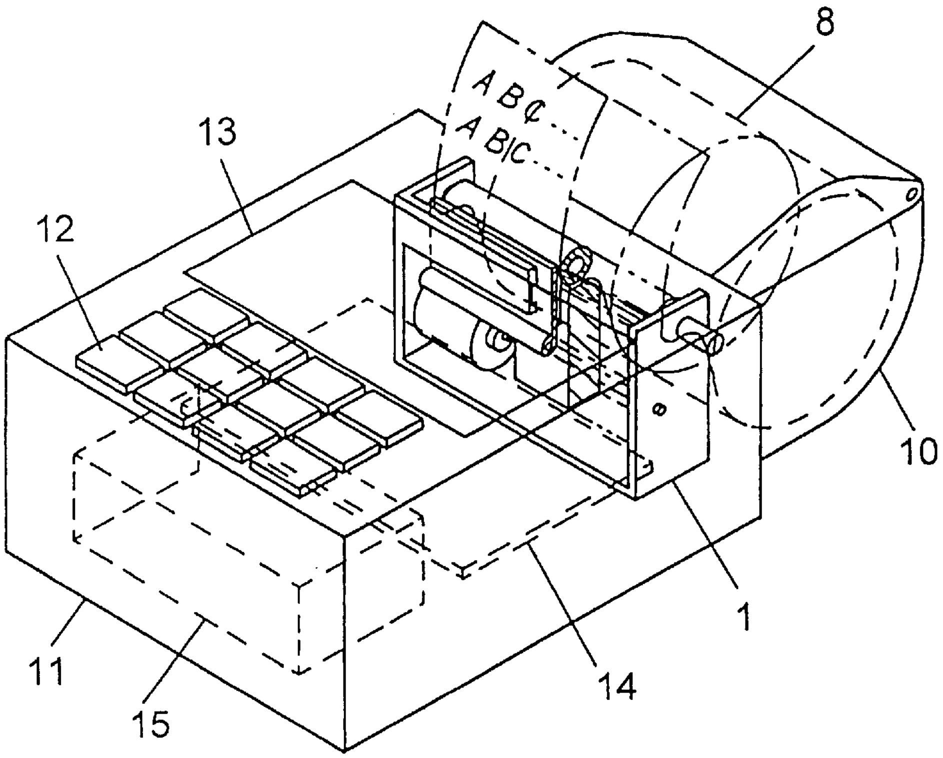
FIG. 3 is a perspective view showing the whole structure of a handy terminal as an example in which the thermal line printer in the first exemplary embodiment is installed.

FIG. 1 is perspective view showing the whole structure of a thermal line printer in a first exemplary embodiment of the present invention. FIG. 2 is a cross sectional view showing the directions of feeding and ejecting recording paper in this exemplary embodiment. FIG. 3 is a perspective view showing the whole structure of a handy terminal as an example, in which the thermal line printer of this exemplary embodiment is installed.

In FIG. 1, a recording paper feeding guide la is disposed in a body chassis 1, a platen roller 2 has a cylindrical shape and is rotatably supported by the body chassis 1. A motor 3 rotates the platen roller 2 and a row of gears 4*a*, 4*b*, 4*c* and 4*d* transmits the rotating force of the motor 3 to the platen roller 2. A row of heaters 5*a* is disposed on a line type thermal head 5, a head supporting unit 6 holds the line type thermal head 5, and is rotatably supported by a shaft 7 disposed in the body chassis 1, a spring 9 presses the row of heaters 5*a* onto the platen roller 2 sandwiching recording paper 8 between the row of heaters 5*a* and the platen roller 2, and a recording paper holder 10 holds the rolled recording paper 8.

Also, as shown in FIG. 2, the head supporting unit 6 holding the line type thermal head 5 is disposed in the body chassis 1 in such a manner that a tangential line 2*a* to the platen roller 2 at a pressed point between the line type thermal head 5 and the platen roller intersects the short side 1*b* of the body chassis 1 in a plane projecting the body chassis 1 along the axial direction of the platen roller 2.

In the thermal line printer having the above structure, the recording paper 8 is fed from the long side 1*c* of the body chassis 1 in a plane projecting the body chassis 1 along the axial direction of the platen roller 2 and ejected from the short side 1*b* as shown in FIG. 2.

Next, the state of installing the thermal line printer of the present invention to a handy terminal as an example is described referring to FIG. 3. In FIG. 3 the thermal line printer is illustrated by solid lines for the convenience of showing the layout of the installation of the printer, though the thermal line printer is actually contained in the body of the handy terminal.

In FIG. 3, the thermal line printer is disposed behind rows of operation keys 12, a display unit 13, a control circuit substrate 14, and power source battery 15, in the body 11 of the handy terminal, and, the rolled recording paper is disposed at the back end. The recording paper is ejected upward after printing as shown in FIG. 3.

As described in the above, the thermal line printer of this exemplary embodiment enables the decrease of the dimension of depth (i.e., dimension of X in FIG. 2) of the thermal line printer. It also enables the user to easily see the state of printing, and enables the decrease of the size of the apparatus in which the thermal line printer is installed.

SECOND EXEMPLARY EMBODIMENT

Figure 4:
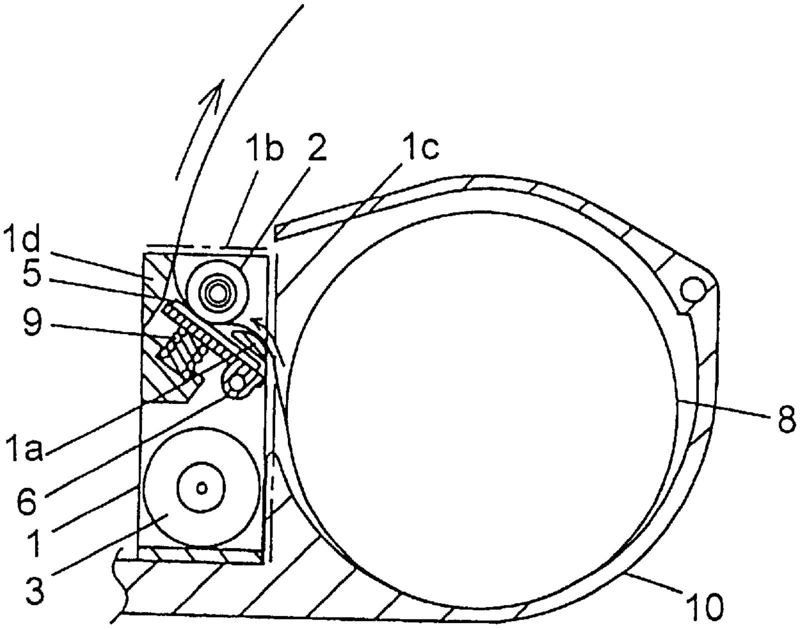
FIG. 4 is a cross sectional view showing the structure of a thermal line printer in a second exemplary embodiment of the present invention, also showing the directions of feeding and ejecting a recording paper.

FIG. 4 is a cross sectional view showing the structure of a thermal line printer in a second exemplary embodiment of the present invention, also showing the directions of feeding and ejecting recording paper.

In FIG. 4, a recording paper ejecting guide Id, which is a portion of the body chassis of the thermal line printer, guides the recording paper 8, which comes out through a pressed portion between the line type thermal head 5 and the platen roller 2, to the short side 1*b* of the body chassis in a plane projecting the body chassis 1 along the axial direction of the platen roller 2. That is, as in the first exemplary embodiment, the recording paper 8 is fed from the long side 1*c* and ejected from the short side 1*b* of the body chassis in the same projecting plane.

In the second exemplary embodiment, the recording paper can be fed from and ejected to the same directions as in the first exemplary embodiment. That is, the printed recording paper 8 is ejected from the upper side in the same manner as in the first exemplary embodiment and does not fall down, due to gravity, towards the user's side, whereby the user can see the state of printing.

In this exemplary embodiment, the recording paper ejecting guide is described as a portion of the body chassis. However, it is needless to say that the same effect can be obtained by forming the guide in such a manner as to mount a separate unit to the body chassis.

THIRD EXEMPLARY EMBODIMENT

Figure 5:
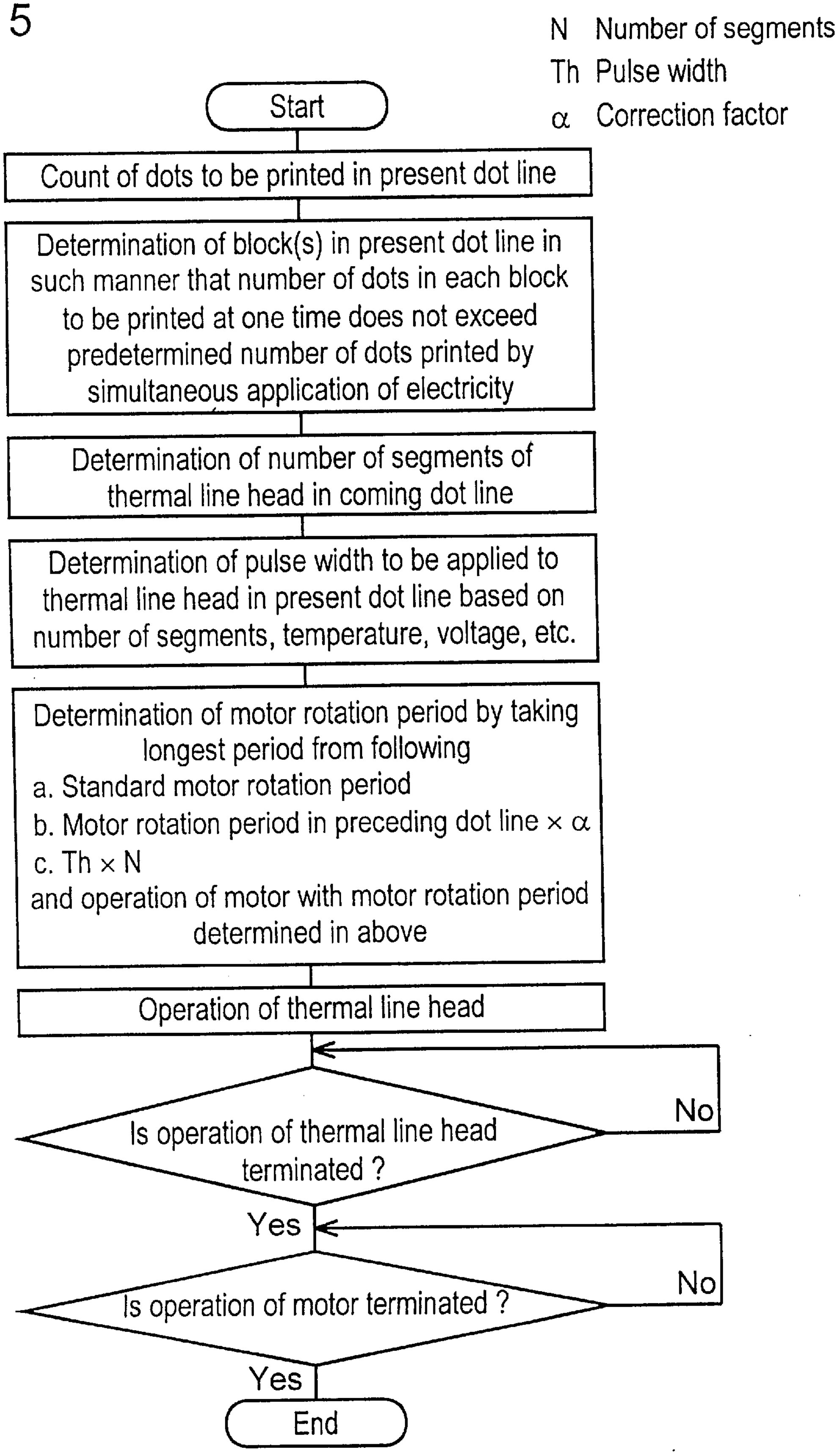
FIG. 5 is a flow chart showing the operation of printing one dot line by a driving device for thermal line printer in a third exemplary embodiment.
Figure 6:
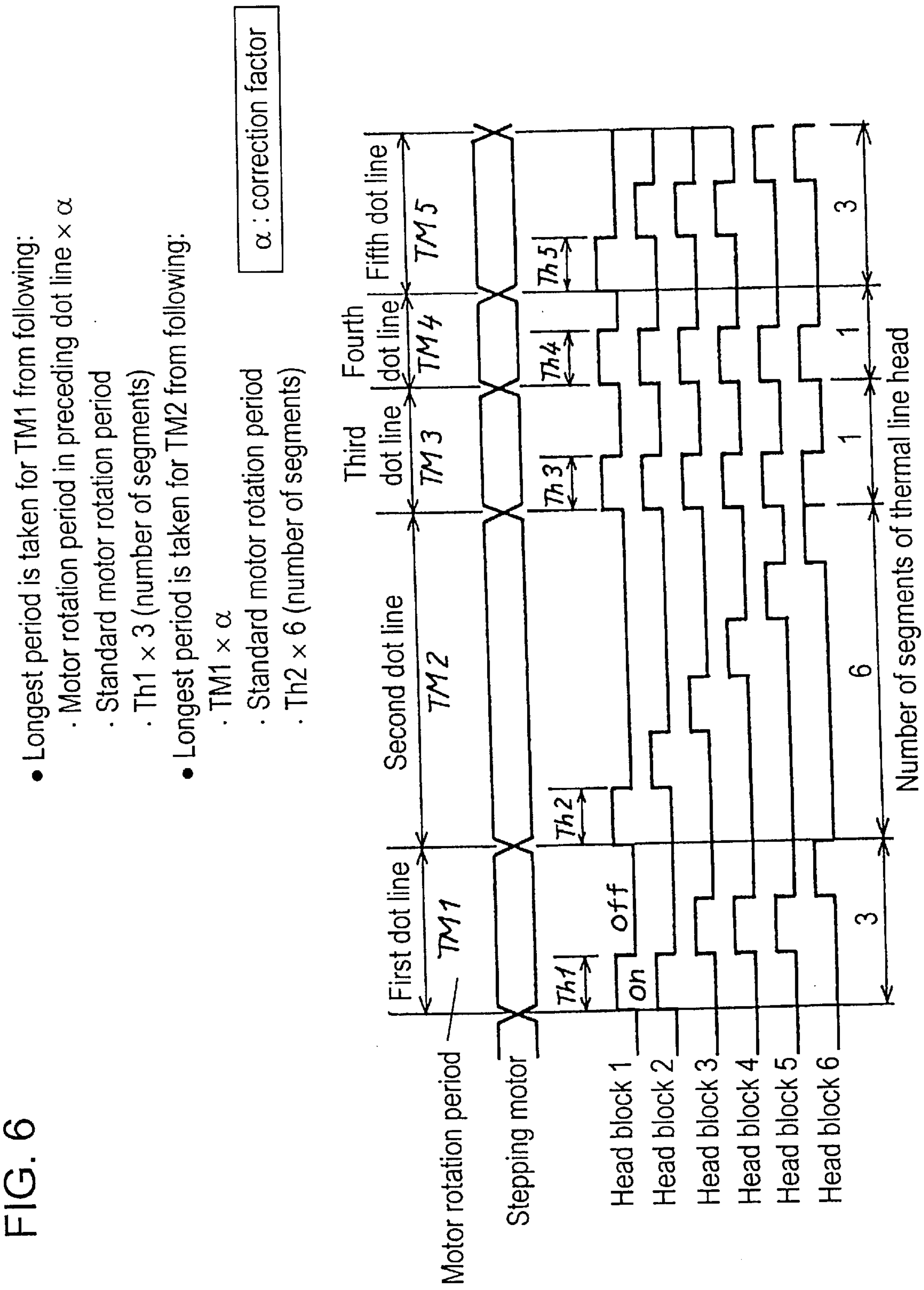
FIG. 6 is a timing chart showing an example of operation in the third exemplary embodiment.
Figure 7:
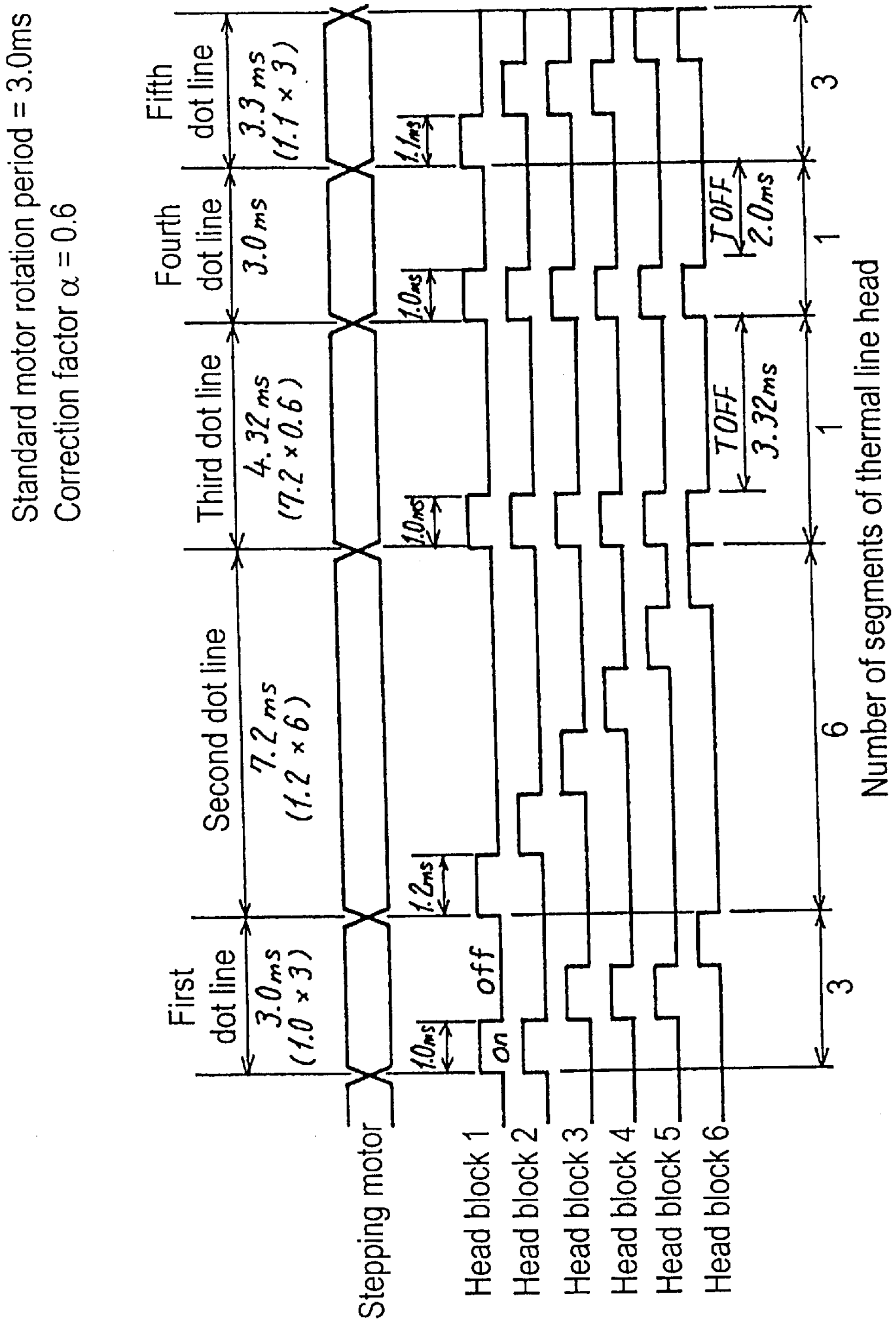
FIG. 7 is a timing chart showing an example of operation in the third exemplary embodiment, FIGS. 8A and B are a flow chart showing the operation of printing one dot line by a driving device for a thermal line printer in a fourth exemplary embodiment of the present invention.

FIG. 5 is a flow chart showing the operation of printing one dot line by a driving device for a thermal line printer in a third exemplary embodiment of the present invention. FIG. 6 and FIG. 7 show an example of the timing chart of the operation in this exemplary embodiment.

The operation of this exemplary embodiment is described referring to FIG. 5, FIG. 6, and FIG. 7.

The driving device of this exemplary embodiment performs a dynamically segmenting operation. That is, a block to be printed at one time is dynamically varied according to the number of dots to be printed per line for reducing the size of a power source and for increasing printing speed. As shown in FIG. 5, the number of dots to be printed in the present dot line is counted at first, and a block to be printed at one time by the thermal line head is determined in such a manner that the number of dots in each block does not exceed a predetermined maximum number of dots printed by simultaneous application of electricity.

Next, the number of segments N of the thermal line head for printing one dot line is determined, and a pulse width Th applied to the thermal line head is determined based on parameters such as the above number of segments, the temperature of the thermal line head, voltage applied to the thermal line head and us the like.

Then a rotation period of the stepping motor for feeding the recording paper in the present dot line is determined by taking the longest period from the following: a value computed by correcting a motor rotation period determined in the preceding dot line (a value multiplied by a correction factor a), a motor rotation period computed based on the pulse width applied to the thermal line head in the present dot line and the number of segments of the thermal line head in the present dot line, and a standard motor rotation period (ultimate period for continuous running of the motor) stored in advance. The correction factor a is not smaller than zero but not larger than one.

Lastly, the stepping motor is operated with the motor rotation period determined in the above, and the thermal line head is also operated. FIG. 6 is a timing chart showing the above operation for five dot lines.

FIG. 7 shows an example of a timing chart in which numerical values are put in for further explanation on the above operation.

A motor rotation period in a first dot line is determined to be 3.0 ms by taking the longest period from the following: a value computed by multiplying the motor rotation period in the preceding dot line (4.0 ms in this example) by a correction factor ($\alpha$=0.6) (i.e., 4.0×0.6=2.4 ms), a standard motor rotation period (3.0 ms), and a value computed by multiplying a pulse width (Th=1.0 ms) by the number of segments (N=3) of the thermal line head (i.e., 1.0×3=3.0 ms).

A motor rotation period in a second dot line is determined to be 7.2 ms by taking the longest period from the following: a value (1.8 ms) computed by multiplying the motor rotation period (3.0 ms) in the preceding dot line by the correction factor ($\alpha$=0.6), the standard motor rotation period (3.0 ms), and a value (7.2 ms) computed by multiplying a pulse width (Th=1.2 ms) applied to the thermal line head by the number of segments (N=6). A motor rotation period in a third dot line is determined to be 4.32 ms by taking the longest period from the following: a value (4.32 ms) computed by multiplying the motor rotation period (7.2 ms) in the preceding dot line by the correction factor ($\alpha$=0.6), the standard motor rotation period (3.0 ms), and a value (1.0 ms) computed by multiplying a pulse width (Th=1.0 ms) by the number of segment (N=1). Further motor rotation periods are determined in such a manner as described in the above.

The driving device for a thermal line printer described in the above enables the suppression of the fluctuation of the motor rotation period of the stepping motor even under sudden change from the numerous segments to the few segments of the thermal line head due to the printing contents without setting the standard motor rotation period at a value which is unnecessarily large, whereby the vibration of the stepping motor is suppressed. The driving device also enables the prevention of occurrence of the step out, and enables high speed printing.

In the above description, the number of segments of the thermal line head is varied between one and six for the convenience of showing the operation by illustrations. However, the number of segments is varied between one and some tens to some hundreds in practical use. When the number of segments is larger, a larger effect is obtained in this exemplary embodiment.

FOURTH EXEMPLARY EMBODIMENT

Figure 8A:
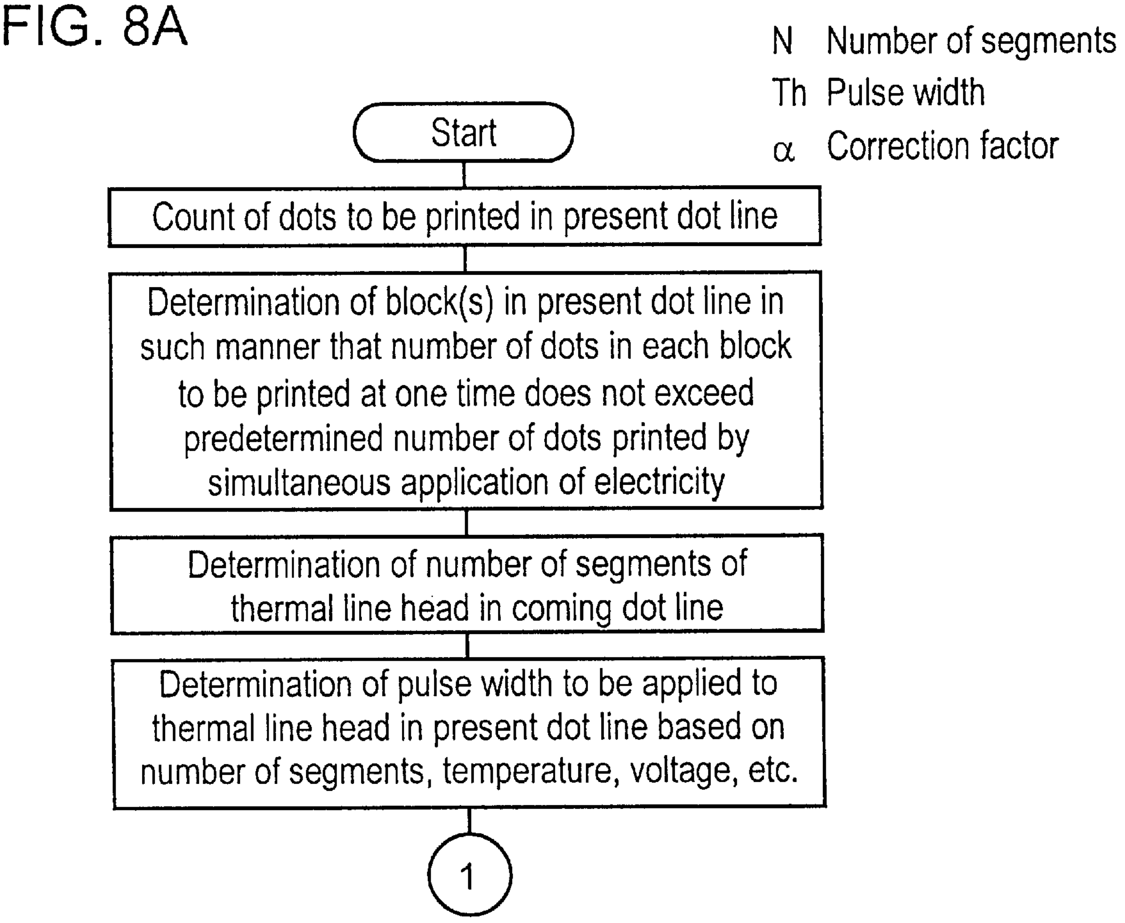
Figure 8B:
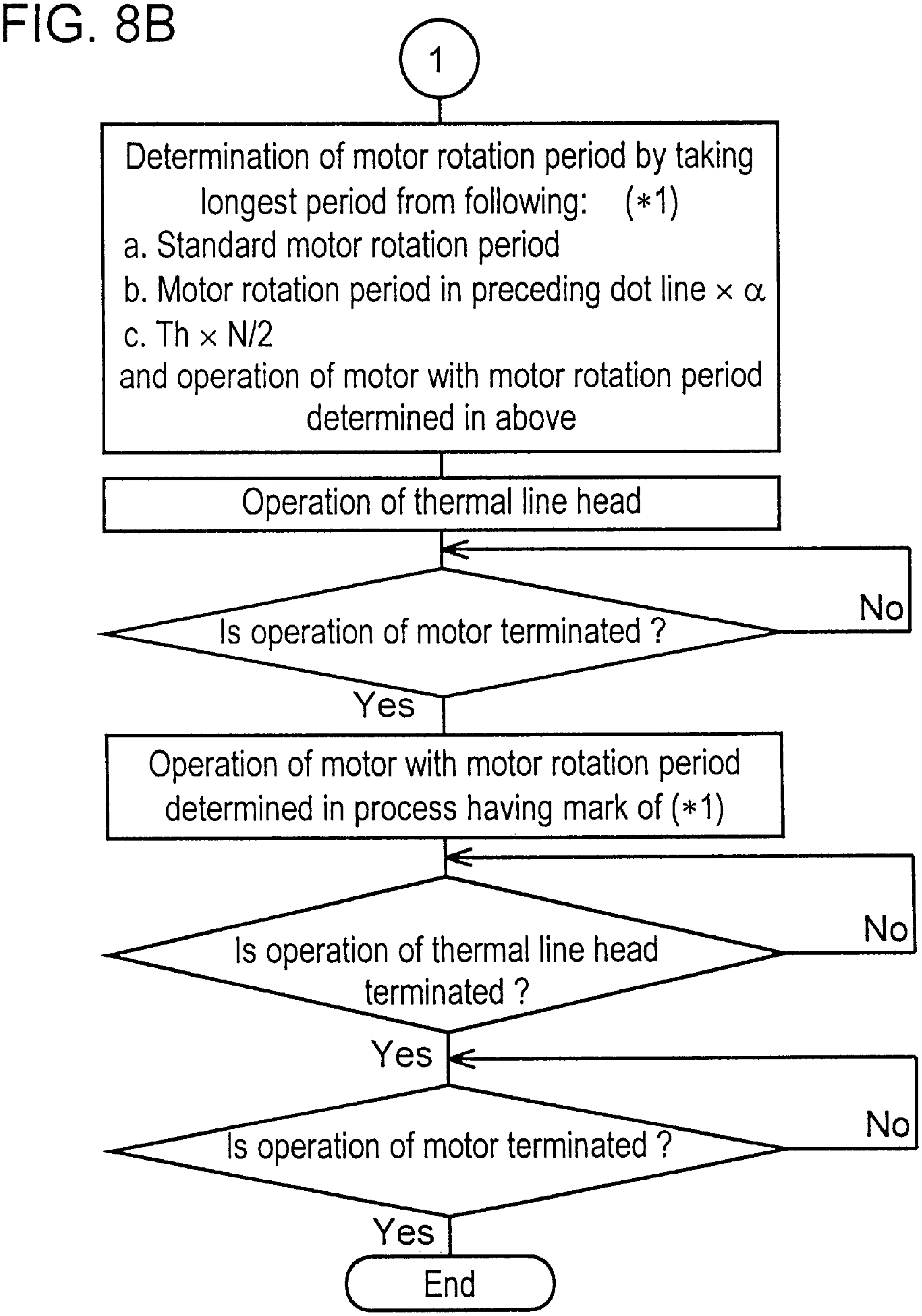
Figure 9:
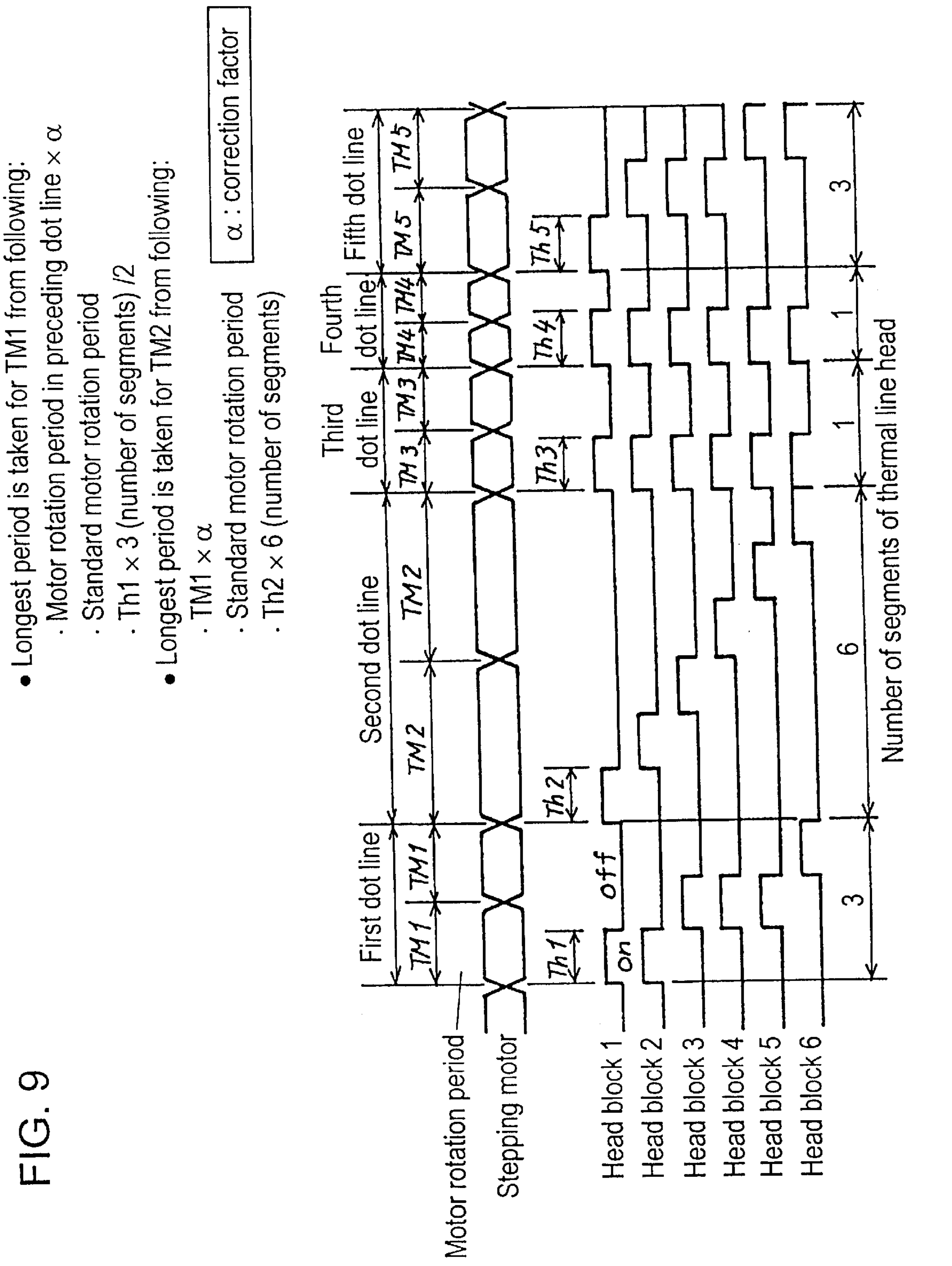
FIG. 9 is a timing chart showing an example of operation in the fourth exemplary embodiment.
Figure 10:
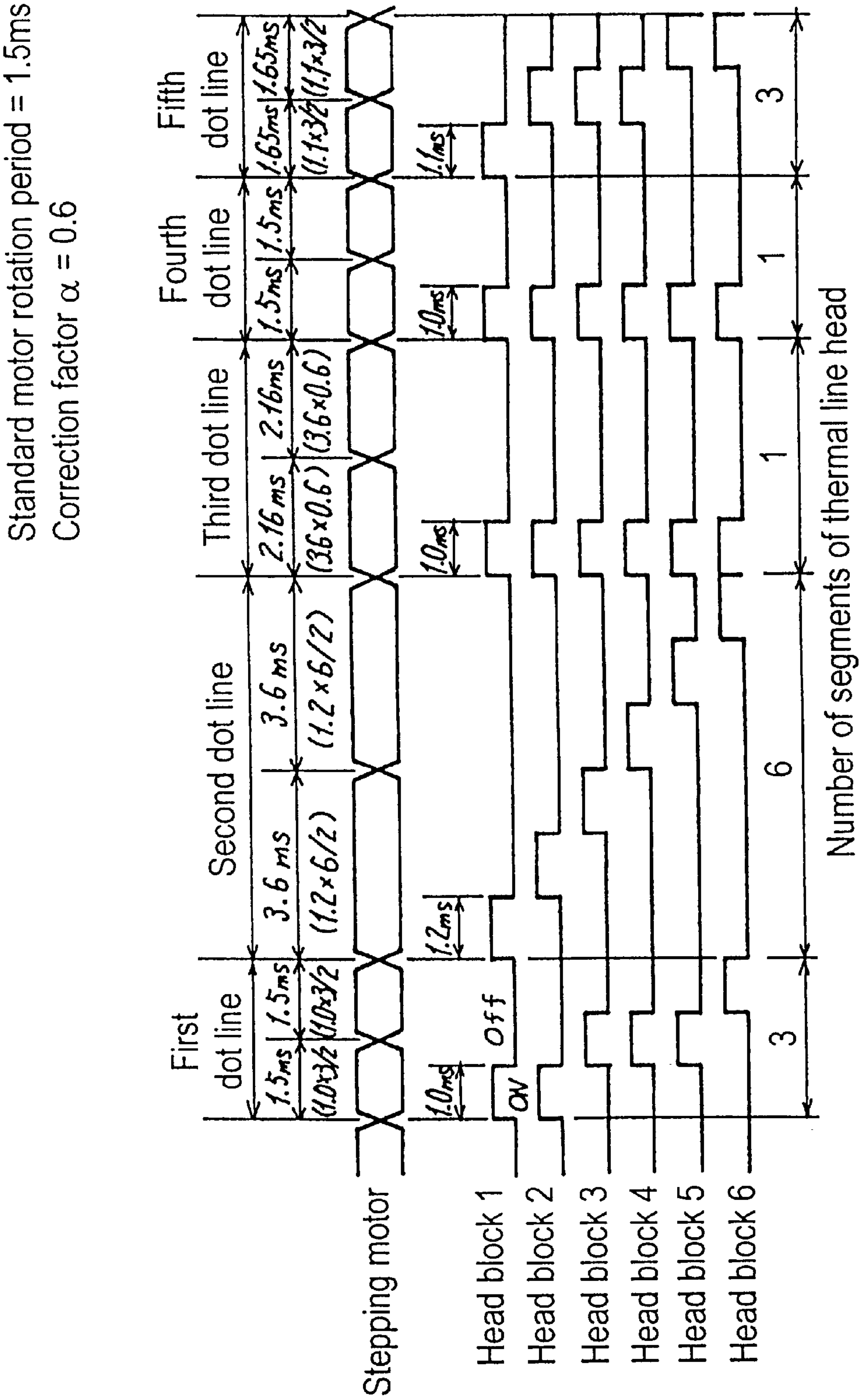
FIG. 10 is a timing chart showing an example of operation in the fourth exemplary embodiment, FIGS. 11B and B are a flow chart showing the operation of printing one dot line by a driving device for a thermal line printer in a fifth exemplary embodiment of the present invention.

FIGS. 8A and B are a flow chart showing the operation for printing one dot line by a driving device for a thermal line printer in a fourth exemplary embodiment of the present invention. FIG. 9 and FIG. 10 show an example of the timing chart of the operation in this exemplary embodiment.

The operation of this exemplary embodiment is described hereinafter referring to FIGS. 8A and B, FIG. 9, and FIG. 10.

The driving device for thermal line printer performs a dynamically segmenting operation. That is, a block to be printed is dynamically varied according to the number of dots to be printed for reducing the size of the power source and for increasing printing speed. As shown in FIGS. 8A and B, the number is of dots to be printed in the present dot line is counted at first, and a block to be printed at one time by the thermal line head is determined in such a manner that the number of dots in each block does not exceed a predetermined maximum number of dots printed by simultaneous application of electricity.

Next, the number of segments N of the thermal line head necessary for printing one dot line is determined, and a pulse width Th applied to the thermal line head is determined based on parameters such as the above number of segments, the temperature of the thermal line head, voltage applied to the thermal line head and the like.

Then the rotation period of the stepping motor for feeding the recording paper in the present dot line is determined by taking, after comparison, the longest period from the following: a value computed by correcting a motor rotation period determined in the preceding dot line (a value multiplied by a correction factor $\alpha$), a motor rotation period computed based on the pulse width applied to the thermal line head in the present dot line and the number of segments of the thermal line head in the present dot line, and a standard motor rotation period (ultimate period for continuous running of the motor) stored in advance. The correction factor is not smaller than zero but not larger one.

Then the stepping motor is operated with the motor rotation period determined in the above as a first step in the present dot line. Also, the thermal line head is operated. After the operation of the stepping motor is over, the stepping motor is operated again with the motor rotation period determined in the above as a second step in one dot line. FIG. 9 is a timing chart showing the above operation for five dot lines.

FIG. 10 shows an example of a timing chart in which numerical values are put in for further explanation on the above operation. A motor rotation period in a first dot line is determined to be 1.5 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by dividing a value, which is obtained by multiplying a pulse width (Th=1.0 ms) applied to the thermal line head by the number of segments (N=3), by two(i.e., 1.0×3/2=1.5 ms).

A motor rotation period in a second dot line is determined to be 3.6 ms by taking the longest period from the following: a value (0.9 ms) computed by multiplying the motor rotation period (1.5 ms) in the preceding dot line by the correction factor ($\alpha$=0.6), a standard motor rotation period (1.5 ms), and a value (3.6 ms) computed by dividing a value, which is obtained by multiplying a pulse width (Th=1.2 ms) applied to the thermal line head by the number of segments (N=6), by two.

A motor rotation period in a third dot line is determined to be 2.16 ms by taking the longest period from the following: a value (2.16 ms) computed by multiplying the motor rotation period (3.6 ms) in the preceding dot line by the correction factor ($\alpha$=0.6), the standard motor rotation period (1.5 ms), and a value (0.5 ms) computed by dividing a value, which is obtained by multiplying the pulse width (Th=1.0 ms) applied to the thermal line head by the number of segment (N=1), by two. Further motor rotation periods are determined in such a manner as described in the above.

The driving device described in the above enables the suppression of the fluctuation of the motor rotation periods of the stepping motor even under sudden change from the numerous segments to the few segments of the thermal line head due to printing contents without setting the standard motor rotation period at a value which is unnecessarily large, whereby the vibration of the stepping motor is suppressed. The driving device also enables printing without occurrence of the step out, enables the improvement of the preciseness of the paper feeding pitch of the stepping motor by printing one dot line with a plurality of steps of the stepping motor, and enables the use of a low cost and small stepping motor by increasing the deceleration ratio.

In the above description, the number of segments of the thermal line head is varied between one and six for the convenience of showing the operation by illustrations. However, the number of segments is varied between one and some tens to some hundreds in practical use. When the number of segments is larger, a larger effect is obtained in this exemplary embodiment.

FIFTH EXEMPLARY EMBODIMENT

Figure 11A:
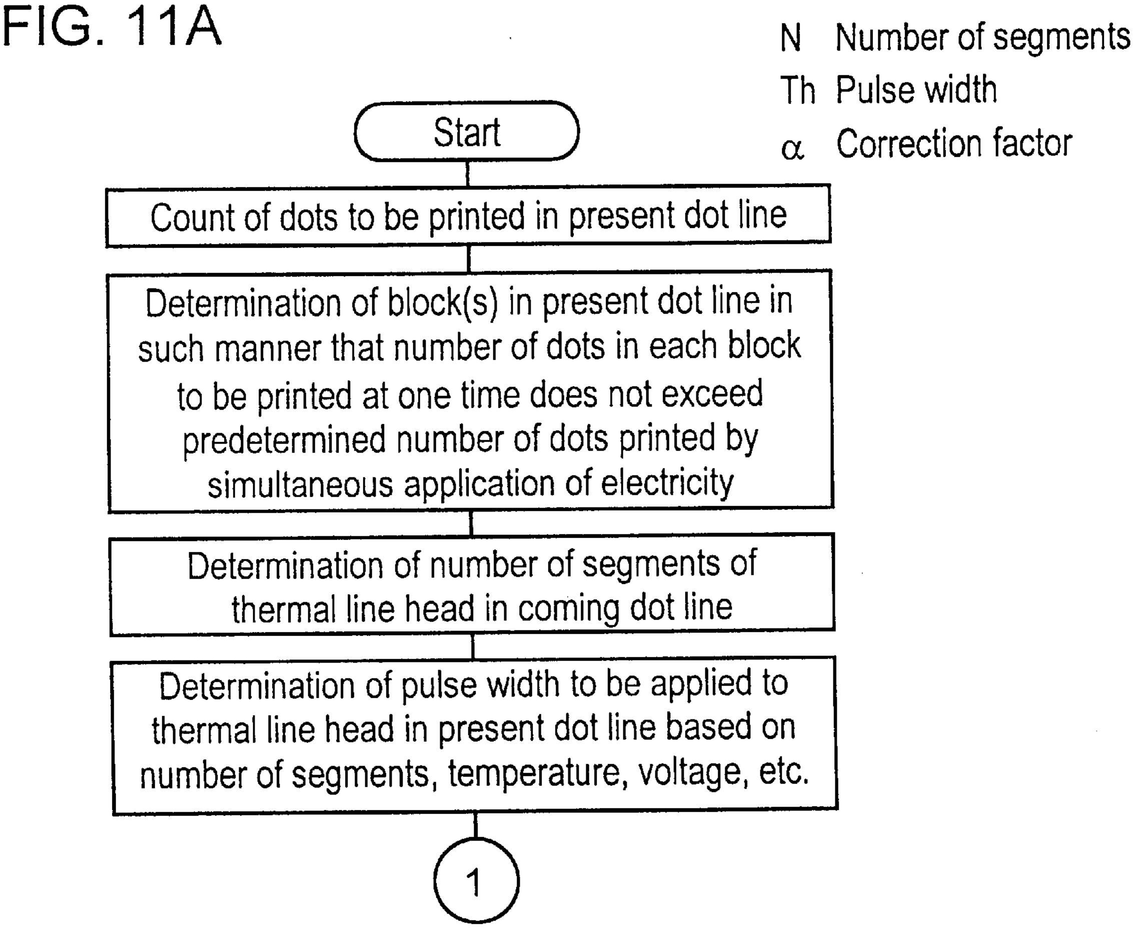
Figure 12:
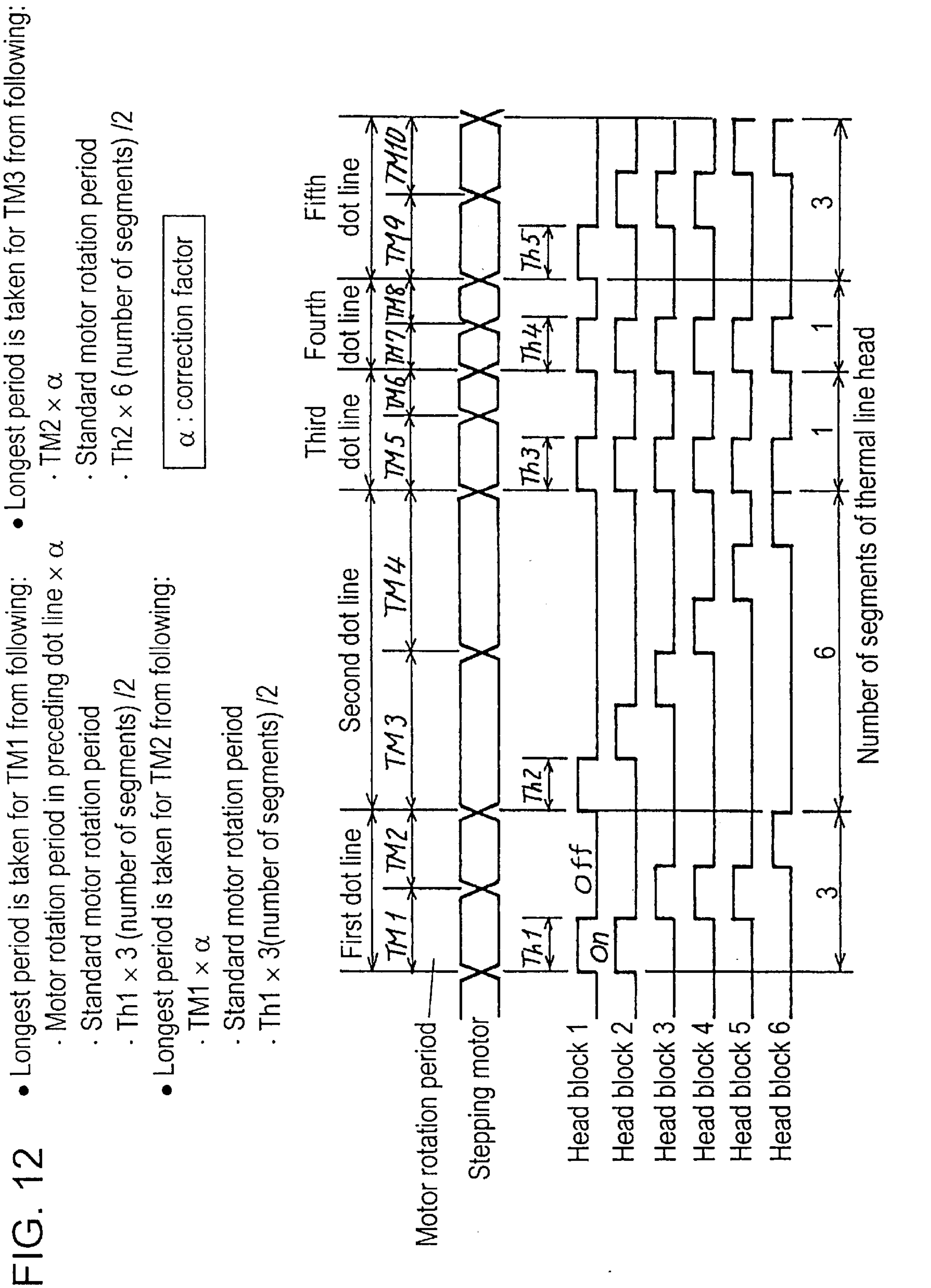
FIG. 12 is a timing chart showing an example of operation in the fifth exemplary embodiment.
Figure 13:
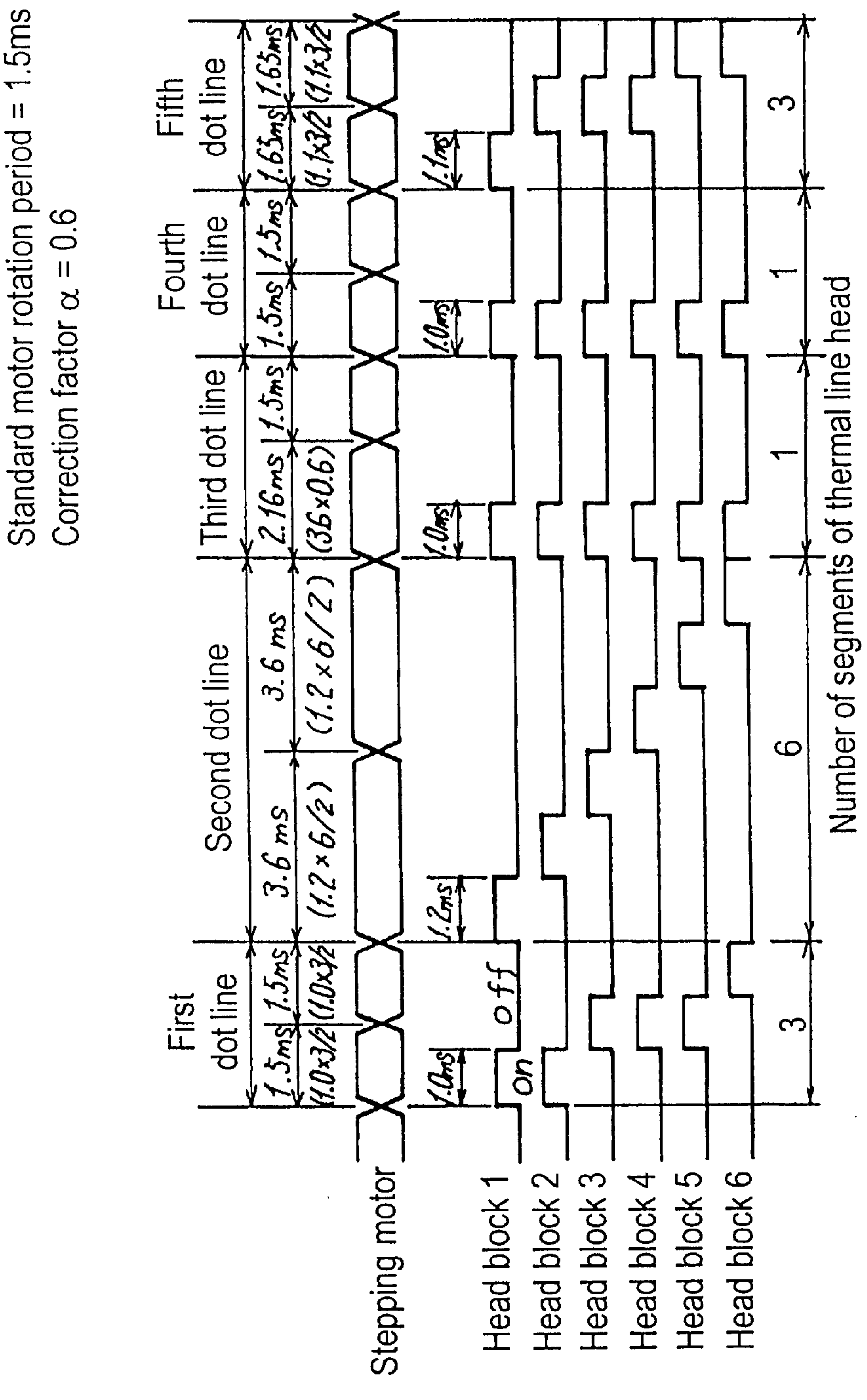
FIG. 13 is a timing chart showing an example of operation in the fifth exemplary embodiment, FIGS. 14A and B are a flow chart showing the operation of printing one dot line by a driving device for a thermal line printer in a sixth exemplary embodiment of the present invention.

FIGS. 11A and B are a flow chart showing an operation for printing one dot line by a driving device for a thermal line printer in a fifth exemplary embodiment of the present invention. FIG. 12 and FIG. 13 show an example of the timing chart of the operation in this exemplary embodiment.

Figure 11B:
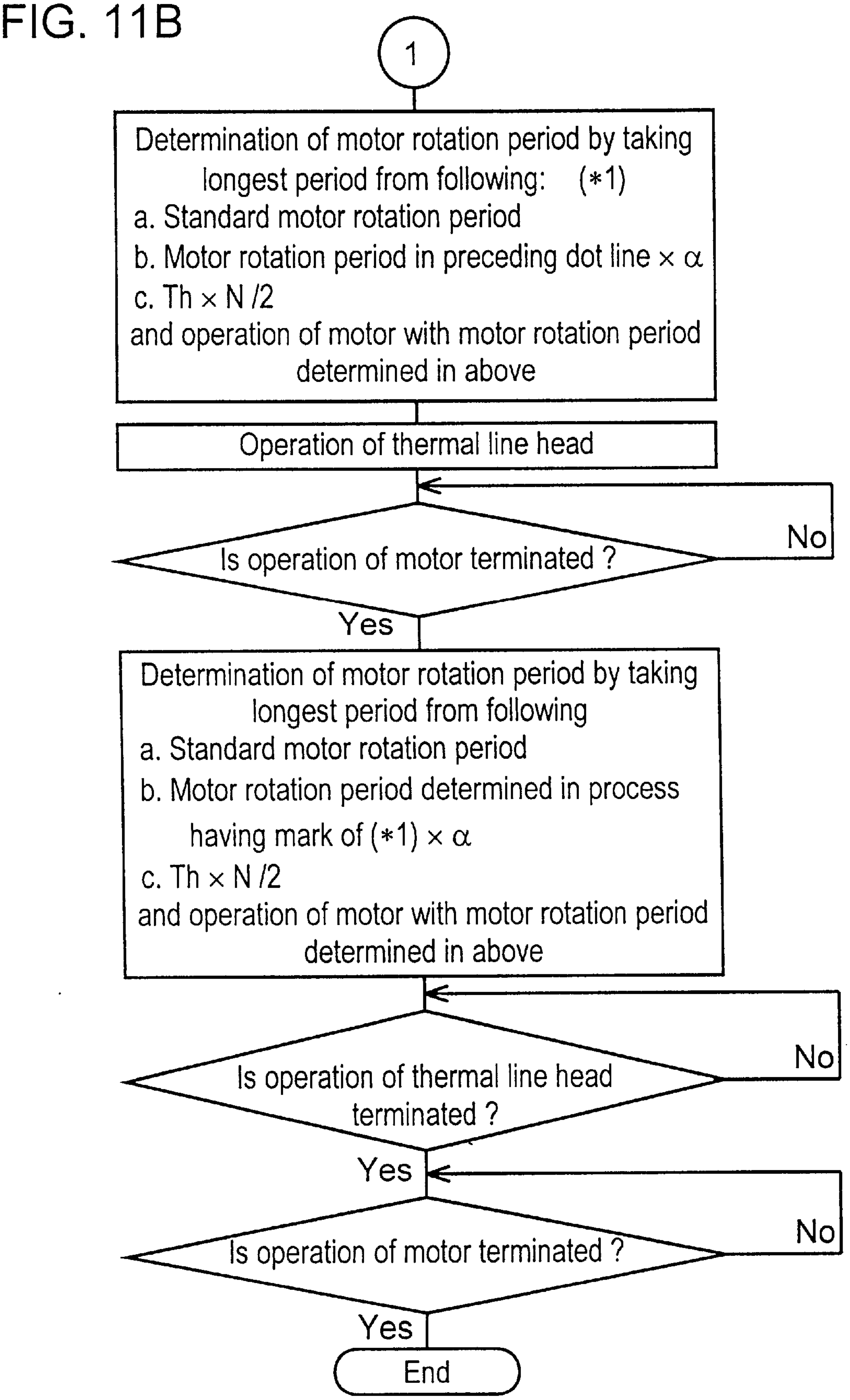

Hereinafter the operation of this exemplary embodiment is described referring to FIGS. 11 A and B, FIG. 12, and FIG. 13.

The driving device for a thermal line printer performs a dynamically segmenting operation. That is, a block to be printed is dynamically varied according to the number of dots to be printed, for reducing the size of power source and for increasing printing speed. As shown in FIGS. 11A and B, the number of dots to be printed in the present dot line is counted at first, and a block to be printed at one time by the thermal line head is determined in such a manner that the number of dots does not exceed a predetermined maximum number of dots printed by simultaneous application of electricity.

Next, the number of segments N of the thermal line head necessary for printing one dot line is determined, and a pulse width Th applied to the thermal line head is determined based on parameters such as the above number of segments, the temperature of the thermal line head, voltage applied to the thermal line head and the like.

Then a rotation period of the stepping motor for feeding the recording paper in the present dot line is determined by taking, after comparison, the longest period from the following: a value computed by correcting a motor rotation period determined in the preceding dot line (a value multiplied by a correction factor $\alpha$), a motor rotation period computed based on the pulse width applied to the thermal line head in the present dot line and the number of segments of the thermal line head in the present dot line, and a standard motor rotation period (ultimate period for continuous running of the motor) stored in advance. The correction factor a is not smaller than zero but not larger one Then the stepping motor is operated with the motor rotation period determined in the above as a first step in one dot line. Also the thermal line head is operated. After the operation of the stepping motor is over, a motor rotation period in a second step in one dot line is newly determined by comparison, and the motor is operated with the motor rotation period newly determined. The motor rotation period in the second step is determined by taking, after comparison, the longest period from the following: a value computed by correcting the preceding motor rotation period (a value multiplied by the correction factor $\alpha$), a motor rotation period computed based on a pulse width applied to the thermal line head in the present dot line and the number of segments of the thermal line head in the present dot line, and the standard motor rotation period (ultimate period for continuous running of the motor) stored in advance. FIG. 12 is a timing chart showing the above operation for five dot lines.

FIG. 13 shows an example of the timing chart in which numerical values are put in for further explanation of the above operation. The motor rotation period in a first step of a first dot line is determined to be 1.5 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by dividing a value, which is obtained by multiplying a pulse width (Th=1.0 ms) applied to the thermal line head by the number of segments (N=3), by two (i.e., 1.0×3/2=1.5 ms).

A motor rotation period in a second step in the first dot line is determined to be 1.5 ms by taking the longest period from the following: a value (0.9 ms) computed by multiplying the preceding motor rotation period (1.5 ms) by the correction factor (α=0.6), the standard motor rotation period (1.5 ms), and a value (1.5 ms) computed by dividing a value, which is obtained by multiplying a pulse width (Th =1.0 ms) applied to the thermal line head by the number of segments (N=3), by two. A motor rotation period in a first step of a second dot line is determined to be 3.6 ms by taking the longest period from the following: a value (0.9 ms) computed by multiplying the preceding motor rotation period (1.5 ms) by the correction factor (α=0.6), the standard motor rotation period (1.5 ms), and a value (3.6 ms) computed by dividing a value, which is obtained by multiplying a pulse width (Th=1.2 ms) applied to the thermal line head by the number of segments (N=6), by two. Further motor rotation periods are determined by comparison in such a manner as described in the above.

The driving device for a thermal line printer described in the above enables the suppression of the fluctuation of the motor rotation period even under sudden change from the numerous segments to the few segments of the thermal line head due to printing contents without setting a standard motor rotation period at a value which is unnecessarily large, whereby the vibration of the stepping motor is suppressed. The driving device also enables printing without occurrence of the step out, enables the improvement of the preciseness of paper feeding pitch of the stepping motor by constituting the printing of one dot line with a plurality of steps of the stepping motor, enables the use of a lower cost and smaller stepping motor by increasing the deceleration ratio of the motor, and enables high speed printing by correcting motor rotation period in respective steps.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

SIXTH EXEMPLARY EMBODIMENT

Figure 14A:
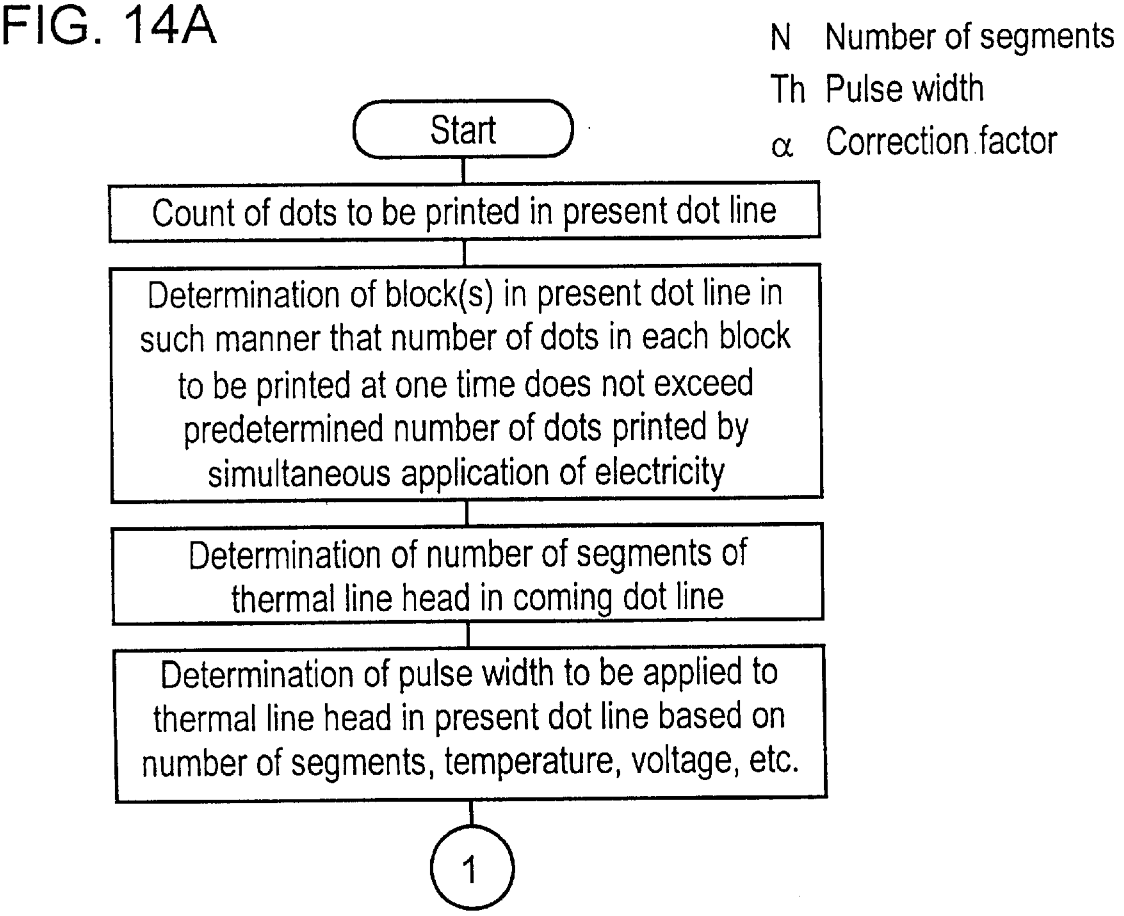
Figure 14B:
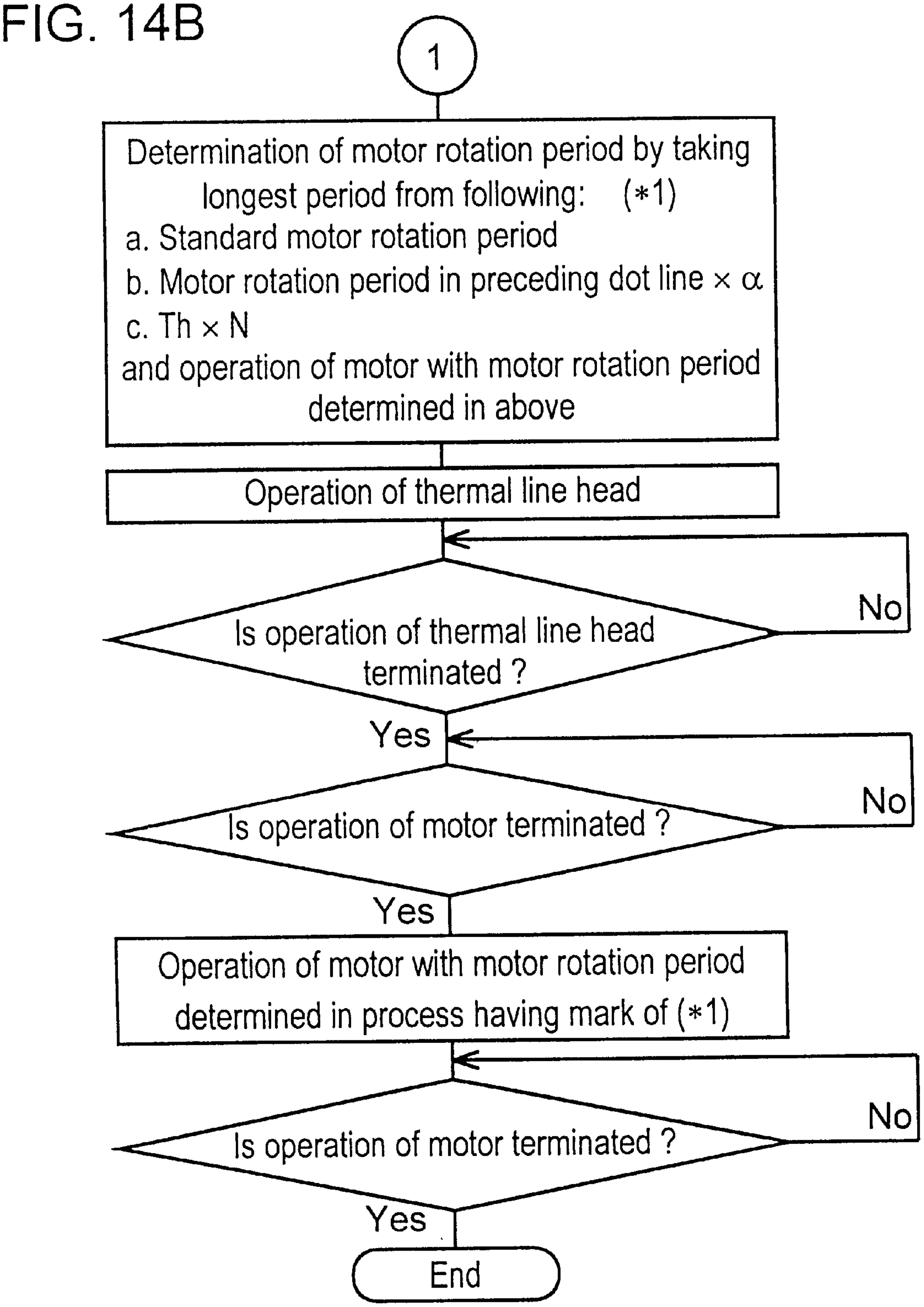
Figure 15:
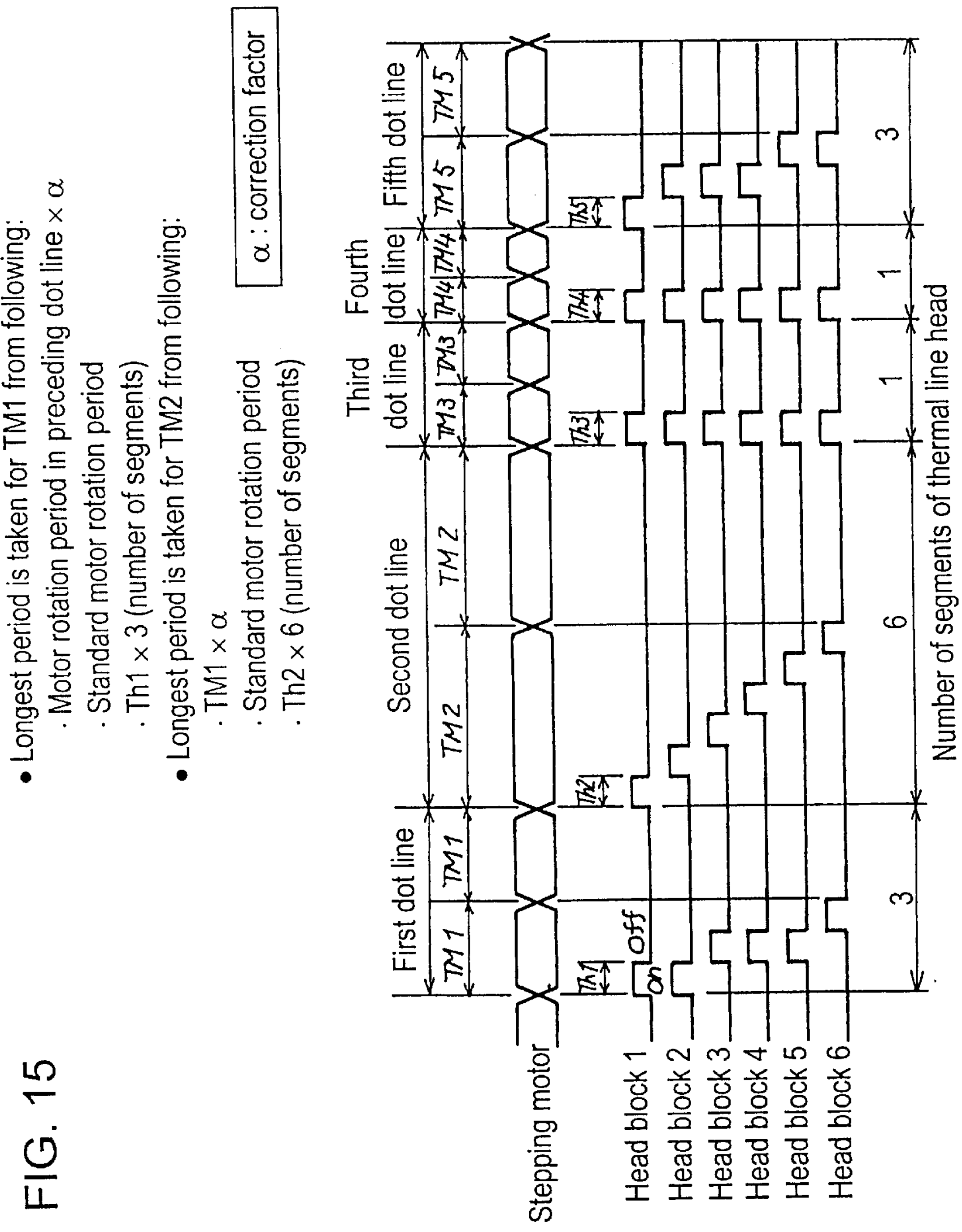
FIG. 15 is a timing chart showing an example of operation in the sixth exemplary embodiment.
Figure 16:
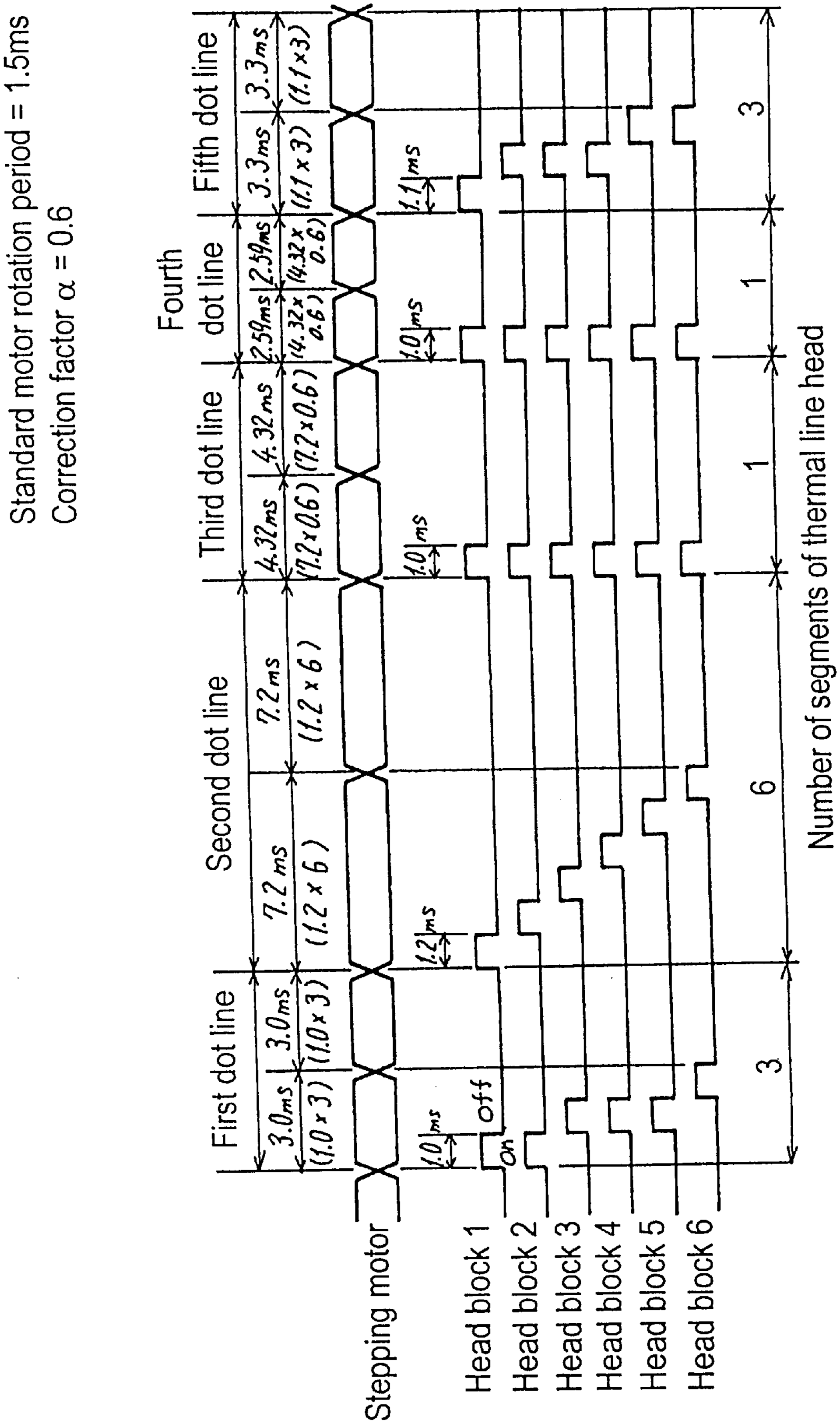
FIG. 16 is a timing chart showing an example of operation in the sixth exemplary embodiment, FIGS. 17A and B are a flow chart showing the operation of printing one dot line by a driving device for a thermal line printer in a seventh exemplary embodiment of the present invention.

FIGS. 14A and B are a flow chart showing an operation for printing one dot line by a driving device for a thermal line printer in a sixth exemplary embodiment of the present invention. FIG. 15 and FIG. 16 show an example of the timing chart of the operation in this exemplary embodiment.

Hereinafter the operation of this exemplary embodiment is described referring to FIGS. 14A and B, FIG. 15, and FIG. 16.

The driving device for a thermal line printer performs a dynamically segmenting operation. That is, a block to be printed is dynamically varied according to the number of dots to be printed for reducing the size of power source and for increasing printing speed. As shown in FIGS. 14A and B, the number of dots to be printed in the present dot line is counted at first, and a block to be printed at one time by the thermal line head is determined in such a manner that the number of dots in each block does not exceed a predetermined maximum number of dots printed by simultaneous application of electricity.

Next, the number of segments N of the thermal line head necessary for printing one dot line is determined, and, a pulse width Th applied to the thermal line head is determined based on parameters such as the above number of segments, the temperature of the thermal line head, voltage applied to the thermal line head and the like.

Then a rotation period of the stepping motor for feeding the recording paper in the present dot line is determined by taking, after comparison, the longest period from the following: a value computed by correcting a motor rotation period determined in the preceding dot line (a value multiplied by a correction factor α), a motor rotation period computed based on the pulse width applied to the thermal line head in the present dot line and the number of segments of the thermal line head in the present dot line, and a standard rotation period (ultimate period for continuous running of the motor) stored in advance. The correction factor α is not smaller than zero but not larger one.

Then, as a first step in one dot line, the stepping motor is operated with the motor rotation period determined in the above, also the thermal line head is operated. After the operation of the thermal line head and the stepping motor is over, the stepping motor is operated again with the above motor rotation period as a second step in one dot line. FIG. 15 is a timing chart showing the above operation for five dot lines.

FIG. 16 shows an example of the timing chart in which numerical values are put in for firther explanation on the above operation. A motor rotation period in a first dot line is determined to be 3.0 ms by taking the longest period from the following: a value computed by multiplying a motor rotation period in the preceding dot line (2.0 ms in this example) by a correction factor (α=0.6) (i.e., 2.0×0.6=1.2 ms), a standard motor rotation period (1.5 ms), and a value computed by multiplying a pulse width (Th=1.0 ms) applied to the thermal line head by the number of segments (N=3) (i.e., 1.0×3 3.0 ms).

A motor rotation period in a second dot line is determined to be 7.2 ms by taking the longest period from the following: a value (1.8 ms) computed by multiplying the preceding motor rotation period (3.0 ms) by the correction factor (α=0.6), the standard motor rotation period (1.5 ms), and a value (7.2 ms) computed by multiplying a pulse width (Th=1.2 ms) applied to the thermal line head by the number of segments (N=6). A motor rotation period in a third dot line is determined to be 4.32 ms by taking the longest period from the following: a value (4.32 ms) computed by multiplying the preceding motor rotation period (7.2 ms) by the correction factor (α=0.6), the standard motor rotation period (1.5 ms), and a value (1.0 ms) computed by multiplying a pulse width (Th=1.0 ms) applied to the thermal line head by the number of segment (N=1). Further motor rotation periods are determined by comparison in such a manner as described in the above.

The driving device for the thermal line printer described in the above enables the suppression of the fluctuation of the motor rotation period of the stepping motor even under sudden change from the numerous segments to the few segments of the thermal line head due to printing contents without setting the standard motor rotation period at a value which is unnecessarily large, whereby the vibration of the stepping motor is suppressed. The driving device also enables printing without occurrence of the step out, enables the improvement of the preciseness of the paper feeding pitch of the stepping motor by constituting the printing of one dot line with a plurality of steps of the stepping motor, enables the use of a low cost and small stepping motor by increasing the deceleration ratio, and enables higher quality printing having no occurrence of horizontal level difference in printing by completing the printing of one dot line in one step of a plurality of steps of the stepping motor.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

SEVENTH EXEMPLARY EMBODIMENT

Figure 17A:
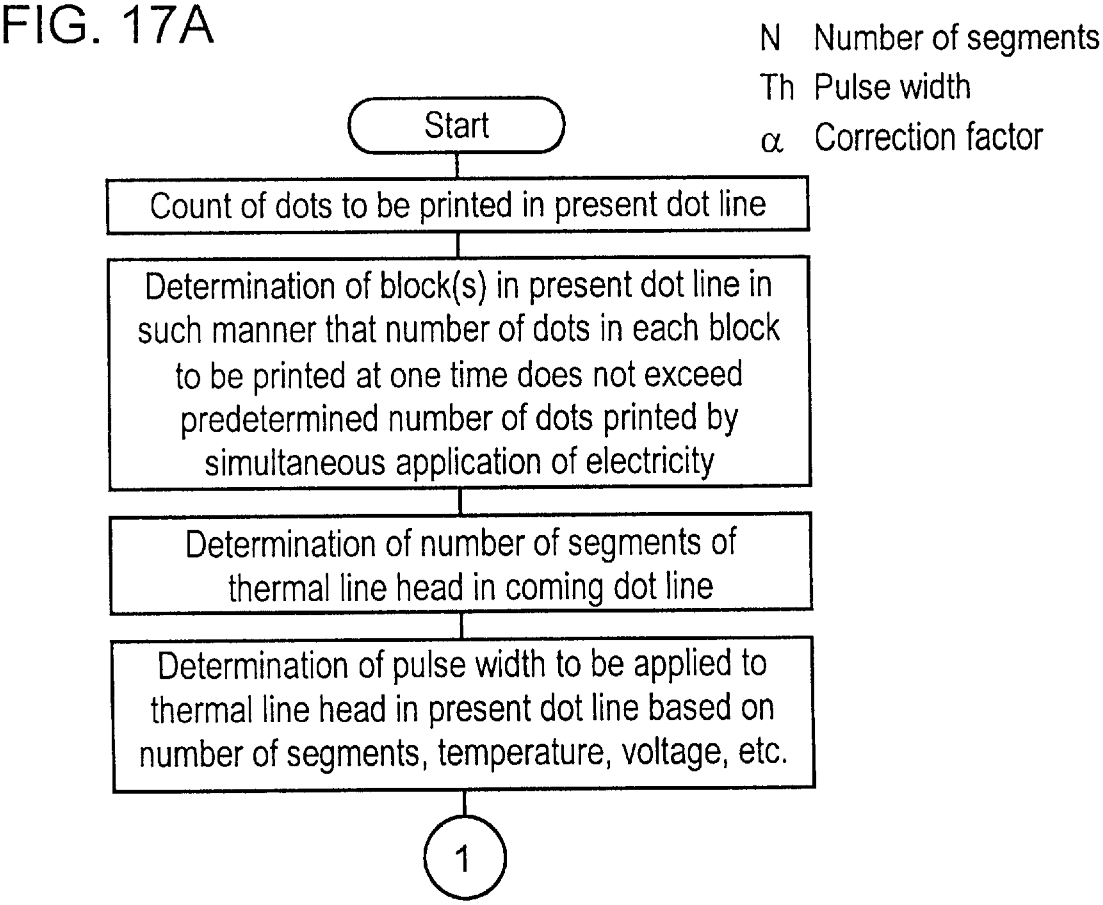
Figure 17B:
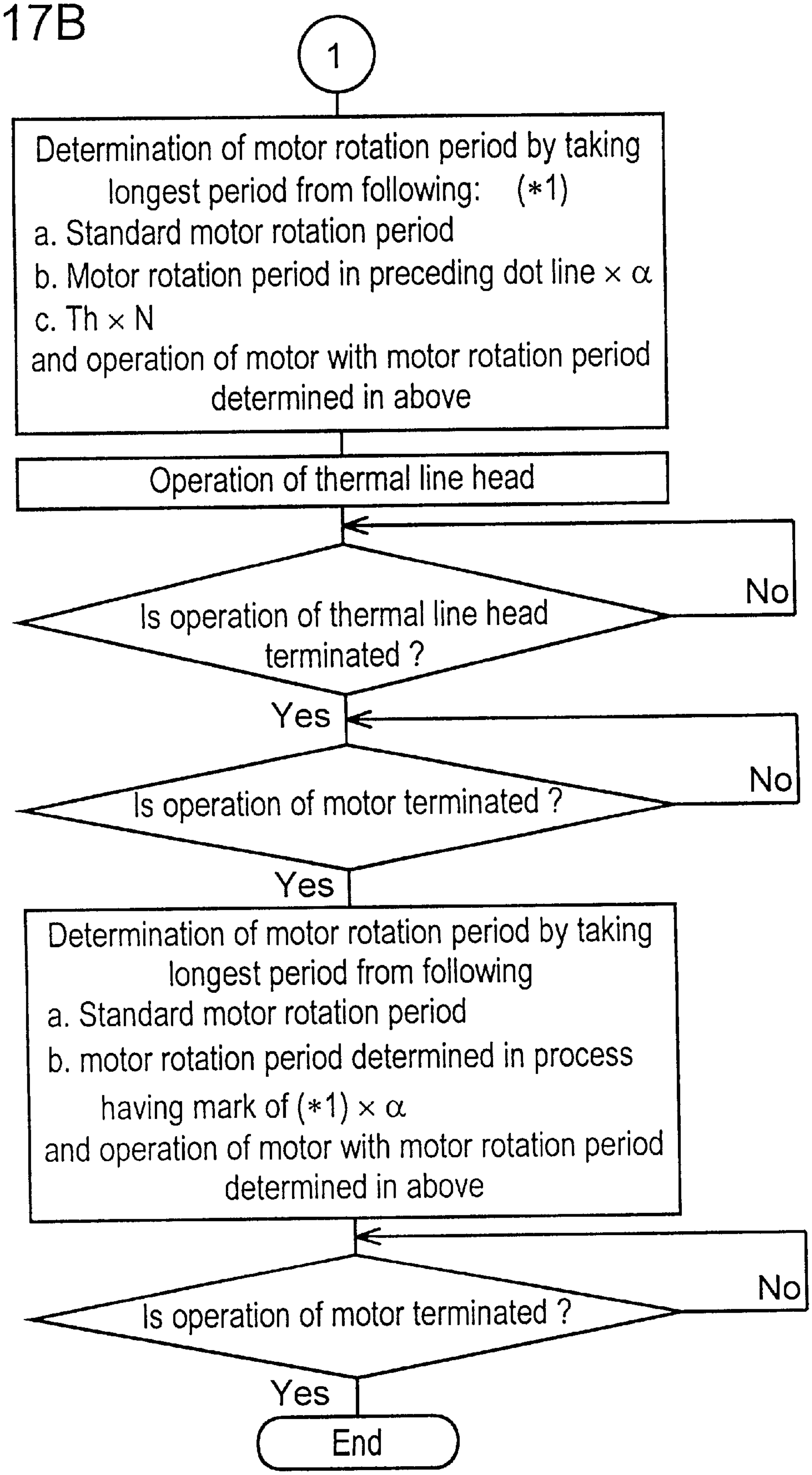
Figure 18:
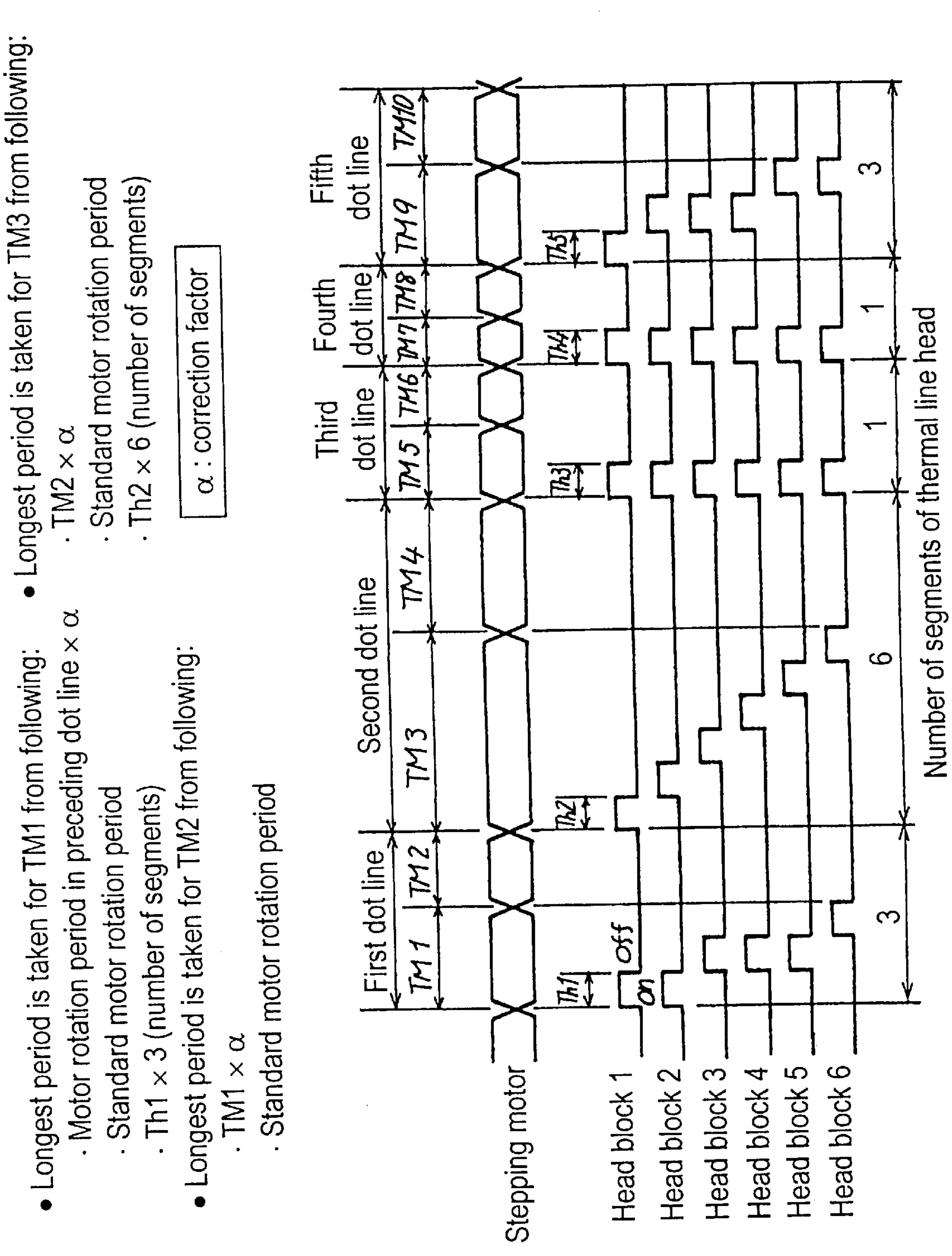
FIG. 18 is a timing chart showing an example of operation in the seventh exemplary embodiment.
Figure 19:
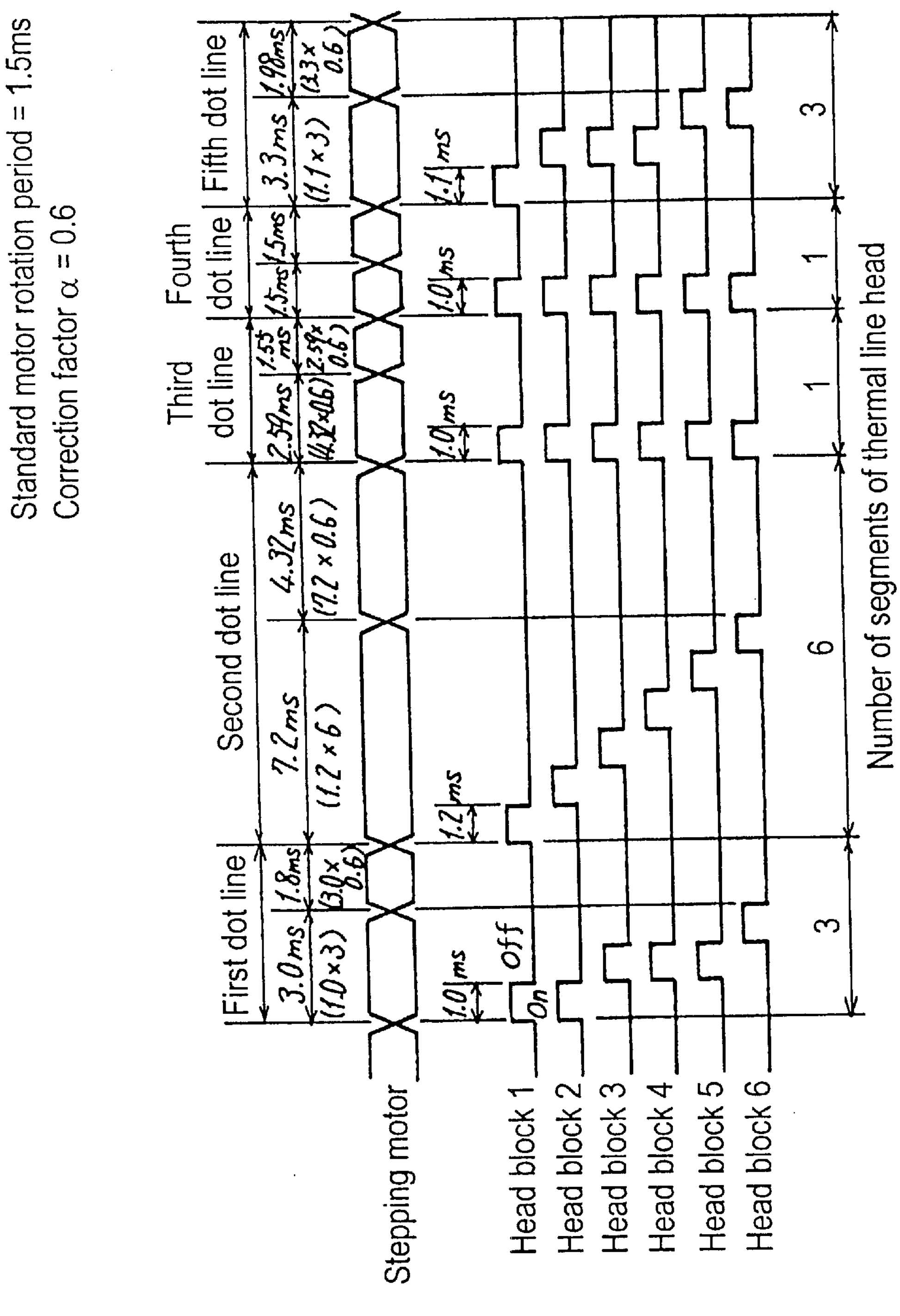
FIG. 19 is a timing chart showing an example of operation in the seventh exemplary embodiment, FIGS. 20A and B are a flow chart showing the operation of printing one dot line by a driving device for a thermal line printer in a eighth exemplary embodiment of the present invention.

FIGS. 17A and B are a flow chart showing an operation for printing one dot line by a driving device for a thermal line printer in a seventh exemplary embodiment of the present invention. FIG. 18 and FIG. 19 show an example of the timing chart of the operation in this exemplary embodiment.

Hereinafter the operation of this exemplary embodiment is described referring to FIGS. 17A and B, FIG. 18, and FIG. 19.

The driving device for a thermal line printer performs a dynamically segmenting operation. That is, a block to be printed is dynamically varied according to the number of dots to be printed, for reducing the size of power source and for increasing printing speed. As shown in FIGS. 17A and B, the number of dots to be printed in the present dot line is counted at first, and a block to be printed at one time by the thermal line head is determined in such a manner that the number of dots does not exceed a predetermined maximum number of dots printed by simultaneous application of electricity.

Next, the number of segments N of the thermal line head necessary for printing one dot line is determined and a pulse width Th applied to the thermal line head is determined based on parameters such as the above number of segments, the temperature of the thermal line head, voltage applied to the thermal line head and the like.

Then a rotation period of the stepping motor for feeding the recording paper in the present dot line is determined by taking, after comparison, the longest period from the following: a value computed by correcting a motor rotation period determined in the preceding dot line (a value multiplied by a correction factor $\alpha$), a motor rotation period computed based on the pulse width applied to the thermal line head in the present dot line and the number of segments of the thermal line head in the present dot line, and a standard motor rotation period (ultimate period for continuous running of the motor) stored in advance. The correction factor a is not smaller than zero but not larger one.

Then, as a first step in one dot line, the stepping motor is operated with the motor rotation period determined in the above, and the thermal line head is also operated. After the operation of the thermal line head and the stepping motor is over, a motor rotation period in a second step in one dot line is newly determined by comparison and the motor is operated with the motor rotation period newly determined. The motor rotation period in the second step is determined by taking the longer period from the following, after a comparison: a value computed by correcting the preceding motor rotation period (a value multiplied by the correction factor $\alpha$), and a standard motor rotation period (ultimate period for continuous running of the motor) stored in advance. FIG. 18 is a timing chart showing the above operation for five dot lines.

FIG. 19 shows an example of a timing chart in which numerical values are put in for further explanation on the above operation. A motor rotation period in a first step in a first dot line is determined to be 3.0 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by multiplying a pulse width (Th=1.0 ms) applied to the thermal line head by the number of segments (N=3) (i.e., 1.0×3=3.0 ms).

A motor rotation period in a second step in the first dot line is determined to be 1.8 ms by taking the longer period from the following: a value (1.8 ms) computed by multiplying the preceding motor rotation period (3.0 ms) by the correction factor ($\alpha$=0.6), and the standard motor rotation period (1.5 ms).

A motor rotation period in a second step in a second dot line is determined to be 7.2 ms by taking the longest period from the following: a value (1.08 ms) computed by multiplying the preceding motor rotation period (1.8 ms) by the correction factor ($\alpha$=0.6), the standard motor rotation period (1.5 ms), and a value (7.2 ms) computed by multiplying a pulse width (Th=1.2 ms) applied to the thermal line head by the number of segments (N=6). Further motor rotation periods are determined by comparison in such a manner as described in the above.

The driving device for a thermal line head described in the above enables the suppression of the fluctuation of the motor rotation period of the stepping motor even under sudden change from the numerous segments to the few segments of the thermal line head due to printing contents without setting the standard motor rotation period at a value which is unnecessarily large, whereby the vibration of the stepping motor is suppressed. The driving device also enables printing without occurrence of the step out, enables the improvement of the preciseness of the paper feeding pitch of the stepping motor by constituting the printing of one dot line with a plurality of steps of the stepping motor, enables the use of a low cost and small stepping motor by increasing the deceleration ratio, enables higher quality printing having no occurrence of the horizontal level difference in printing by completing the printing of one dot line in one step of the plurality of steps of the stepping motor, and enables high speed printing by correcting the motor rotation period in the respective steps.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

EIGHTH EXEMPLARY EMBODIMENT

Figure 20A:
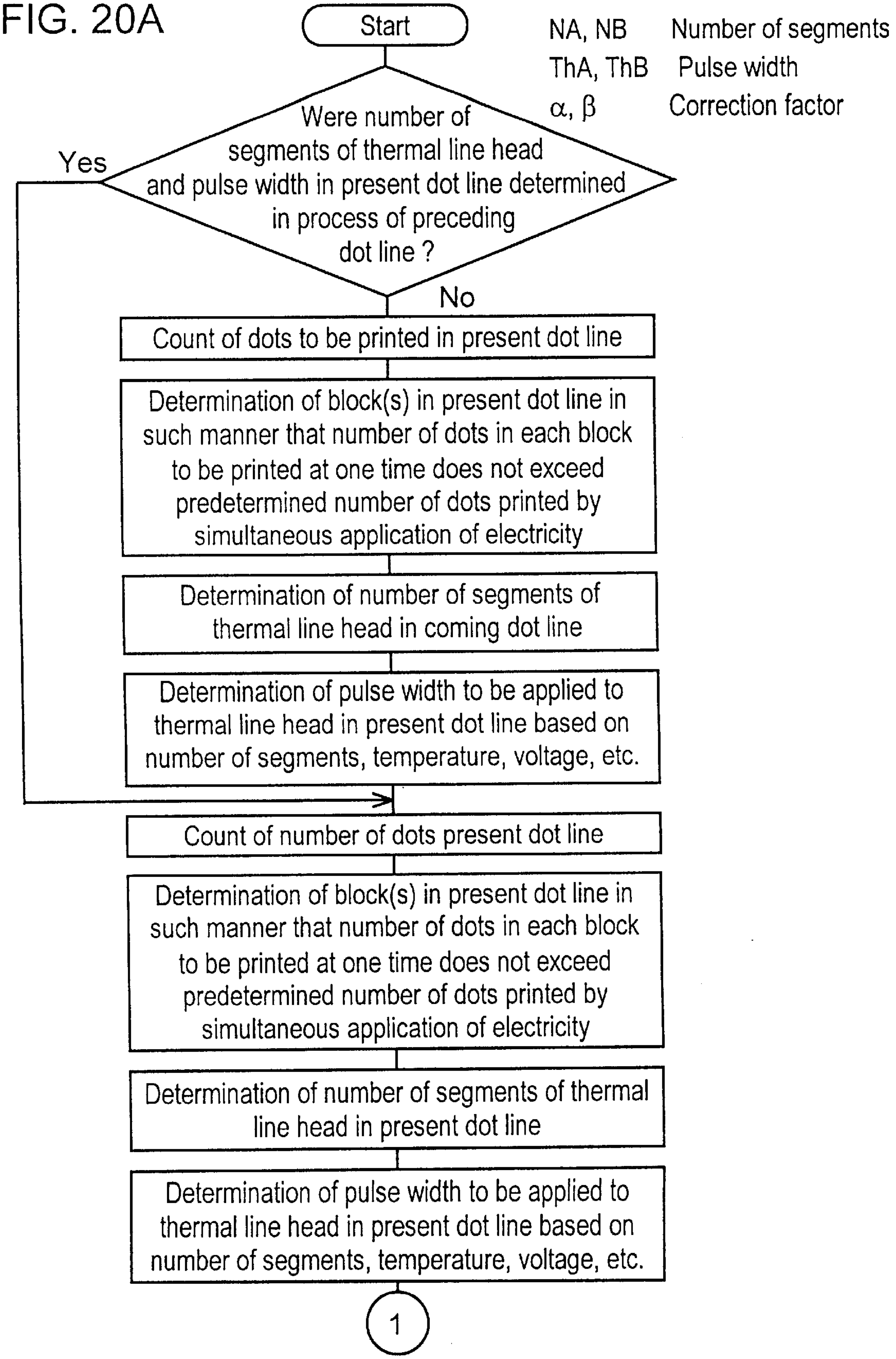
Figure 20B:
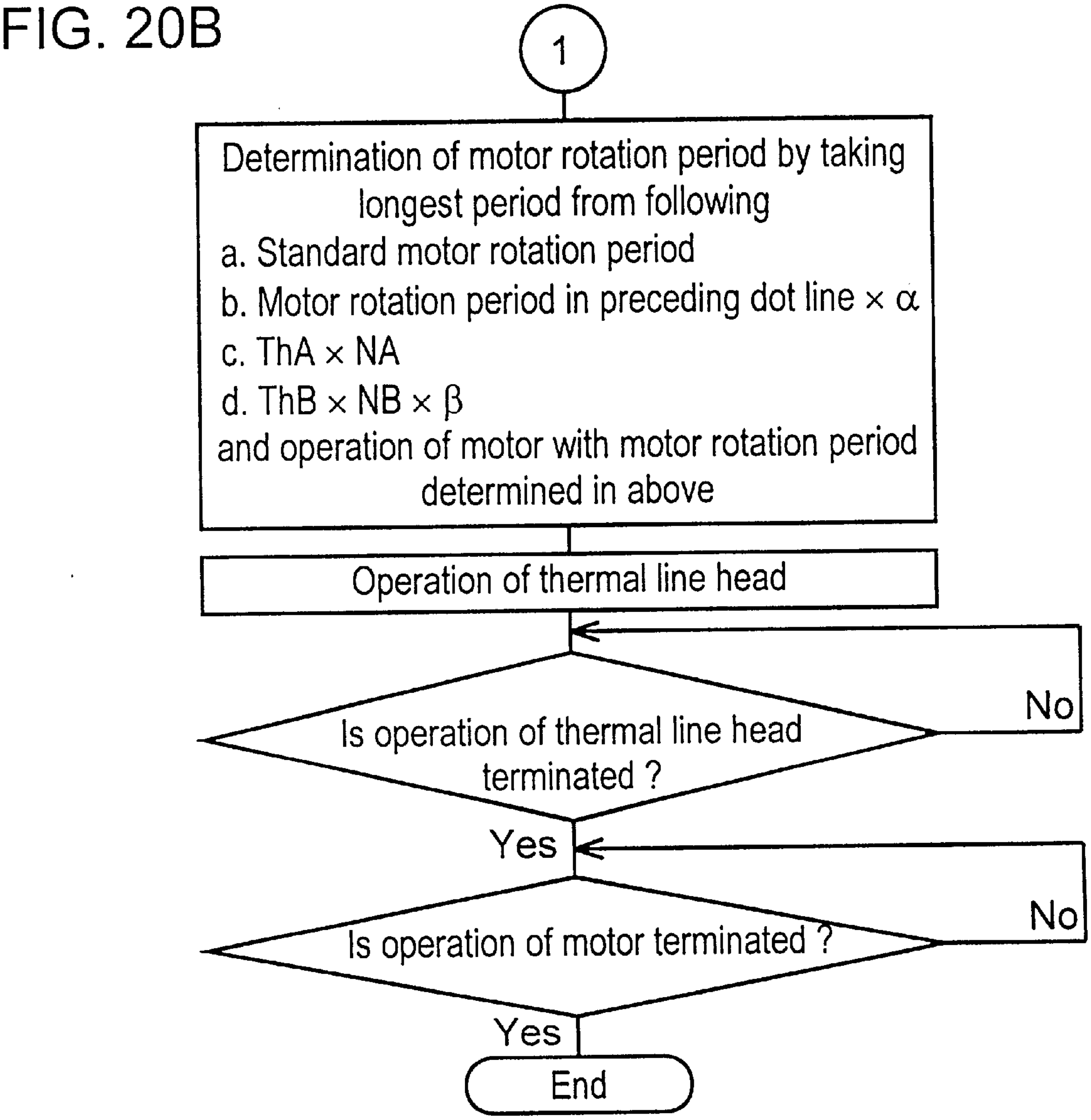
Figure 21:
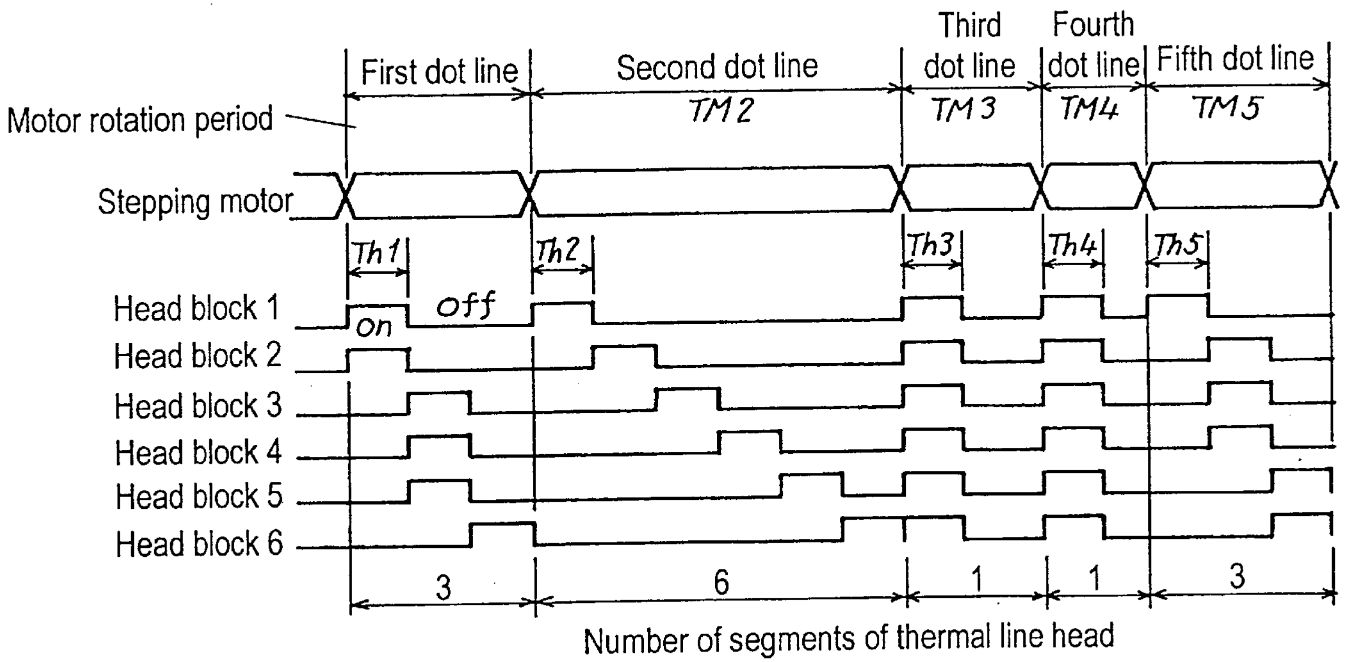
FIG. 21 is a timing chart showing an example of operation in the eighth exemplary embodiment.
Figure 22:
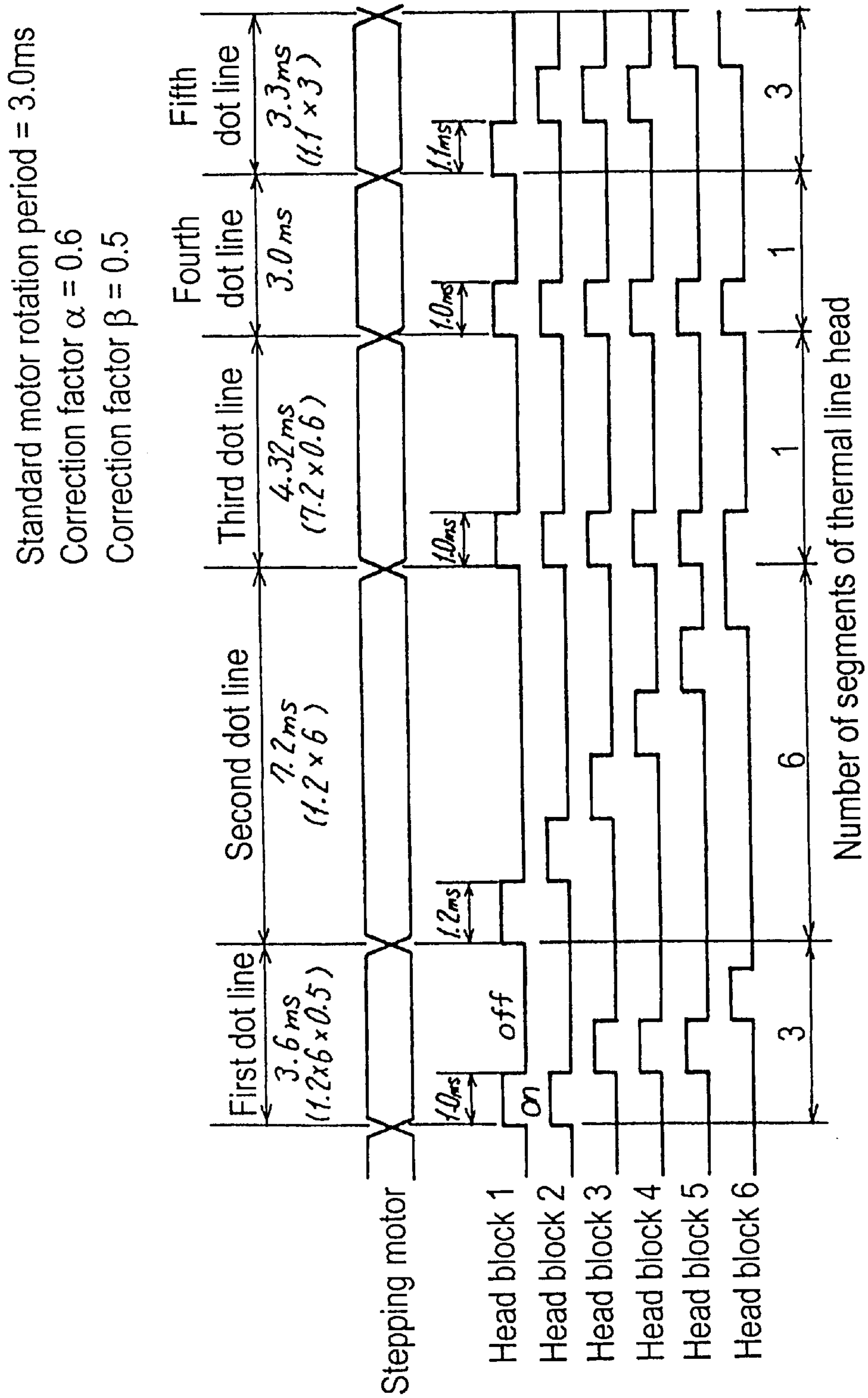
FIG. 22 is a timing chart showing an example of operation in the eighth exemplary embodiment, FIG. 23A and B are flow chart showing the operation of printing one dot line by a driving device for a thermal line printer in a ninth exemplary embodiment of the present invention.

FIGS. 20A and B are a flow chart showing an operation for printing one dot line by a driving device for a thermal line printer in a eighth exemplary embodiment of the present invention. FIG. 21 and FIG. 22 show an example of the timing chart of the operation in this exemplary embodiment.

Hereinafter the operation of this exemplary embodiment is described referring to FIGS. 20A and B, FIG. 21, and FIG. 22.

The driving device for a thermal line printer performs a dynamically segmenting operation. That is, a block to be printed is dynamically varied according to the number of dots to be printed, for reducing the size of the power source and for increasing printing speed. As shown in FIGS. 20A and B, the number of dots to be printed in the present dot line is counted at first, and a block to be printed by the thermal line head at one time is determined in such a manner that the number of dots in each block does not exceed a predetermined maximum number of dots printed by simultaneous application of electricity.

Next, the number of segments NA of the thermal line head necessary for printing one dot line is determined and a pulse width ThA applied to the thermal line head is determined based on parameters such as the above number of segments, the temperature of the thermal line head, voltage applied to the thermal line head and the like.

Then the number of dots to be printed in the coming dot line is counted, and a block to be printed at one time is determined in such a manner that the number of dots does not exceed a predetermined maximum number of dots printed by simultaneous application of electricity. Then the number of segments NB of the thermal line head for printing the coming one dot line is determined, and, a pulse width ThB applied to the thermal line head is determined based on parameters such as the above number of segments, the temperature of the thermal line head, the voltage applied to the thermal line head and the like.

Then the rotation period of the stepping motor for feeding the recording paper in the present dot line is determined by taking, after comparison, the longest period from the following: a value computed by correcting a motor rotation period determined in the preceding dot line (a value multiplied by a correction factor $\alpha$), a motor rotation period computed based on the pulse width applied to the thermal line head in the present dot line and the number of segments of the thermal line head in the present dot line, a standard motor rotation period (ultimate period for continuous running of the motor) stored in advance, and a value computed by correcting a value, which is obtained based on the pulse width applied to the thermal line head in the coming dot line and the number of segments of the thermal line head (a value multiplied by a correction factor $\beta$). The correction factors $\alpha$ and $\beta$ are not smaller than zero but not larger than one.

Lastly, the stepping motor is operated with the motor rotation period determined in the above, and the thermal line head is also operated. FIG. 21 is a timing chart showing the above operation for five dot lines. FIG. 22 shows an example of a timing chart in which numerical values are put in for further explanation on the above operation.

A motor rotation period in a first dot line is determined to be 3.6 ms by taking the longest period from the following: a value computed by multiplying a motor rotation period in the preceding dot line (4.0 ms in this example) by a is correction factor ($\alpha$=0.6) (i.e., 4.0×0.6=2.4 ms), a standard motor rotation period (3.0 ms), and a value computed by multiplying a pulse width (ThA=1.0 ms) applied to the thermal line head in the present dot line by the number of segments (NA=3) in the present dot line (i.e., 1.0×3=3.0 ms), and a value computed by multiplying a pulse width (ThB=1.2 ms) applied to the thermal line head in the coming dot line by he number of segments (NB=6) in the coming dot line and by a correction factor ($\beta$=0.5) (i.e., 1.2×6×0.5=3.6 ms).

A motor rotation period in a second dot line is determined to be 7.2 ms by taking the longest period from the following: a value (2.16 ms) computed by multiplying the motor rotation period (3.6 ms) in the preceding dot line by the correction factor ($\alpha$=0.6), the standard motor rotation period (3.0 ms), a value (7.2 ms) computed by multiplying the pulse width (ThA=1.2 ms) applied to the thermal line head in the present dot line by the number of segments (NA=6), and a value (0.5 ms) computed by multiplying a pulse width (ThB=1.0 ms) applied to the thermal line head in the coming dot line by a number=of segments (NB=1) and by the correction factor ($\beta$=0.5).

A motor rotation period in a third dot line is determined to be 4.32 ms by taking the longest period from the following: a value (4.32 ms) computed by multiplying the motor rotation period (7.2 ms) in the preceding dot line by the correction factor ($\alpha$=0.6), the standard motor rotation period (3.0 ms), a value (1.0 ms) computed by multiplying the pulse width (ThA=1.0 ms) applied to the thermal line head by the number of segment (NA=1), and a value (0.5) computed by multiplying a pulse width (ThB=1.0 ms) applied to the thermal line head in the coming dot line by the number of segment (NB=1) and by the correction factor ($\beta$=0.5). Further motor rotation periods are determined by comparison in such a manner as described in the above.

The driving device for a thermal line printer described in the above enables the suppression of the fluctuation of the rotation period of the stepping motor even under sudden change from the numerous segments to the few segments or from the few segments to the numerous segments of the thermal line head due to printing contents without setting a standard motor rotation period at a value which is unnecessarily large, whereby the vibration of the stepping motor is suppressed, accordingly the operation noise is suppressed, also enables high speed printing even by using a lower torque stepping motor.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

NINTH EXEMPLARY EMBODIMENT

Figure 23A:
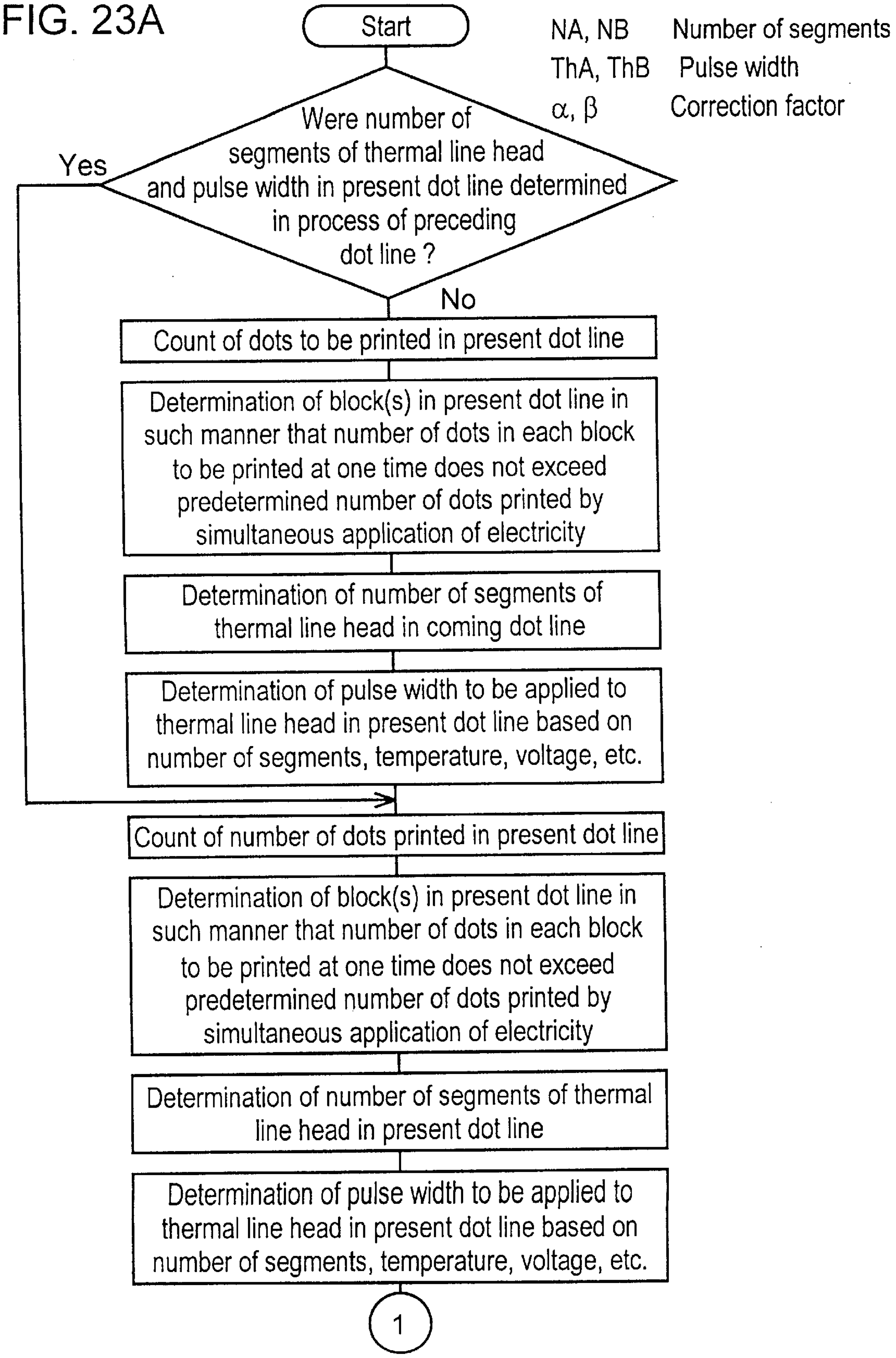
Figure 23B:
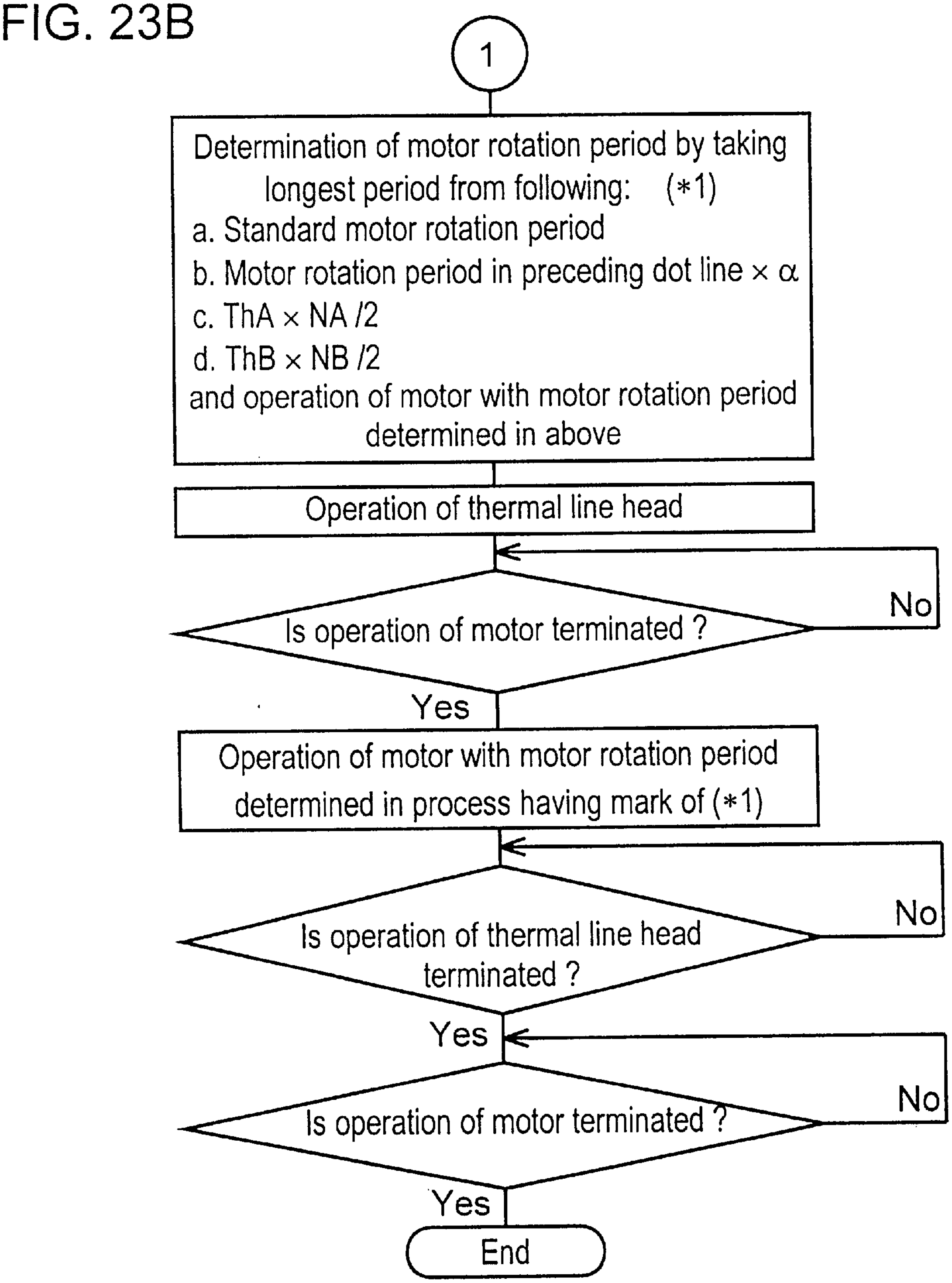
Figure 24:
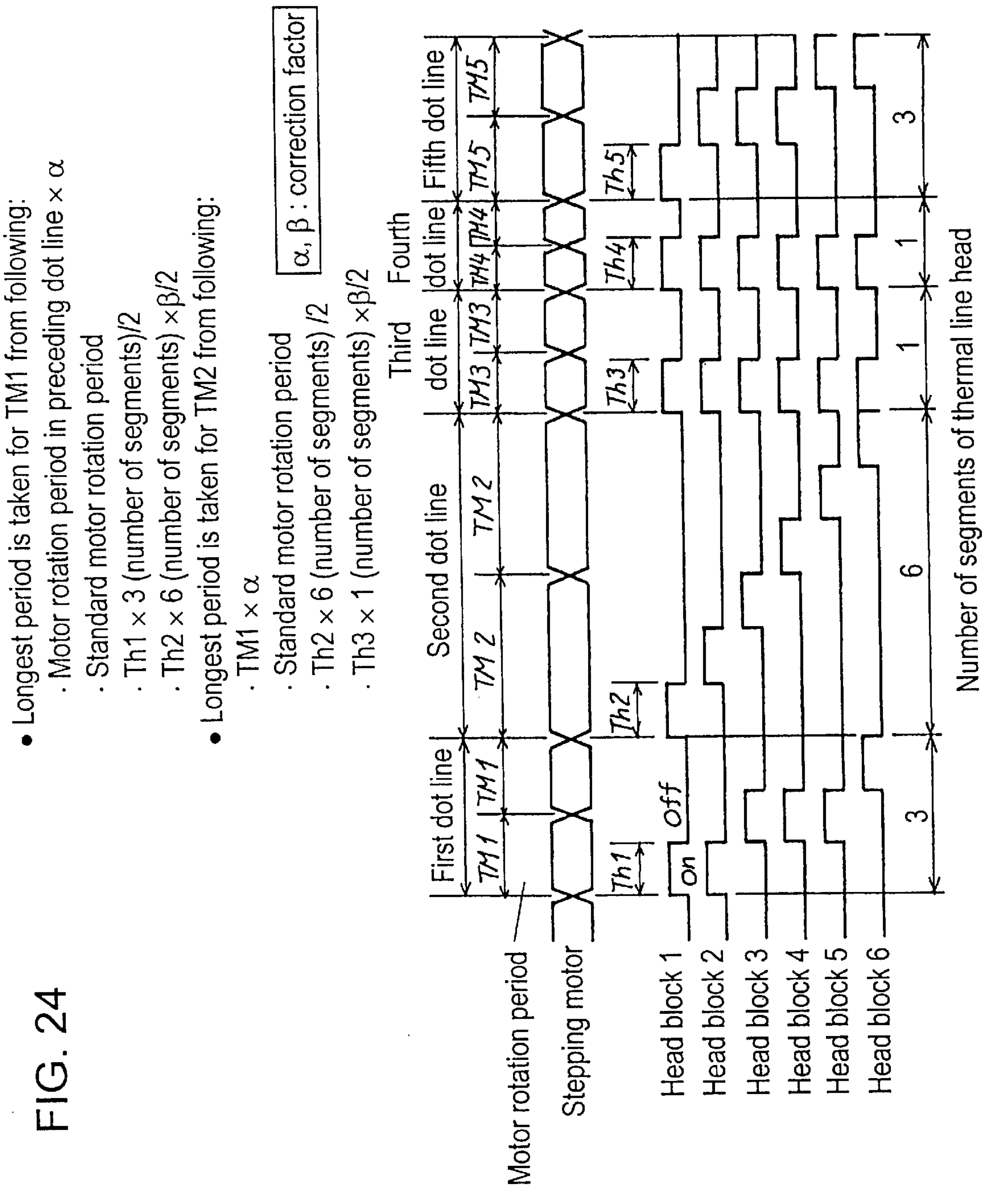
FIG. 24 is a timing chart showing an example of operation in the ninth exemplary embodiment.
Figure 25:
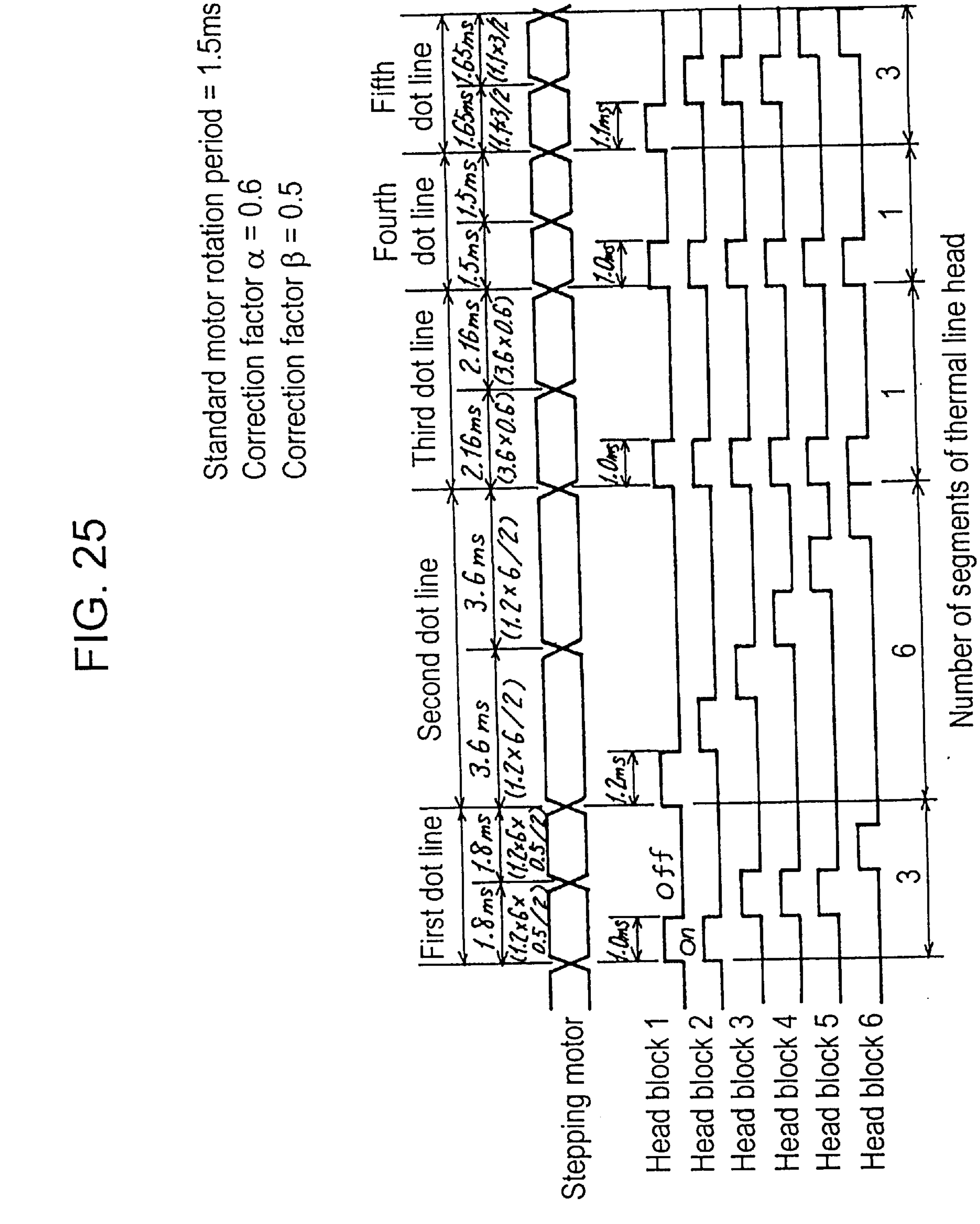
FIG. 25 is a timing chart showing an example of operation in the ninth exemplary embodiment, FIGS. 26A and B are flow chart showing the operation of printing one dot line by a driving device for a thermal line printer in a tenth exemplary embodiment of the present invention.

FIGS. 23A and B are a flow chart showing an operation for printing one dot line by a driving device for a thermal line printer in a ninth exemplary embodiment of the present invention. FIG. 24 and FIG. 25 show an example of the timing chart of the operation in this exemplary embodiment.

Hereinafter the operation of this exemplary embodiment is described referring to FIGS. 23A and B, FIG. 24, and FIG. 25.

The driving device for a thermal line printer performs dynamically segmenting operation. That is, a block to be printed is dynamically varied according to the number of dots to be printed, for reducing the size of power source and for increasing printing speed. As shown in FIGS. 23A and B, the number of dots to be printed in the present dot line is counted at first, and a block to be printed at to one time by the thermal line head is determined in such a manner that the number of dots in each block does not exceed a predetermined maximum number of dots printed by simultaneous application of electricity.

Next, the number of segments NA of the thermal line head necessary for printing the present one dot line is determined and a pulse width ThA applied to the thermal line head is determined based on parameters such as the above number of segments, the temperature of the thermal line head, voltage applied to the thermal line head and the like. Then the number of dots to be printed in the coming dot line is counted, and a block to be printed at one time in the coming dot line is determined in such a manner that the number of dots does not exceed a predetermined maximum number of dots printed by simultaneous application of electricity.

Then the number of segments NB of the thermal line head necessary for printing the coming one dot line is determined and a pulse width ThB applied to the thermal line head is determined based on parameters such as the above number of segments, the temperature of the thermal line head, the voltage applied to the thermal line head and the like.

Then the rotation period of the stepping motor for feeding the recording paper in the present dot line is determined by taking, after comparison, the longest period from the following: a value computed by correcting the motor rotation period determined in the preceding dot line (a value multiplied by a correction factor $\alpha$), a motor rotation period computed based on the pulse width applied to the thermal line head in the present dot line and the number of segments of the thermal line head in the present dot line, a standard motor rotation period (ultimate period for continuous running of the motor) stored in advance, and a value computed by correcting a value, which is obtained based on the pulse width applied to the thermal line head in the coming dot line and the number of segments of the thermal line head in the coming dot line (a value multiplied by a correction factor $\beta$). The correction factor $\alpha$ and $\beta$ are not smaller than zero but not larger than one.

Next, the stepping motor is operated with the motor rotation period determined in the above as a first step in one dot line, also the thermal line head is operated. After the operation of the stepping motor is over, the stepping motor is operated again with the above motor rotation period as a second step in one dot line. FIG. 24 is a timing chart showing the above operation for five dot lines.

FIG. 25 shows an example of a timing chart in which numerical values are put in for further explanation on the above operation. A motor rotation period in a first dot line is determined to be 1.8 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by dividing a value, which is obtained by multiplying a pulse width (ThA=1.0 ms) applied to the thermal line head in the present dot line by the number of segments (NA=3), by two (i.e., 1.0×3/2=1.5 ms), and a value computed by dividing a value, which is obtained by multiplying a pulse width (ThB=1.2 ms) applied to the thermal line head in the coming dot line by the number of segments (NB=6) and by a correction factor ($\beta$=0.5), by two (i.e., 1.2×6×0.5/2=1.8).

A motor rotation period in a second dot line is determined to be 3.6 ms by taking the longest period from the following: a value (1.08 ms) computed by multiplying the motor rotation period (1.8 ms) in the preceding dot line by the correction factor ($\alpha$=0.6), the standard motor rotation period (1.5 ms), a value (3.6 ms) computed by dividing a value, which is obtained by multiplying the pulse width (ThA=1.2 ms) applied to the thermal line head in the present dot line by the number of segments (NA=6), by two, a value (0.25 ms) computed by dividing a value, which is obtained by multiplying a pulse width (ThB=1.0 ms) applied to the thermal line head in the coming dot line by the number of segment (NB=1) and by the correction factor ($\beta$=0.5), by two.

A motor rotation period in a third dot line is determined to be 2.16 ms by taking the longest period from the following: a value (2.16 ms) computed by to multiplying the motor rotation period (3.6 ms) in the preceding dot line by the correction factor ($\alpha$=0.6), the standard motor rotation period (1.5 ms), a value (0.5 ms) computed by dividing a value, which is obtained by multiplying the pulse width (ThA=1.0 ms) applied to the thermal line head in the present dot line by the number of segment (NA=1), by two, and a value (0.25 ms) computed by dividing a value, which is obtained by multiplying a pulse width (ThB=1.0 ms) applied to the thermal line head in the coming dot line by the number of segment (NB=1) and by the correction factor ($\beta$=0.5), by two. Further motor rotation periods are determined by comparison in such a manner as described in the above.

The driving device for a thermal line printer described in the above enables the suppression of the fluctuation of the rotation period of the stepping motor even under sudden change from the numerous segments to the few segments or from the few segments to the numerous segments of the thermal line head due to printing contents without setting a standard motor rotation period at a value which is unnecessarily large, whereby the vibration of the stepping motor is suppressed, and accordingly the operation noise is suppressed. The driving device also enables printing without the occurrence of the step out even by using a low torque stepping motor, enables the improvement of the preciseness of paper feeding pitch of the stepping motor by constituting the printing of one dot line with a plurality of steps of the stepping motor, and enables the use of a lower cost and smaller stepping motor by increasing the deceleration ratio.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

TENTH EXEMPLARY EMBODIMENT

Figure 26A:
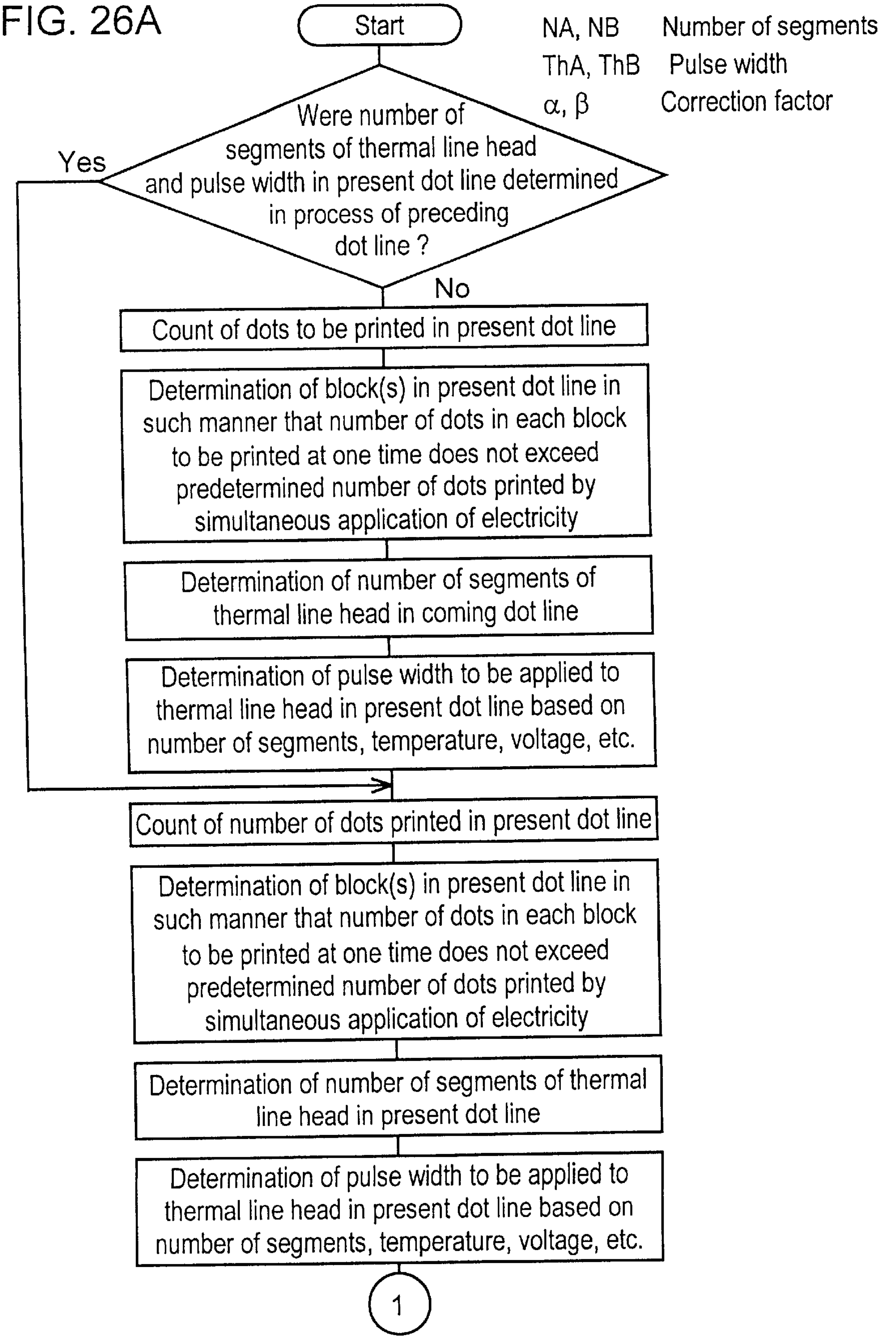
Figure 26B:
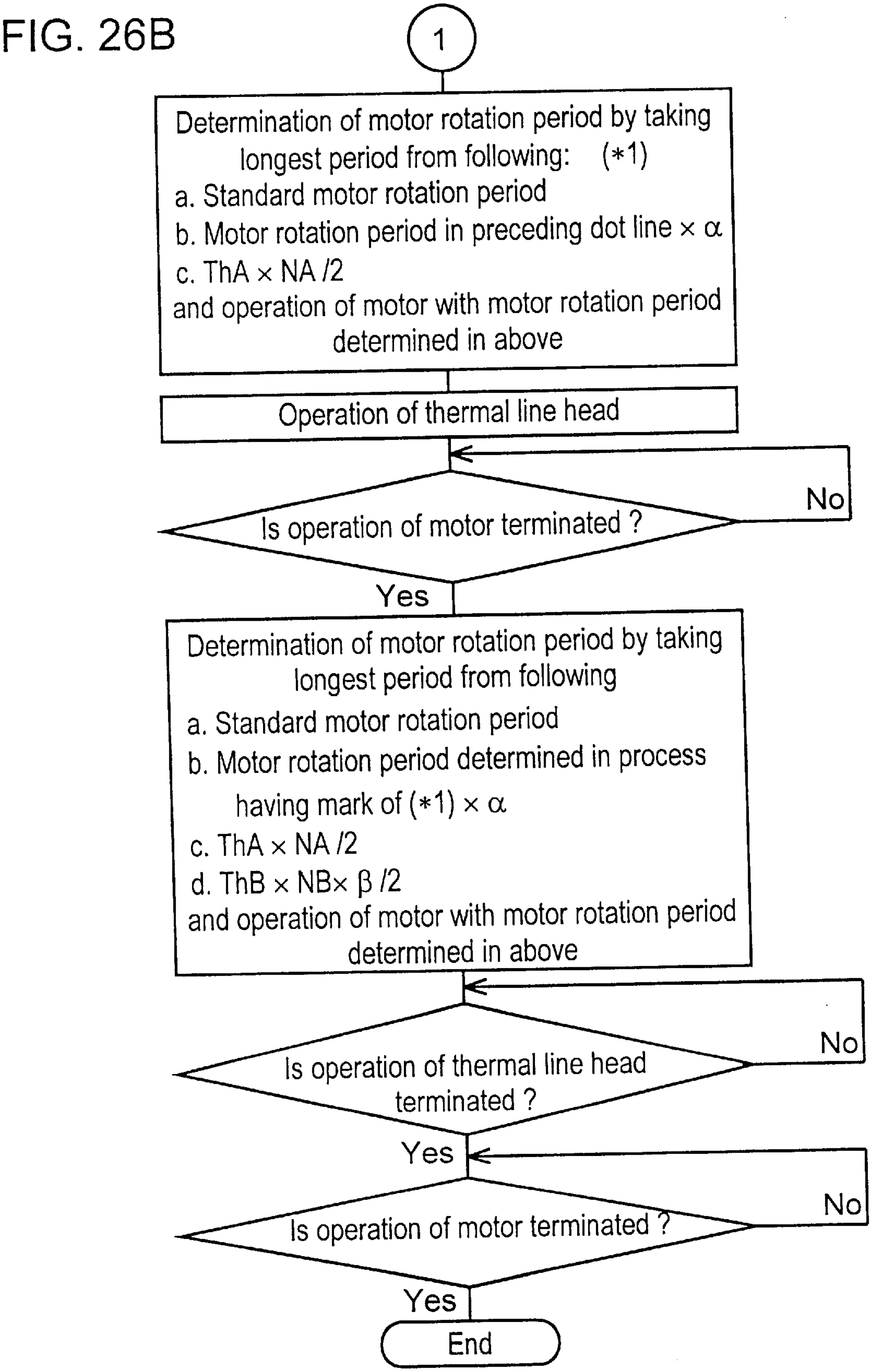
Figure 28:
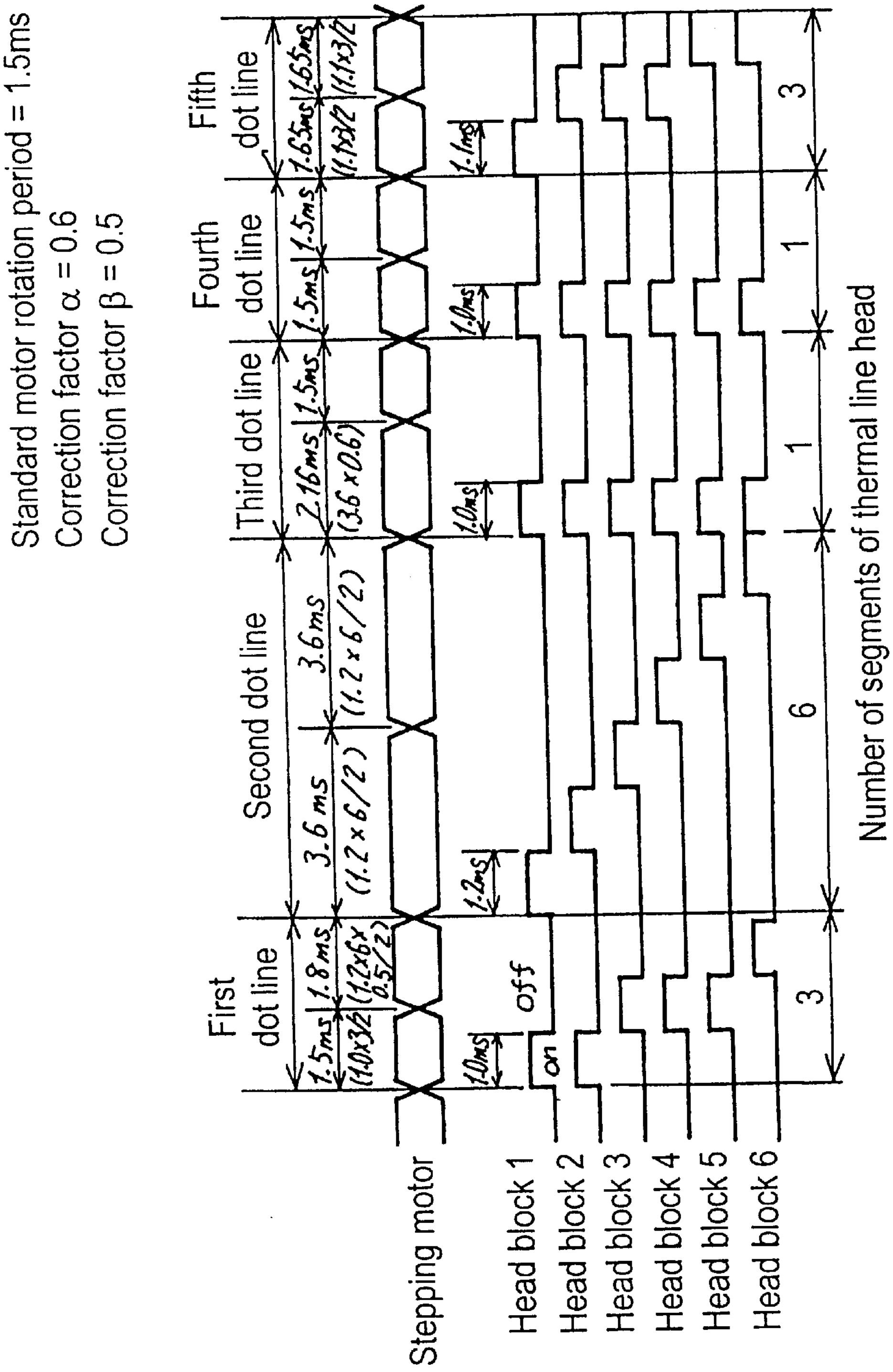
FIG. 28 is a timing chart showing an example of operation in the tenth exemplary embodiment, FIGS. 29A an B are a flow chart showing the operation of printing one dot line by a driving device for a thermal line printer in a eleventh exemplary embodiment of the present invention.

FIGS. 26A and B are a flow chart showing an operation for printing one dot line by a driving device for a thermal line printer in a tenth exemplary embodiment of the present invention. FIG. 27 and FIG. 28 show an example of the timing chart of the operation in this exemplary embodiment.

Hereinafter the operation of this exemplary embodiment is described referring to FIGS. 26A and B, FIG. 27, and FIG. 28.

The driving device for a thermal line printer performs a dynamically segmenting operation. That is, a block to be printed is dynamically varied according to the number of dots to be printed for reducing the size of power source and for increasing printing speed. As shown in FIGS. 26A and B the number of dots to be printed in the present dot line is counted at first, and a block to be printed at one time by the thermal line head is determined in such a manner that the number of dots does not exceed a predetermined maximum number of dots printed by simultaneous application of electricity.

Next, the number of segments NA of the thermal line head necessary for printing the present one dot line is determined and a pulse width ThA applied to the thermal line head is determined based on parameters such as the above number of segments, the temperature of the thermal line head, voltage applied to the thermal line head and the like.

Then the number of dots to be printed in the coming dot line is counted and a block to be printed at one time is determined in such a manner that the number of dots in each block does not exceed a predetermined maximum number of dots printed by simultaneous application of electricity. Then the number of segments NB of the thermal line head necessary for printing the coming one dot line is determined, and, a pulse width ThB applied to the thermal line head is determined based on parameters such as the above number of segments, the temperature of the thermal line head, the voltage applied to the thermal line head and the like.

Then the rotation period of the stepping motor for feeding recording paper in the present dot line is determined by taking, after comparison, the longest period from the following: a value computed by correcting a motor rotation period determined in the preceding dot line (a value multiplied by a correction factor $\alpha$), a motor rotation period computed based on a pulse width applied to the thermal line is head in the present dot line and the number of segments of the thermal line head in the present dot line, and a standard motor rotation period (ultimate period for continuous running of the motor) stored in advance. The correction factor a is not smaller than zero but not larger one Then, the stepping motor is operated with the motor rotation period determined in the above as a first step in one dot line, also the thermal line head is operated. After the operation of the stepping motor is over, the rotation period of the motor is newly determined by comparison for a second step in one dot line and the motor is operated with the motor rotation period newly determined. The motor rotation period in the second step is determined by taking, after comparison, the longest period from the following: a value computed by correcting the preceding motor rotation period (a value multiplied by the correction factor $\alpha$), a motor rotation period computed based on the pulse width applied to the thermal line head in the present dot line and the number of segments of the thermal line head in the present dot line, the standard motor rotation period (ultimate period for continuous running of the motor) stored in advance, and a value computed by correcting a value, which is obtained based on the pulse width applied to the thermal line head in the coming dot line and the number of segments of thermal line head in the coming dot line (a value multiplied by a correction factor $\beta$). The correction factor $\beta$ is not smaller than zero but not larger than one. FIG. 27 is a timing chart showing the above operation for five dot lines.

FIG. 28 shows an example of a timing chart in which numerical values are put in for further explanation on the above operation. A motor rotation period in a first step of a first dot line is determined to be 1.5 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by dividing a value, which is obtained by multiplying a pulse width (ThA=1.0 ms) applied to the thermal line head in the present dot line by the number of segments is (NA=3), by two (i.e., 1.0×3/2=1.5 ms). A motor rotation period in a second step in the first dot line is determined to be 1.8 ms by taking the longest period from the following: a value (0.9 ms) computed by multiplying the preceding motor rotation period (1.5 ms) by the correction factor ($\alpha$=0.6), the standard motor rotation period (1.5 ms), a value (1.5 ms) computed by dividing a value, which is obtained by multiplying the pulse width (ThA=1.0 ms) applied to the thermal line head in the present dot line by the number of segments (NA=3), by two, and a value (1.8 ms) computed by dividing a value, which is obtained by multiplying a pulse width (ThB=1.2 ms) applied to the thermal line head in the coming dot line by the number of segments (NB=6) and by a correction factor ($\beta$=0.5), by two.

A motor rotation period in a first step of a second dot line is determined to be 3.6 ms by taking the longest period from the following: a value (1.08 ms) computed by multiplying the preceding motor rotation period (1.8 ms) by the correction factor ($\alpha$=0.6), the standard motor rotation period (1.5 ms), and a value (3.6 ms) computed by dividing a value, which is obtained by multiplying the pulse width (ThA=1.2 ms) applied to the thermal line head in the present dot line by the number of segments (NA=6), by two. Further motor rotation periods are determined in such a manner by comparison as described in the above.

The driving device for a thermal line head described in the above enables the suppression of the fluctuation of the rotation period of the stepping motor even under sudden change from the numerous segments to the few segments or from the few segments to the numerous segments of the thermal line head due to printing contents without setting the standard motor rotation period at a value which is unnecessarily large, whereby the vibration of the stepping motor is suppressed, and accordingly the operation noise is suppressed. The driving device also enables printing without occurrence of the step out even by using a lower torque stepping motor, enables the improvement of the preciseness of the paper feeding pitch of the stepping motor by constituting the printing of one dot line with a plurality of steps of the stepping motor, enables the use of a low cost and small stepping motor by increasing the deceleration ratio, and enables high speed printing by correcting a motor rotation period in the respective steps.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

ELEVENTH EXEMPLARY EMBODIMENT

Figure 29A:
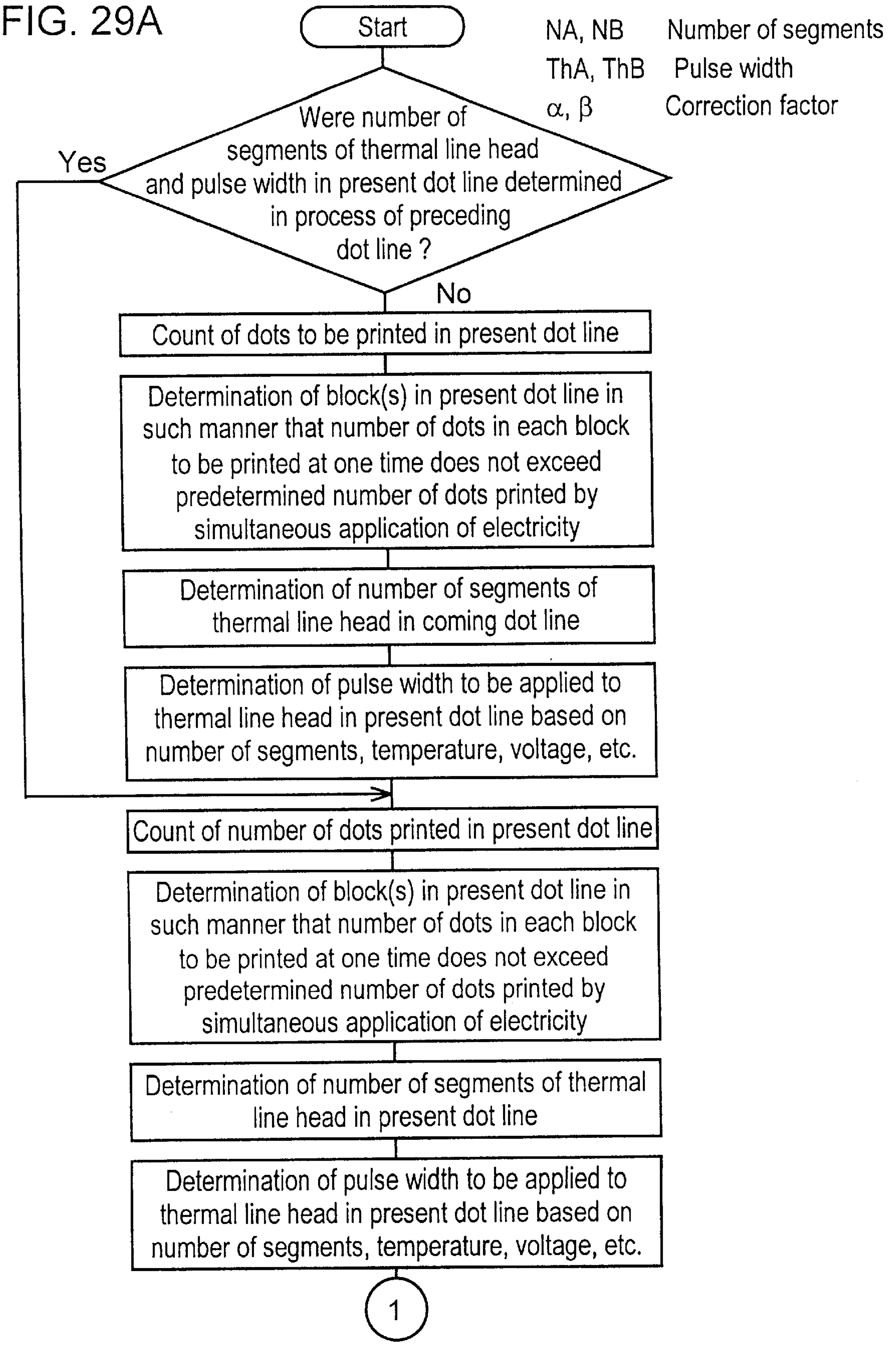
Figure 29B:
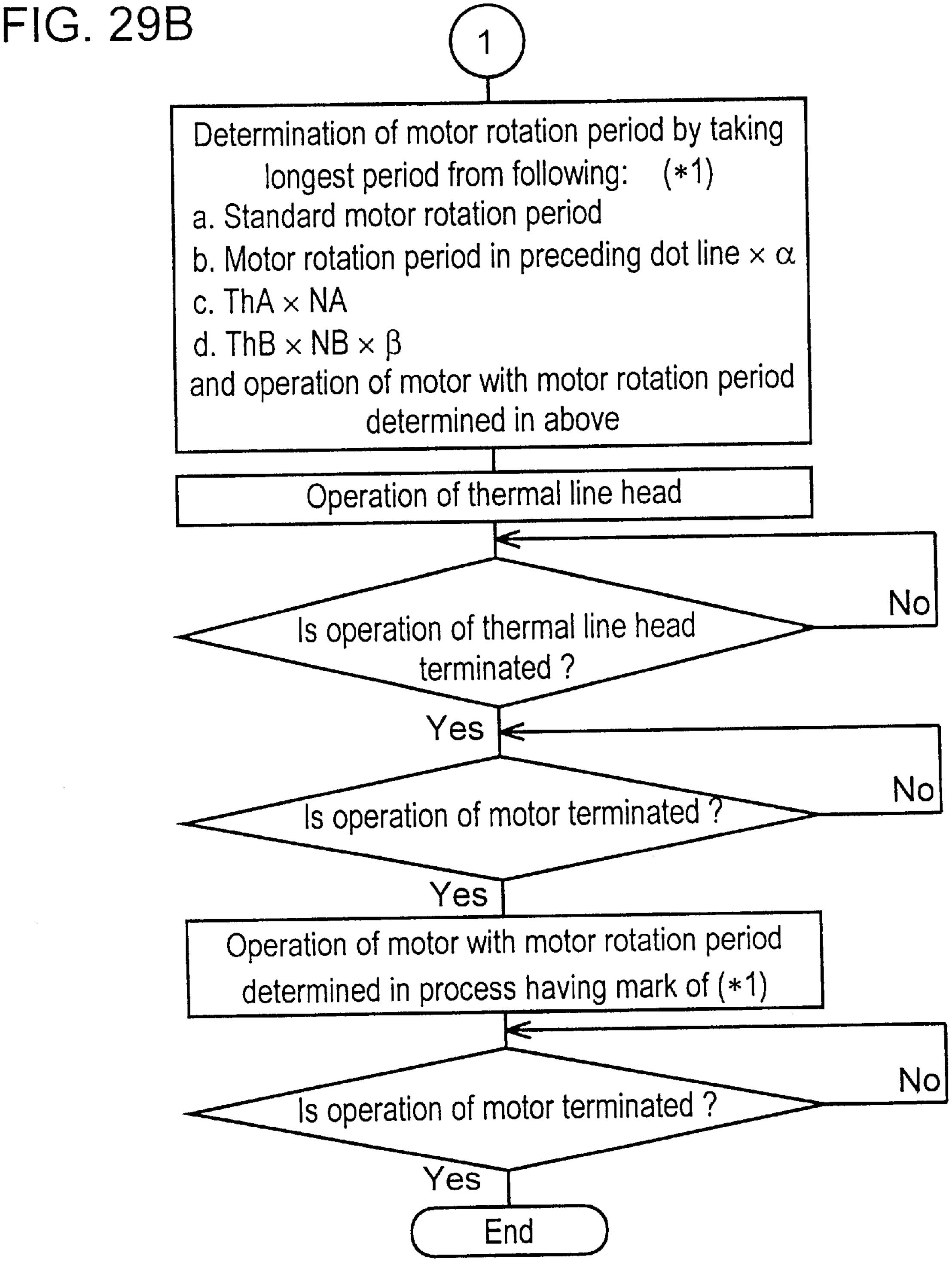
Figure 30:
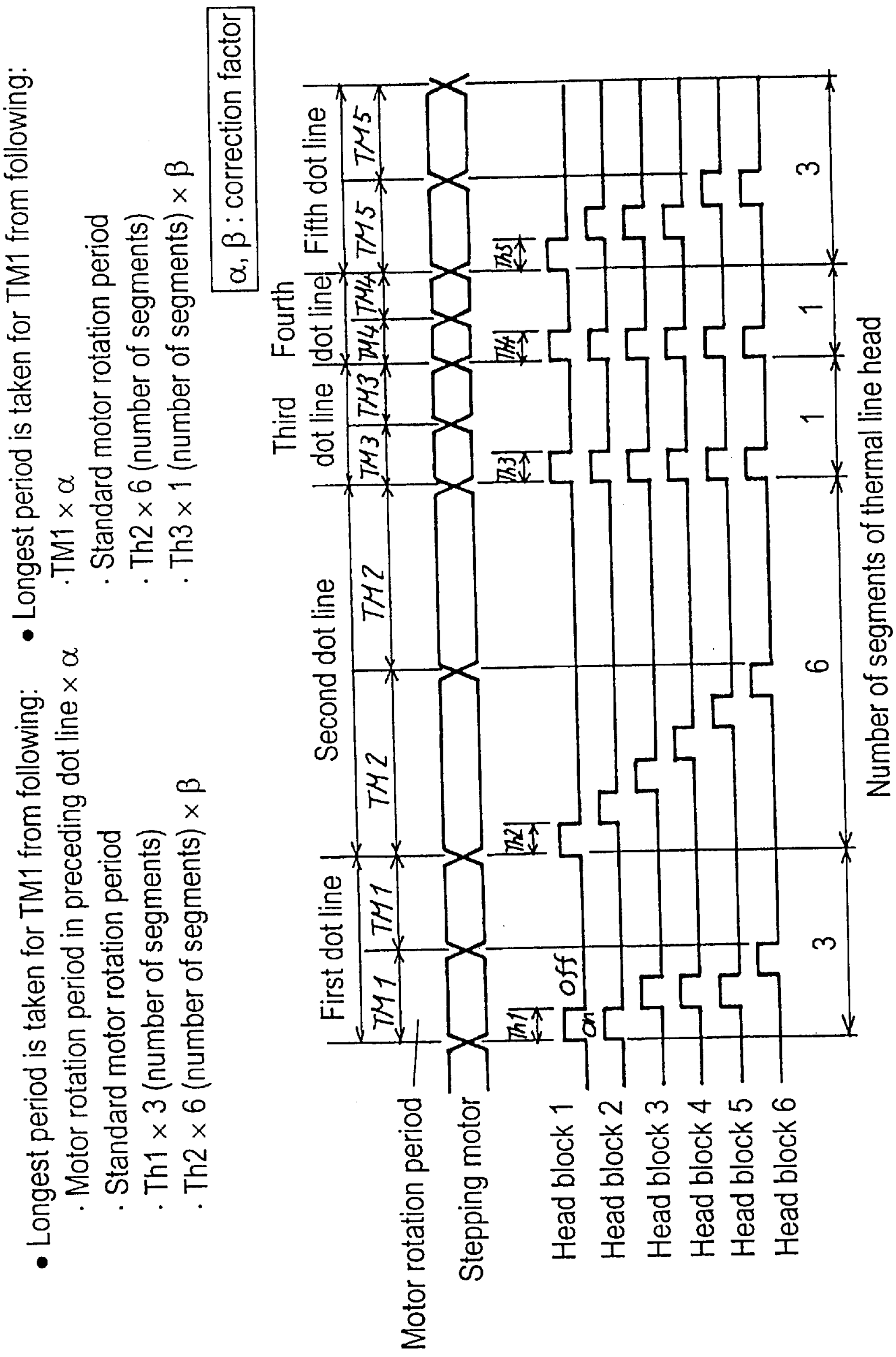
FIG. 30 is a timing chart showing an example of operation in the eleventh exemplary embodiment.
Figure 31:
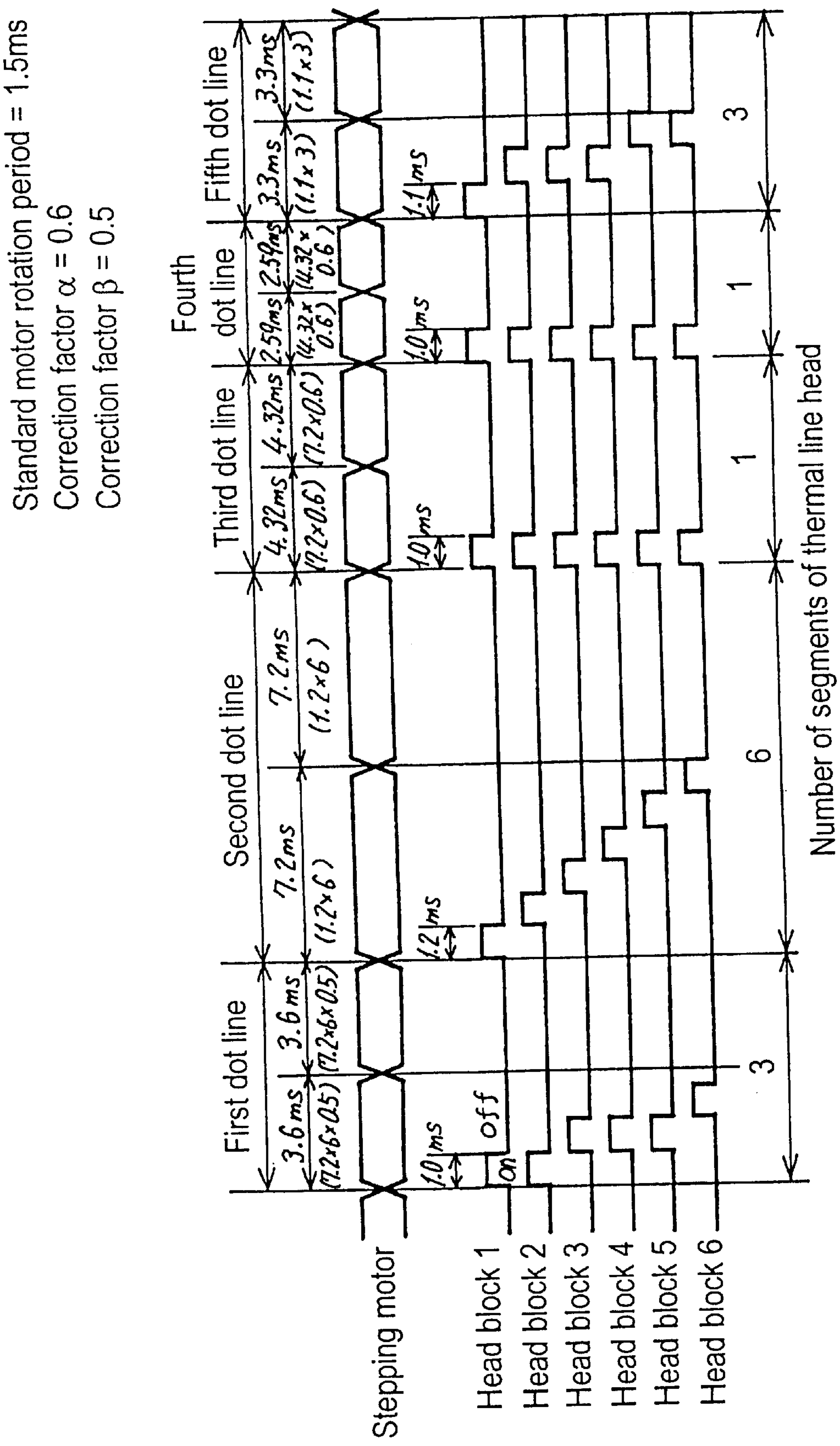
FIG. 31 is a timing chart showing an example of operation in the eleventh exemplary embodiment, FIGS. 32A and B are a flow chart showing the operation of printing one dot line by a driving device for a thermal line printer in a twelfth exemplary embodiment of the present invention.

FIGS. 29A and B are a flow chart showing an operation for printing one dot line by a driving device for a thermal line printer in a eleventh exemplary embodiment of the present invention. FIG. 30 and FIG. 31 show an example of the timing chart of the operation in this exemplary embodiment.

Hereinafter the operation of this exemplary embodiment is described referring to FIGS. 29A and B, FIG. 30, and FIG. 31.

The driving device for a thermal line printer performs a dynamically segmenting operation. That is, a block to be printed is dynamically varied according to the number of dots to be printed, for reducing the size of the power source and for increasing printing speed. As shown in FIGS. 29A and B, the number of dots to be printed in the present dot line is counted at first, and a block to be printed at one time by the thermal line head is determined in such a manner that the number of dots in each block does not exceed a predetermined maximum number of dots printed by simultaneous application of electricity.

Next, the number of segments NA of the thermal line head necessary for printing the present one dot line is determined and a pulse width ThA applied to the thermal line head is determined based on parameters such as the above number of segments, the temperature of the thermal line head, voltage applied to the thermal line head and the like.

Then the number of dots to be printed in the coming dot line is counted, and a block to be printed at one time is determined in such a manner that the number of dots does not exceed a predetermined maximum number of dots printed by simultaneous application of electricity. Then the number of segments NB of the thermal line head is determined necessary for printing the combining one dot line and a pulse width ThB applied to the thermal line head is determined based on parameters such as the above number of segments, the temperature of the thermal line head, the voltage applied to the thermal line head and the like.

Then the rotation period of the stepping motor for feeding the recording paper in the present dot line is determined by taking, after comparison, the longest period from the following: a value computed by correcting a motor rotation period determined in the preceding dot line (a value multiplied by a correction factor $\alpha$), a motor rotation period computed based on the pulse width applied to the thermal line head in the present dot line and the number of segments of the thermal line head in the present dot line, a standard motor rotation period (ultimate period for continuous running of the motor) stored in advance, and a value computed by correcting a value, which is obtained based on the pulse width applied to the thermal line head in the coming dot line and the number of segments of the thermal line head in the coming dot line (a value multiplied by a correction factor $\beta$). The correction factors $\alpha$ and $\beta$ are not smaller than zero but not larger than one.

Then the stepping motor is operated with the motor rotation period determined in the above as a first step in one dot line, also the thermal line head is operated. After the operation of the thermal line head and the stepping motor is over, the stepping motor is operated again with the above motor rotation period as a second step in one dot line. FIG. 30 is a timing chart showing the above operation for five dot lines.

FIG. 31 shows an example of a timing chart in which numerical values are put in for further explanation on the above operation. A motor rotation period in a first dot line is determined to be 3.6 ms by taking the longest period from the following: a value computed by multiplying a motor rotation period in the preceding dot line (2.0 ms in this example) by a correction factor ($\alpha$=0.6) (i.e., 2.0×0.6=1.2 ms), a standard motor rotation period (1.5 ms), and a value computed by multiplying a pulse width (ThA=1.0 ms) applied to the thermal line head in the present dot line by the number of segments (NA=3) (i.e., 1.0×3=3.0 ms), and a value computed by multiplying a pulse width (ThB=1.2 ms) applied to the thermal line head in the coming dot line by the number of segments (NB=6) and by a correction factor ($\beta$=0.5) (i.e., 1.2×6×0.5=3.6 ms).

A motor rotation period in a second dot line is determined to be 7.2 ms by taking the longest period from the following: a value (2.16 ms) computed by multiplying the motor rotation period (3.6 ms) in the preceding dot line by the correction factor ($\alpha$=0.6), the standard motor rotation period (1.5 ms), a value (7.2 ms) computed by multiplying the pulse width (ThA=1.2 ms) applied to the thermal line head in the present dot line by the number of segments (NA=6), and a value (0.5 ms) computed by multiplying a pulse width (ThB=1.0 ms) applied to the thermal line head in the coming dot line by the number of segment (NB=1) and by the correction factor ($\beta$=0.5). The motor rotation period in a third dot line is determined to be 4.32 ms by taking the longest period from the following: a value (4.32 ms) computed by multiplying the motor rotation period (7.2 ms) in the preceding dot line by the correction factor ($\alpha$=0.6), the standard motor rotation period (1.5 ms), a value (1.0 ms) computed by multiplying the pulse width (ThA=1.0 ms) applied to the thermal line head in the present dot line by the number of segment (NA=1), and a value (0.5 ms) computed by multiplying a pulse width (ThB=1.0 ms) applied to the thermal line head in the coming dot line by the number of segment (NB=1) and by the correction factor ($\beta$=0.5). Further motor rotation periods are determined by comparison in such a manner as described in the above.

The driving device for a thermal line printer described in the above enables the suppression of the fluctuation of the rotation period of the stepping motor even under sudden change from the numerous segments to the few segments or from the few segments to the numerous segments of the thermal line head due to printing contents without setting the standard motor rotation period at a value which is unnecessarily large, whereby the vibration of the stepping motor is further suppressed, and accordingly the operation noise is suppressed. The driving device enables printing without the occurrence of the step out even by using a lower torque stepping motor, enables the improvement of the preciseness of the paper feeding pitch of the stepping motor by constituting the printing of one dot line with a plurality of steps of the stepping motor, enables the use of a lower cost and smaller stepping motor by increasing the deceleration ratio, and enables higher quality printing having no occurrence of horizontal level difference by completing printing of one dot line with one step of a plurality of steps of the stepping motor.

In the above description, the number of segments of the thermal line head is varied between one and six for the convenience of showing the operation by illustrations. However, the number of segments is varied between one and some tens to some hundreds in practical use. When the number of segments is larger, a larger effect can be obtained in this exemplary embodiment.

TWELFTH EXEMPLARY EMBODIMENT

Figure 32A:
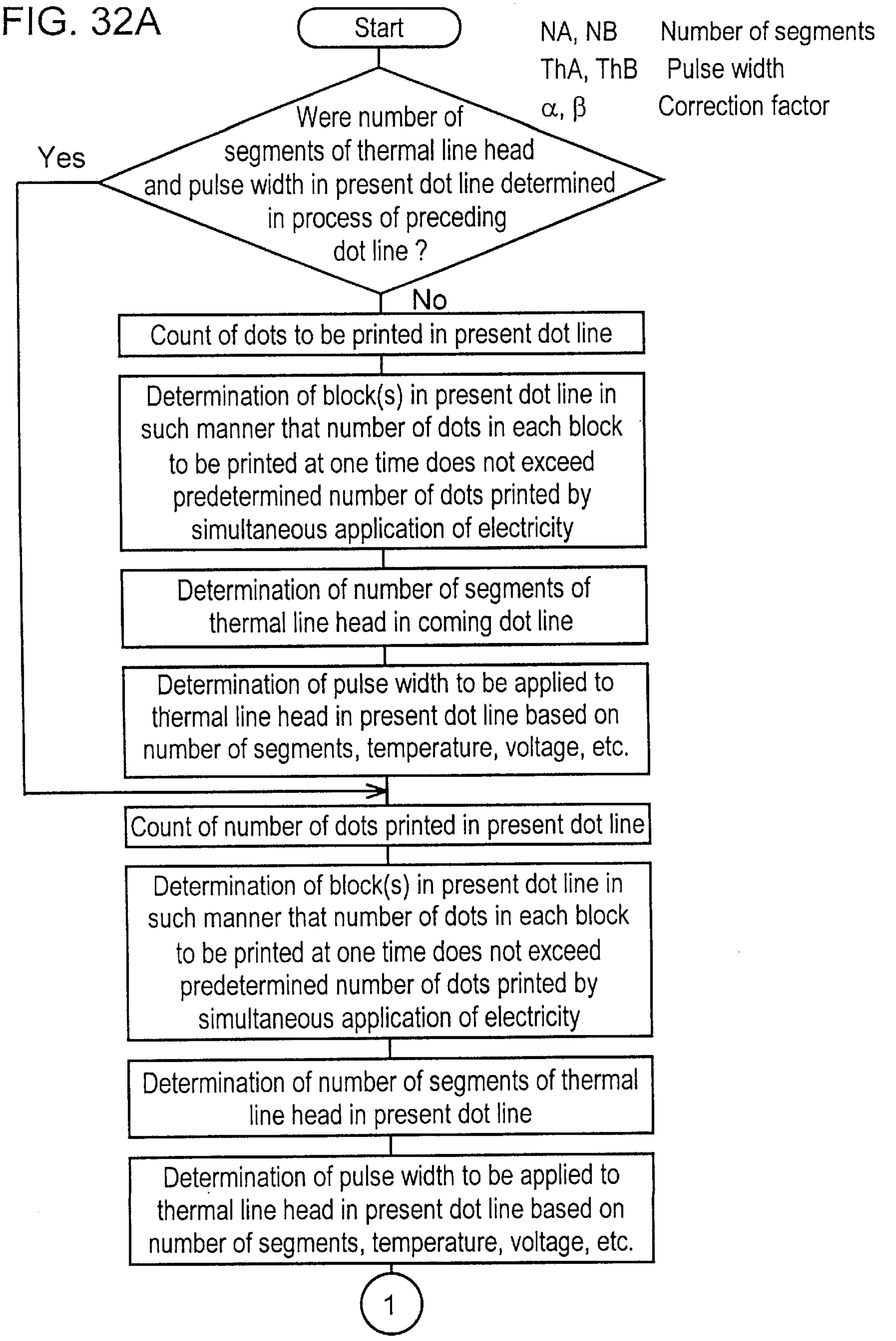
Figure 32B:
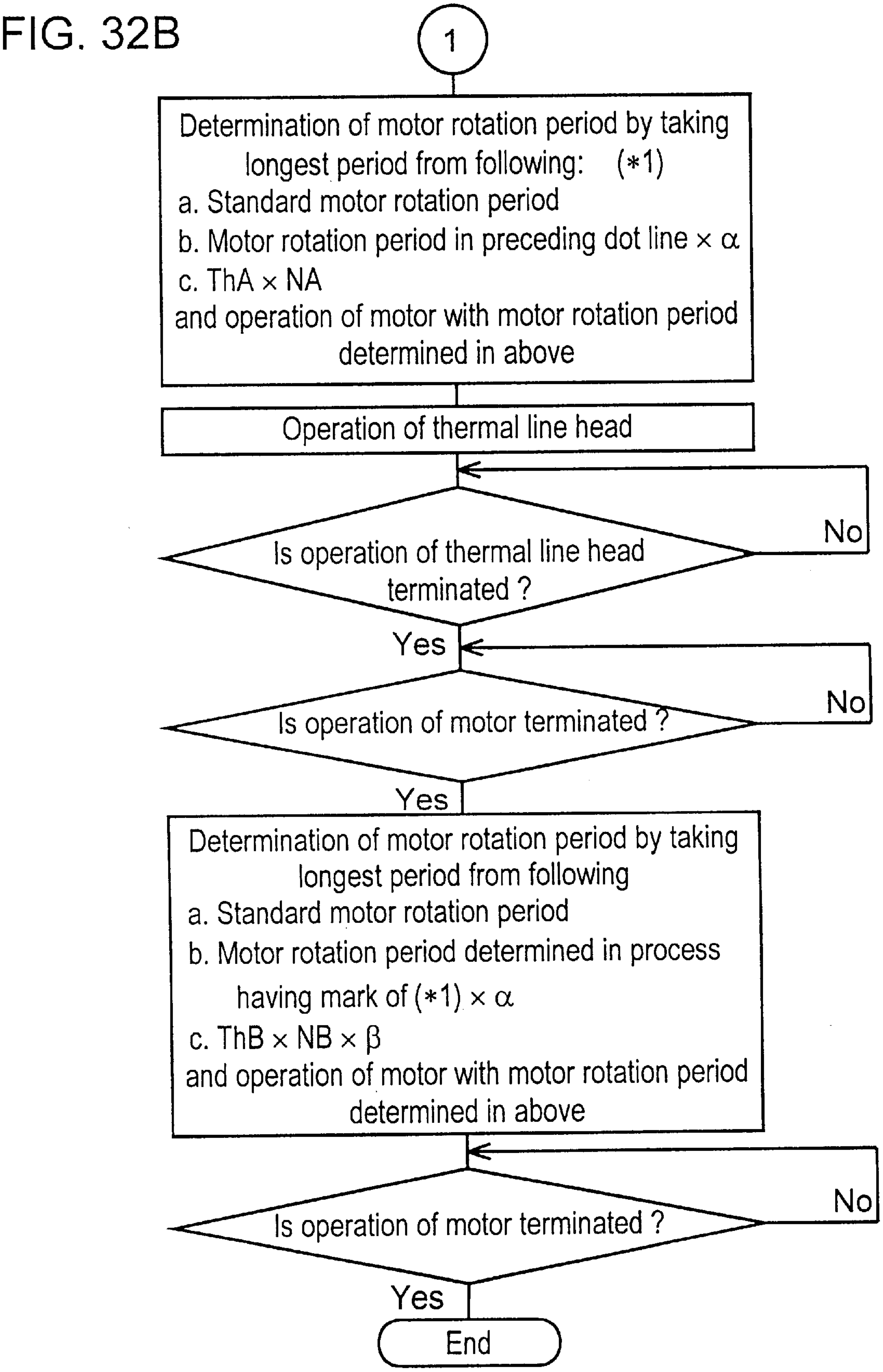
Figure 34:
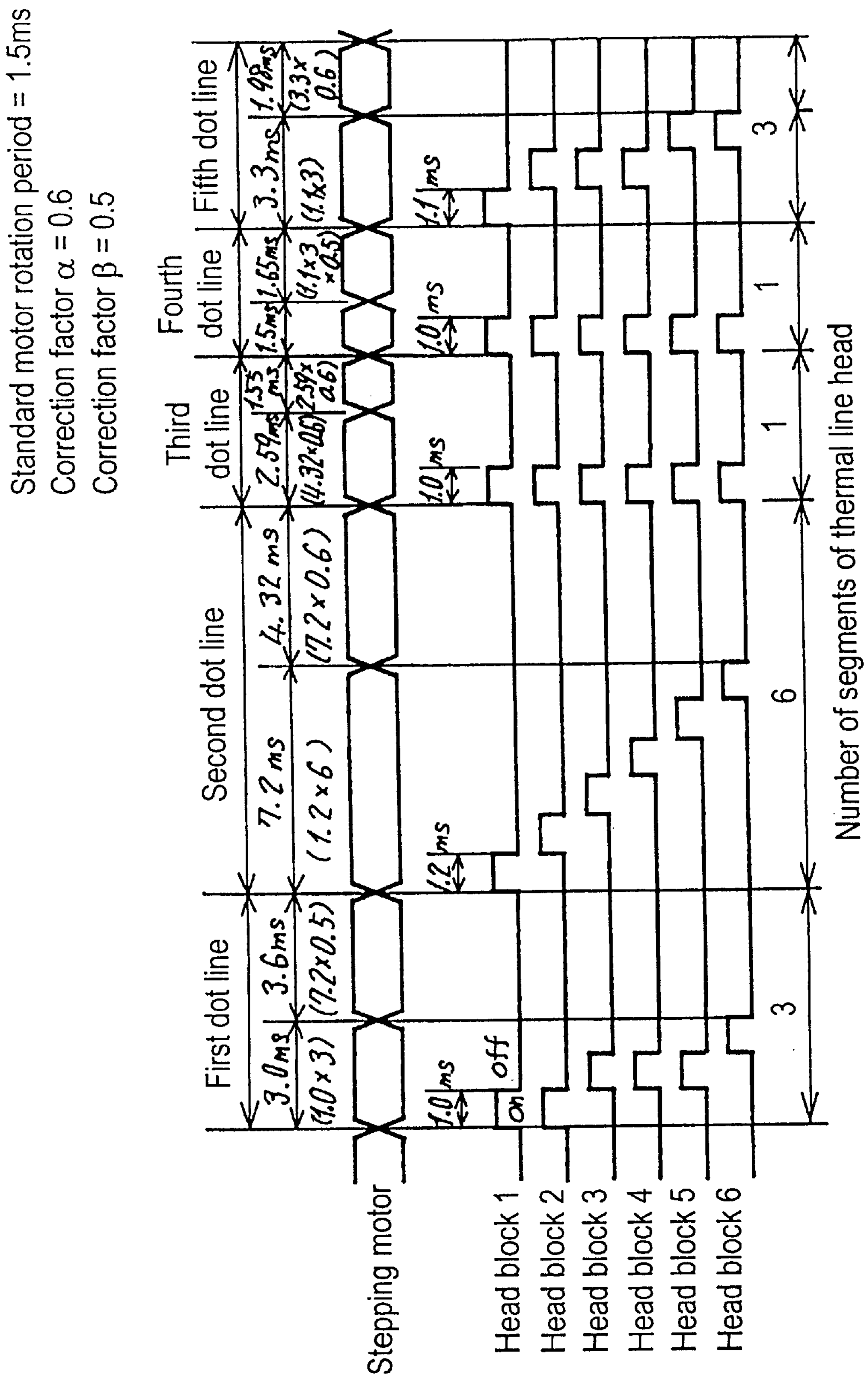
FIG. 34 is a timing chart showing an example of operation in the twelfth exemplary embodiment.
Figure 35:
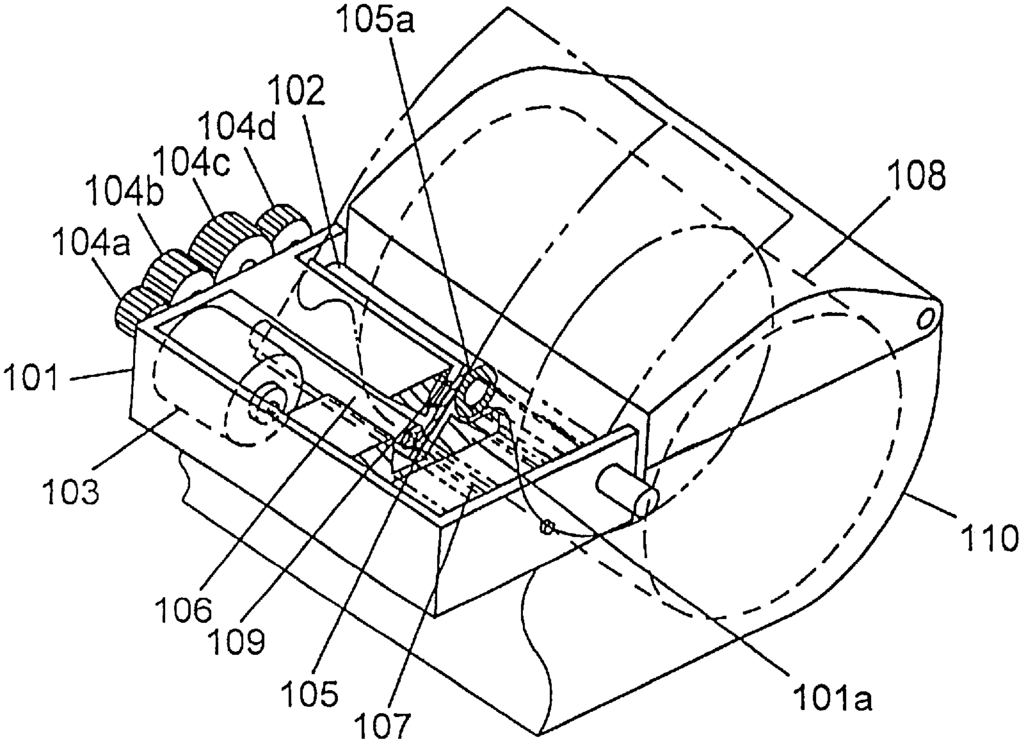
FIG. 35 is a perspective view showing the structure of a conventional thermal line printer.
Figure 36:
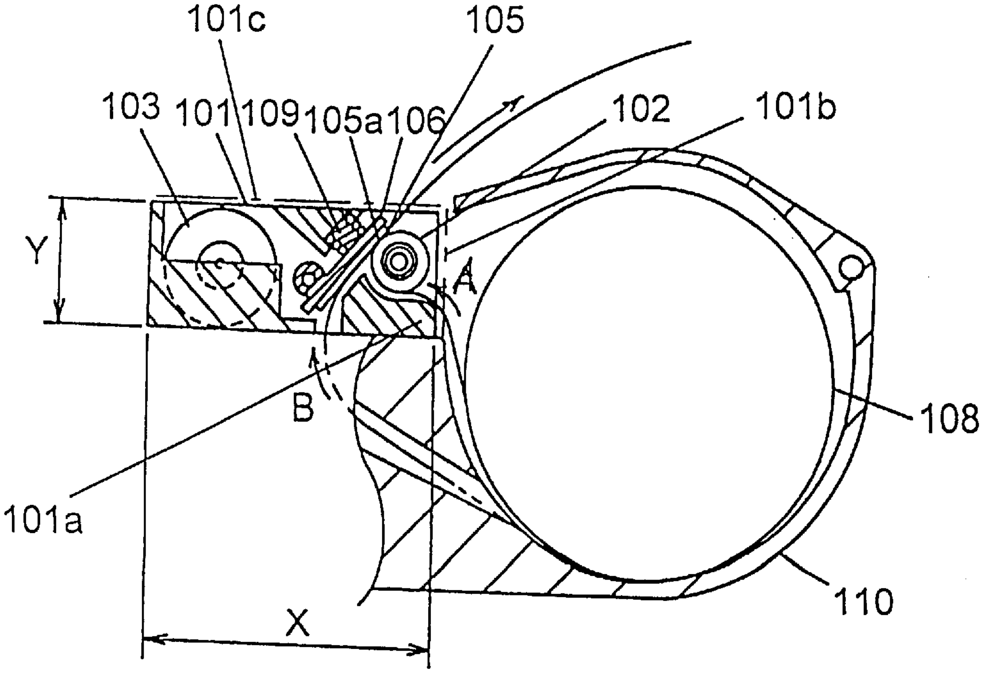
FIG. 36 is a cross sectional view showing the directions of feeding and ejecting a recording paper in the conventional thermal line printer.
Figure 37:
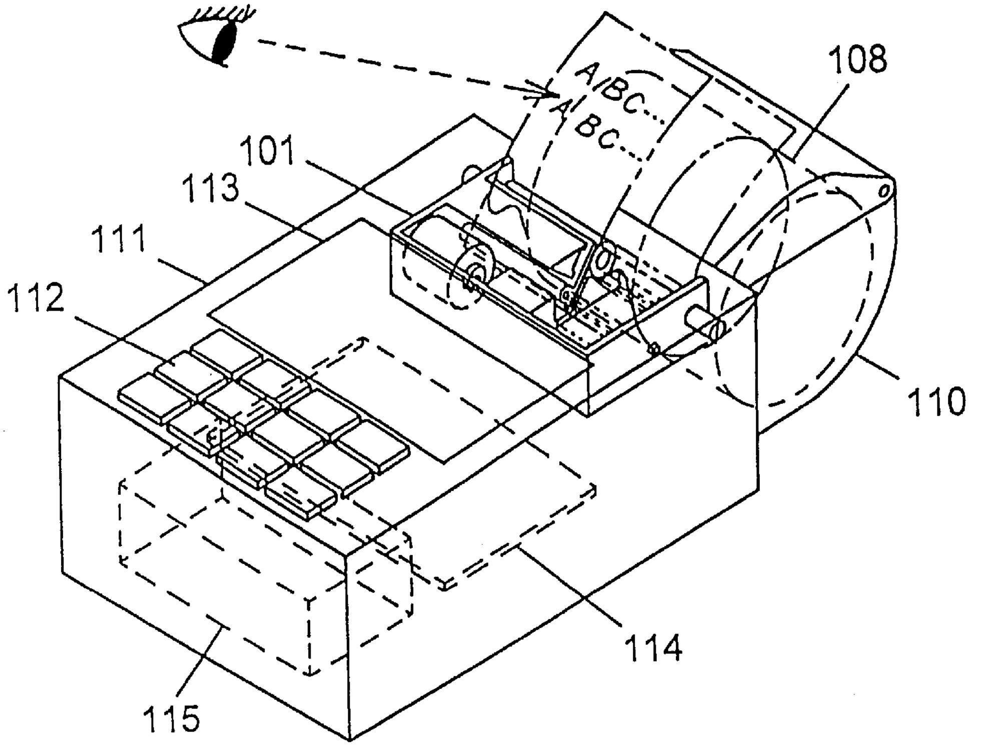
FIG. 37 is a perspective view showing the whole structure of a handy terminal as an example in which the conventional thermal line printer is installed.
Figure 38:
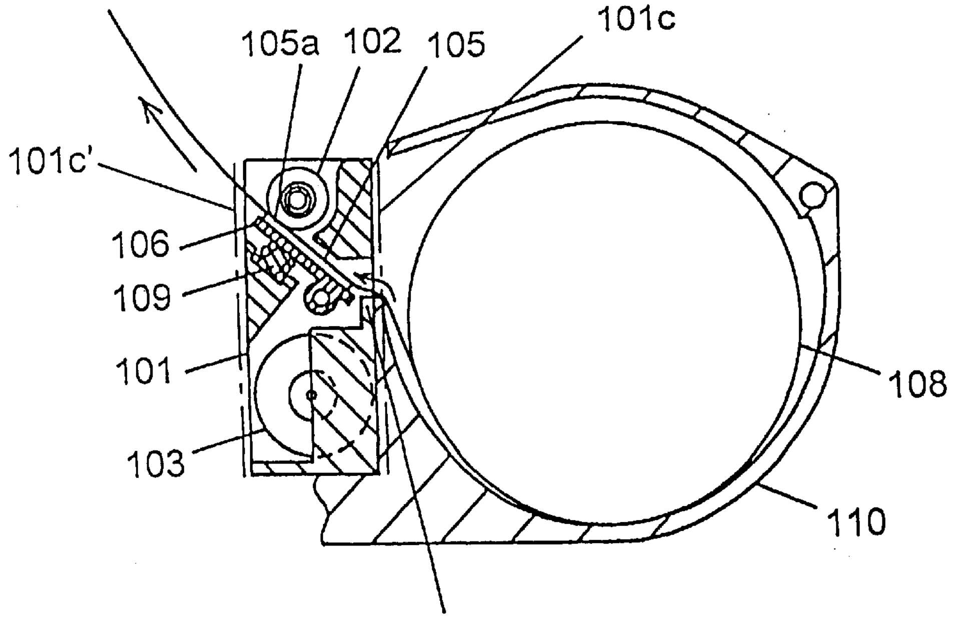
FIG. 38 is a cross sectional view showing the directions of feeding and ejecting a recording paper in the conventional thermal line printer used in the upright state for reducing the dimension of depth.
Figure 39:
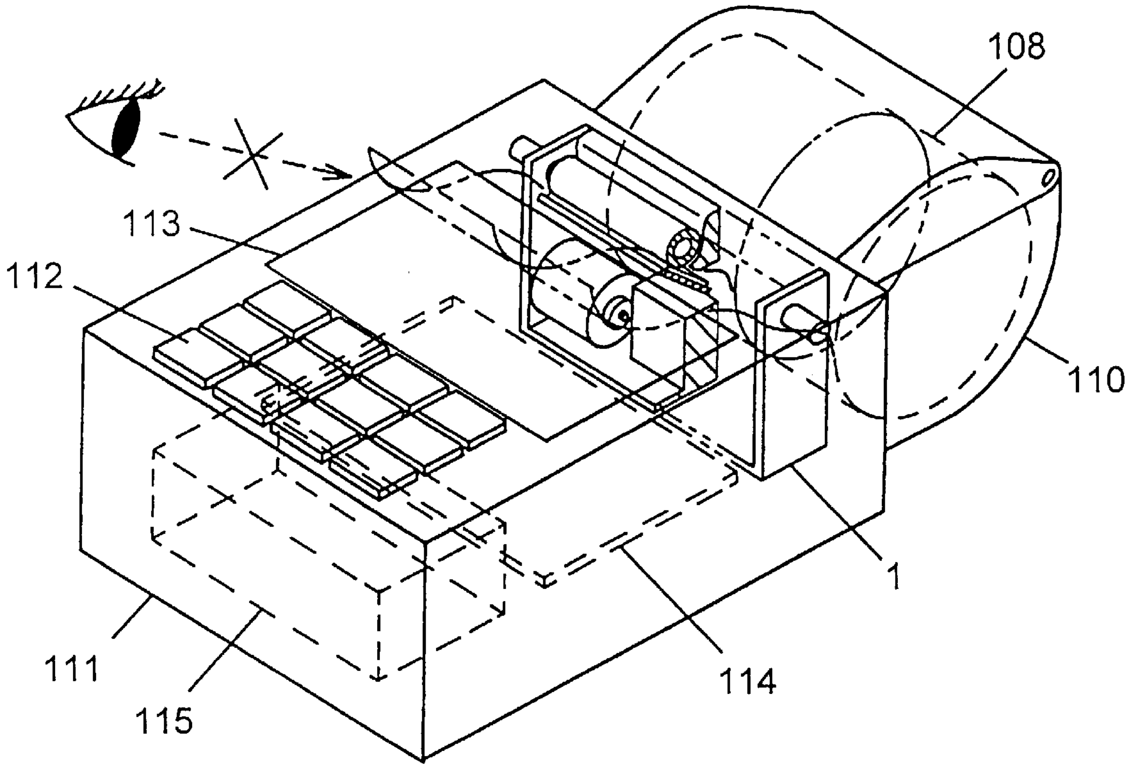
FIG. 39 is a perspective view showing the whole structure of a handy terminal as an example in which the conventional thermal line printer is installed in the upright state of for reducing the dimension of depth.
Figure 40:
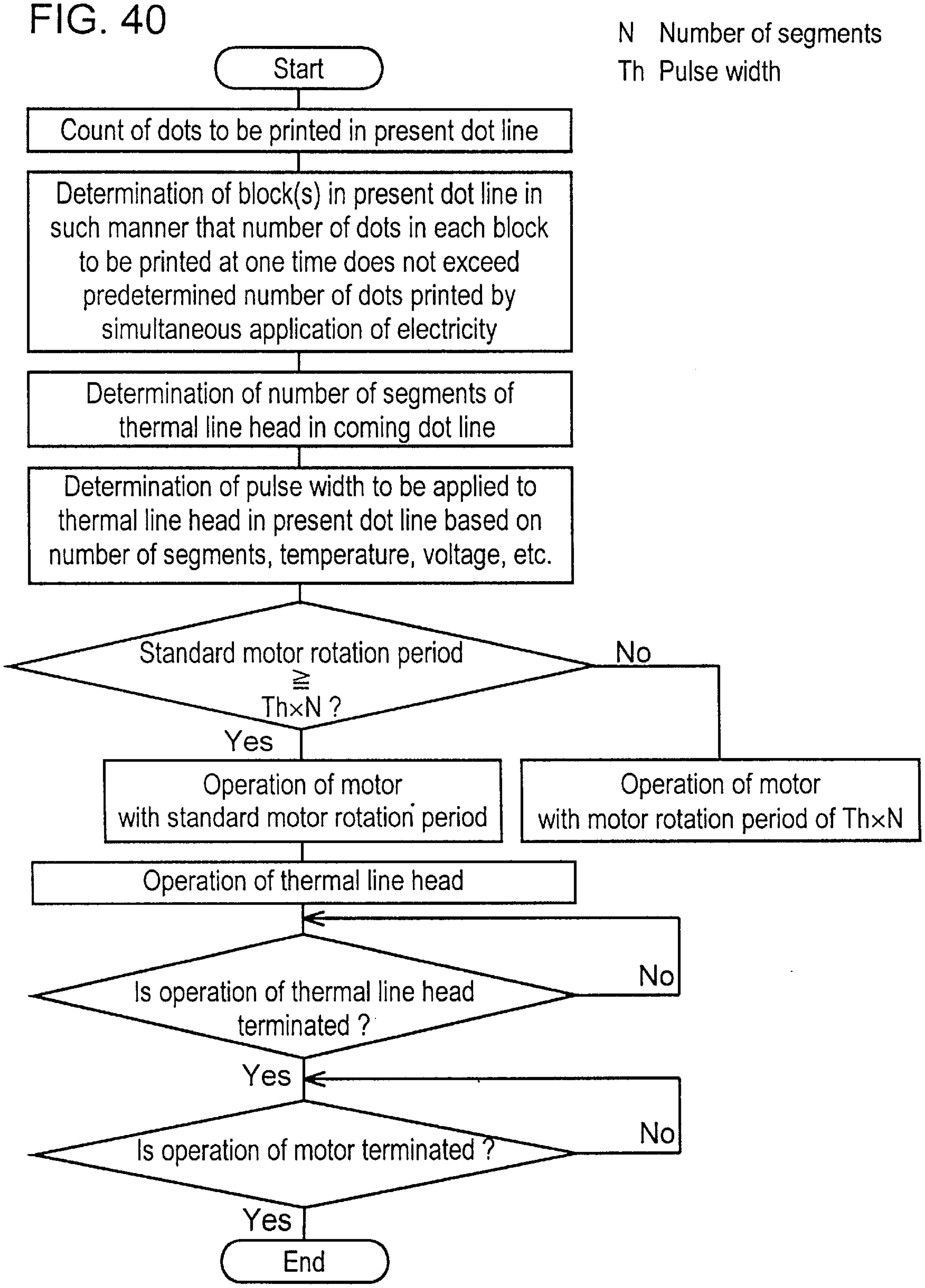
FIG. 40 is a flow chart showing the operation of printing one dot line by a conventional driving device for a thermal line printer.
Figure 41:
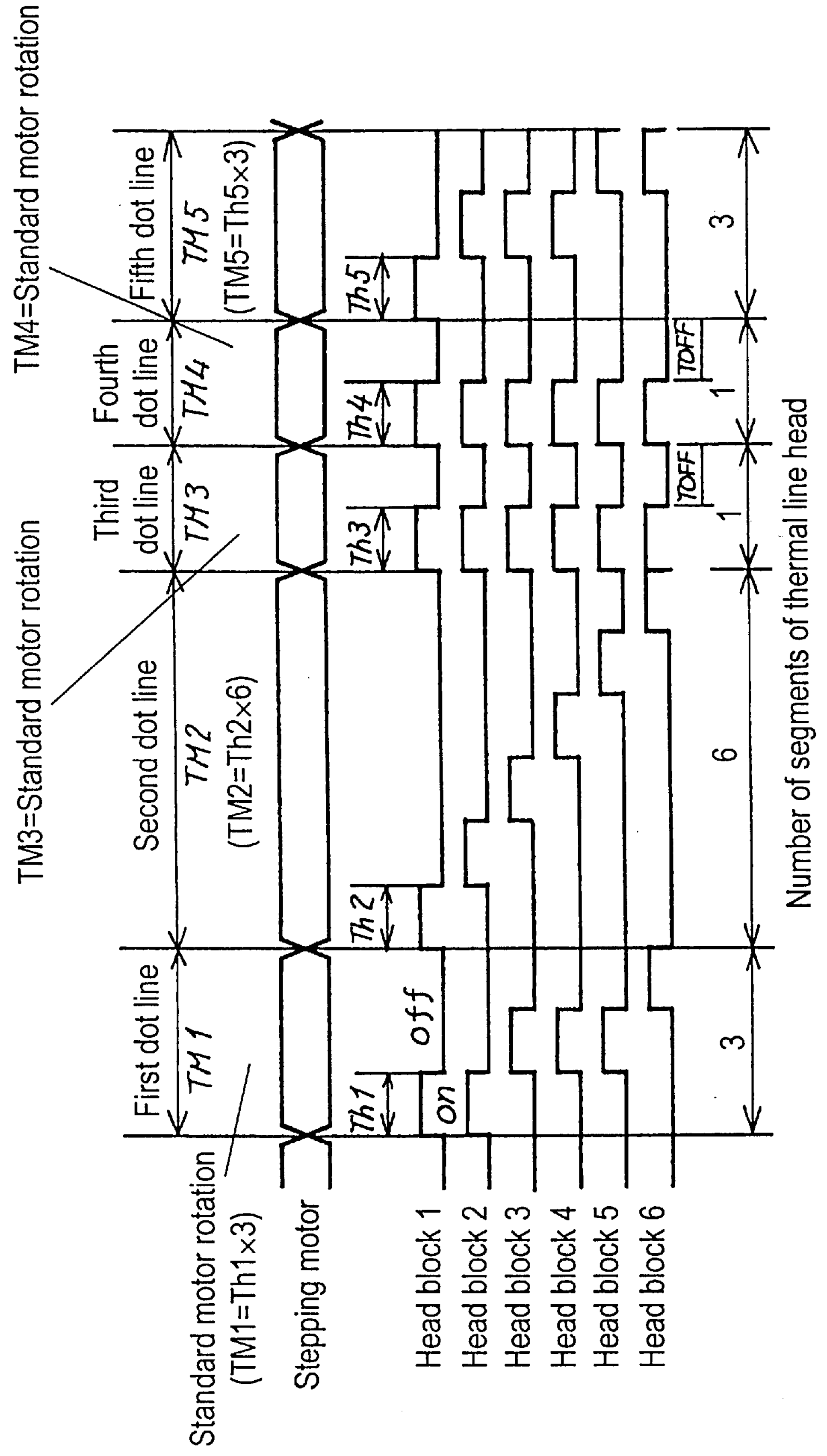
FIG. 41 is a timing chart showing an example of operation in the conventional driving device for a thermal line printer.
Figure 42:
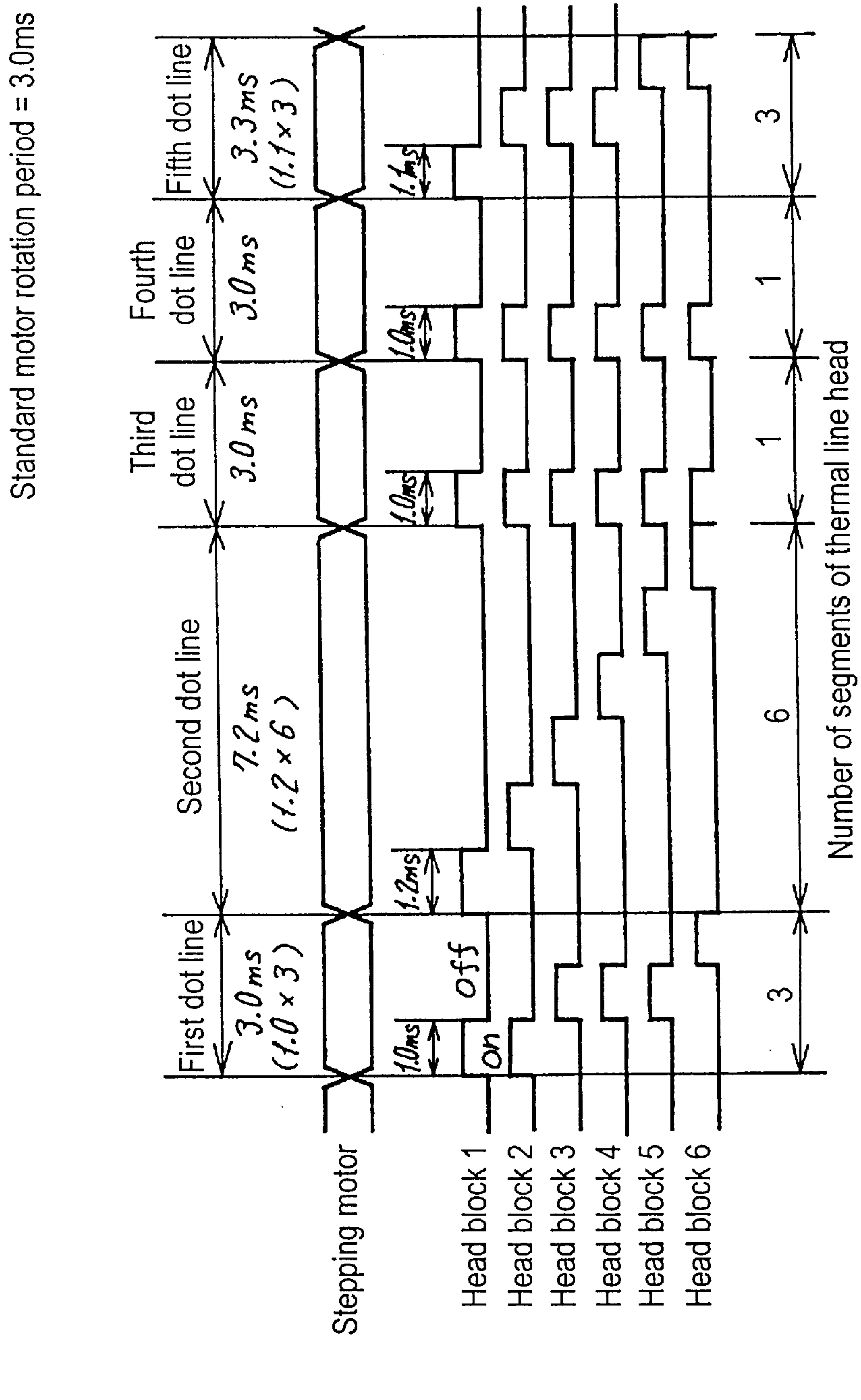
FIG. 42 is a timing chart showing an example of operation in the conventional driving device for a thermal line printer.
Figure 43:
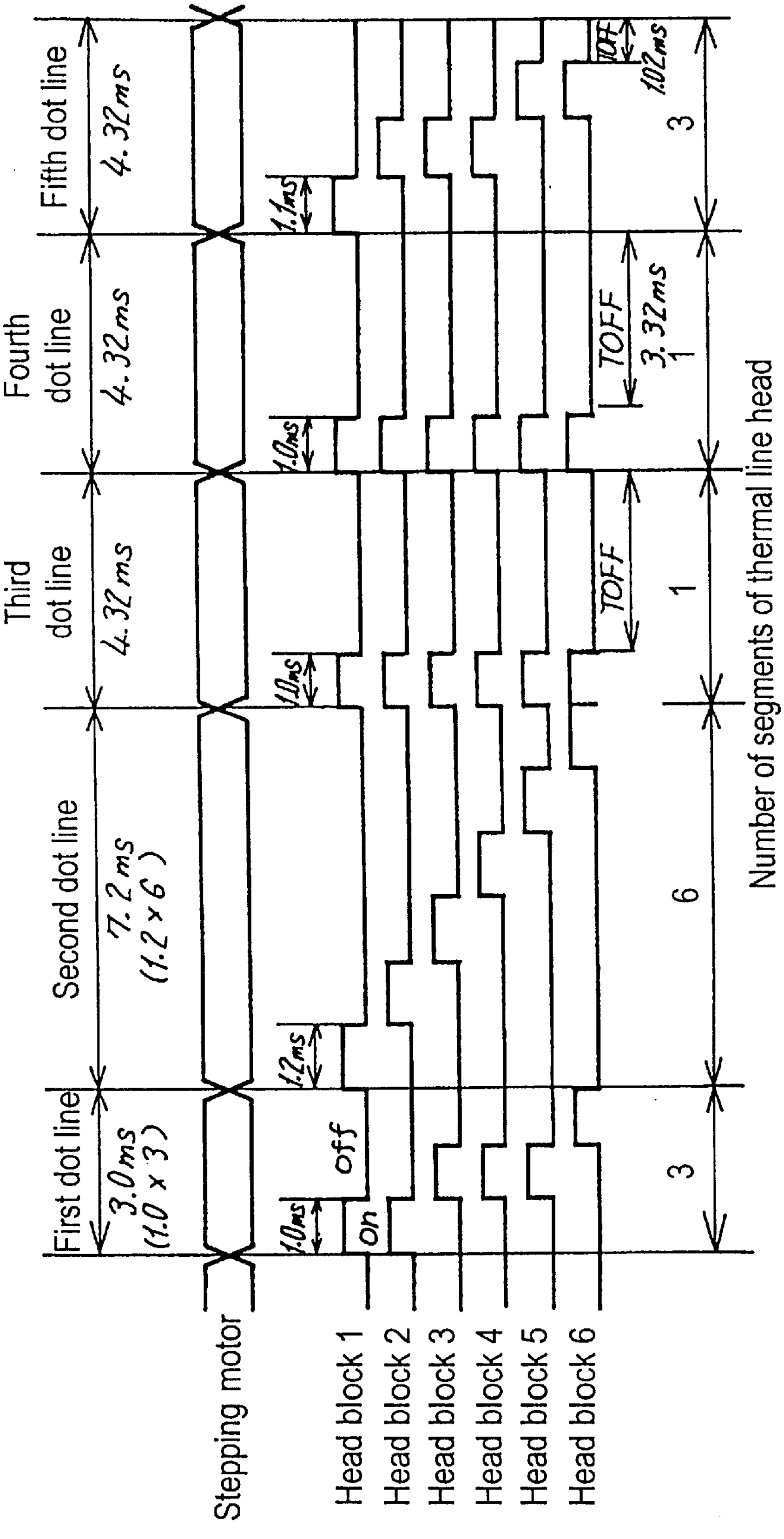
FIG. 43 is a timing chart showing an example of operation in the conventional driving device for a thermal line printer.

FIGS. 32A and B are a flow chart showing an operation for printing one dot line by a driving device for a thermal line printer in a twelfth exemplary embodiment of the present invention. FIG. 33 and FIG. 34 show an example of the timing chart of the operation in this exemplary embodiment.

Hereinafter the operation of this exemplary embodiment is described referring to FIGS. 32A and B, FIG. 33, and FIG. 34.

The driving device for a thermal line printer performs a dynamically segmenting operation. That is, a block to be printed is dynamically varied according to the number of dots to be printed, for reducing the size of power source and for increasing printing speed. As shown in FIGS. 32A and B, the number of dots to be printed in the present dot line is counted at first, and a block to be printed at one time by the thermal line head is determined in such a manner that the number of dots does not exceed a predetermined maximum number of dots printed by simultaneous application of electricity.

Next, the number of segments NA of the thermal line head necessary for printing the present one dot line is determined and a pulse width ThA applied to the thermal line head is determined based on parameters such as the above number of segments, the temperature of the thermal line head, voltage applied to the thermal line head and the like.

Then the number of dots to be printed in the coming dot line is counted, and a block to be printed at one time by the thermal line head is determined in such a manner that the number of dots does not exceed a predetermined maximum number of dots printed by simultaneous application of electricity. Then the number of segments NB of the thermal line head is determined for printing the coming one dot line and a pulse width ThB applied to the thermal line head is determined based on parameters such as the above number of segments, the temperature of the thermal line head, the voltage applied to the thermal line head and the like.

Then a rotation period of the stepping motor for feeding recording paper in the present dot line is determined by taking, after comparison, the longest period from the following: a value computed by correcting a motor rotation period determined in the preceding dot line (a value multiplied by a correction factor a), a motor rotation period computed based on the pulse width applied to the thermal line head in the present dot line and the number of segments of the thermal line head in the present dot line, a standard motor rotation period (ultimate period for continuous running of the motor) stored in advance. The correction factor a is not smaller than zero but not larger than one.

Then, the stepping motor is operated with the motor rotation period determined in the above as a first step in one dot line, also the thermal line head is operated. After the operation of the thermal line head and the stepping motor is over, a motor rotation period is newly determined for a second step in the present dot line and the stepping motor is operated with the motor rotation period newly determined. The motor rotation period in the second step is determined by taking, after comparison, the longest period from the following: a value computed by correcting the preceding motor rotation period (a value multiplied by the correction factor $\alpha$), the standard motor rotation period (ultimate period for continuous running of the motor) stored in advance, a value computed by correcting a value, which is obtained based on a pulse width applied to the thermal line head in the coming dot line and the number of segments of the thermal line head in the coming dot line (a value multiplied by a correction factor $\beta$). The correction factor $\beta$ is not smaller than zero but not larger than one. FIG. 33 is a timing chart showing the above operation for five dot lines.

FIG. 34 shows an example of a timing chart in which numerical values are put in for further explanation on the above operation. A motor rotation period in a first step in a first dot line is determined to be 3.0 ms by taking the longest period from the following: a value computed by multiplying the preceding motor rotation period (2.0 ms in this example) by a correction factor ($\alpha$=0.6) (i.e., 2.0×0.6=1.2 ms), a standard motor rotation period (1.5 ms), and a value computed by multiplying a pulse width (ThA=1.0 ms) applied to the thermal line head in the present dot line by the number of segments (NA=3) (i.e., 1.0×3=3.0 ms).

A motor rotation period in a second step in the first dot line is determined to be 3.6 ms by taking the longest period from the following: a value (1.8 ms) computed by multiplying the preceding motor rotation period (3.0 ms) by the correction factor ($\alpha$=0.6), the standard motor rotation period (1.5 ms), a value 3.6 ms computed by multiplying a pulse width (ThB=1.2 ms) applied to the thermal line head in the coming dot line by the number of segments (NB=6) and by a correction factor ($\beta$=0.5). A motor rotation period in a first step in a second dot line is determined to be 7.2 ms by taking the longest period from the following: a value (2.16 ms) computed by multiplying the preceding motor rotation period (3.6 ms) by the correction factor ($\alpha$=0.6), the standard motor rotation period (1.5 ms), and a value (7.2 ms) computed by multiplying the pulse width (ThA=1.2 ms) applied to the thermal line head in the present dot line by the number of segments (NA=6). Further motor rotation periods are determined by comparison in such a manner as described in the above.

The driving device for a thermal line printer described in the above enables the suppression of the fluctuation of the rotation period of the stepping motor even under sudden change from the numerous segments to the few segments or from the few segments to the numerous segments of the thermal line head due to printing contents without setting the standard motor rotation period at a value which is unnecessarily large, whereby the vibration is further suppressed, and accordingly the operation noise is further suppressed. The driving device also enables printing without the occurrence of the step out even by using a lower torque stepping motor, enables the improvement of the preciseness of paper feeding pitch of the stepping motor by constituting the printing of one dot line with a plurality of steps of the stepping motor, enables the use of a low cost and small stepping motor by increasing the deceleration ratio, and enables higher quality printing having no occurrence of horizontal level difference in printing by completing the printing of one dot line in one step of a plurality of steps of the stepping motor, also enables high speed printing by correcting a motor rotation period in the respective steps.

In the above description, the number of segments of the thermal line head is varied between one and six for the convenience of showing the operation by illustrations. However, the number of segments is varied between one and some tens to some hundreds in practical use. When the number of segments is larger, a to larger effect can be obtained in this exemplary embodiment.

As described in the above, the thermal line printer of the present invention realizes the decrease of the dimension of depth thereof, and also realizes the decrease of size of an apparatus having the thermal line printer installed therein, in which the user can easily see the state of printing, by constituting the thermal line printer in such a manner as to feed the recording paper from the long side of the body chassis in a plane projecting the body chassis along the axial direction of the platen roller and ejecting the recording paper from the short side.

Also, in the driving device of the present invention for a thermal line printer, the motor rotation period in the present dot line is determined based on the information of motor rotation periods in the preceding dot line and in the coming dot line, which enables the suppression of the fluctuation of the motor rotation period even under sudden change from the numerous segments to the few segments or from the few segments to the numerous segments of the thermal line head occurred in the dynamically segmenting operation. As a result, the vibration of the stepping motor and the operation noise are suppressed. Also, high speed printing is performed without the occurrence of the step out even when a small, low torque and low cost stepping motor is used.

Reference numerals

1 Body chassis
2 Platen roller
3 Motor
4*a*–4*d* Rbow of gears
5 Line type thermal head
6 Head supporting unit
7 Shaft
8 Recording paper
9 Spring
10 Recording paper holder
11 Body of handy terminal
12 Rows of operation keys
13 Display unit
14 Control circuit substrate
15 Power source battery

What is claimed is:

1. A thermal line printer comprising:

a body chassis having a long side and a short side;

a platen roller rotatably supported by said body chassis, said platen roller having an axial direction parallel to said short side and said long side of said body chassis;

driving means for rotating said platen roller;

a line type thermal head;

a head supporting unit for holding said line type thermal head and being supported by said body chassis; and an elastic unit for pressing said line type thermal head onto said platen roller in order to sandwich recording paper between said line type thermal head and said platen roller, wherein said long side of said body chassis receives the recording paper and said short side of said body chassis ejects the recording paper outside of said body chassis after the recording paper passes through a pressed portion between said line type thermal head and said platen roller, wherein said driving means includes a motor for generating a driving force and a driving force transmitting system for transmitting the driving force to said platen roller, and wherein said motor, said driving force transmitting system, and said platen roller are disposed in said body chassis in this order along said long side of said body chassis.

2. The thermal line printer according to claim 1, wherein said motor and said platen roller are disposed within said body chassis.

3. The thermal line printer according to claim 1, wherein said driving force transmitting system comprises a row of gears.

4. The thermal line printer according to claim 1, wherein of said motor has an axial direction parallel to said short side and said long side of said body chassis, and an imaginary line between an axis of said motor and an axis of said platen roller is substantially parallel to said long side of said body chassis.

5. A thermal line printer comprising:

a body chassis having a long side and a short side;

a platen roller rotatably supported by said body chassis, the axial direction of said platen roller having an axial direction parallel to said short side and said long side of said body chassis;

driving means f or rotating said platen roller;

a line type thermal head;

a head supporting unit for holding said line type thermal head and being supported by said body chassis;

an elastic unit for pressing said line type thermal head onto said platen roller in order to sandwich recording paper between said line type thermal head and said platen roller; and a recording paper feeding guide disposed within said body chassis, wherein said long side of said body chassis receives the recording paper guided by said recording paper feeding guide and said short side of said body chassis ejects the recording paper outside of said body chassis after the recording paper passes through a pressed portion between said line type thermal head and said platen roller.

6. A thermal line printer comprising:

a body chassis having a long side and a short side;

a platen roller rotatably supported by said body chassis, the axial direction of said platen roller having an axial direction parallel to said short side and said long side of said body chassis;

driving means for rotating said platen roller;

a line type thermal head having a pressing face;

a head supporting unit for holding said line type thermal head and being supported by said body chassis; and an elastic unit for pressing said line type thermal head onto said platen roller in order to sandwich recording paper between said line type thermal head and said platen roller, wherein said long side of said body chassis receives the recording paper and said short side of said body chassis ejects the recording paper outside of said body chassis after the recording paper passes through a pressed portion between said line type thermal head and said platen roller, and said line type thermal head is supported by said body chassis so that said pressing face of said line type thermal head with said platen roller is substantially parallel to said long side of said body chassis.

* * * * *

UNITED STATES PATENT AND TRADEMARK OFFICE

CERTIFICATE OF CORRECTION

PATENT NO. : 6,529,226 B2
DATED : March 4, 2003
INVENTOR(S) : Keita Sakai et al.

It is certified that error appears in the above-identified patent and that said Letters Patent is hereby corrected as shown below:

Column 30,
Line 3, change "f or" to -- for --.

Signed and Sealed this

First Day of July, 2003

JAMES E. ROGAN
*Director of the United States Patent and Trademark Office*